(12) United States Patent
Furukawa et al.

(10) Patent No.: US 9,196,437 B2
(45) Date of Patent: Nov. 24, 2015

(54) OPERATION INPUT APPARATUS AND OPERATION INPUT DETECTION APPARATUS

(75) Inventors: Kenichi Furukawa, Tokyo (JP);
Kensuke Yamada, Tokyo (JP);
Takayuki Numakunai, Tokyo (JP);
Yoshihiro Sakanushi, Tokyo (JP);
Shintaro Tomitsuka, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 1043 days.

(21) Appl. No.: 13/320,784
(22) PCT Filed: May 19, 2010
(86) PCT No.: PCT/JP2010/058474
§ 371 (c)(1),
(2), (4) Date: Nov. 16, 2011
(87) PCT Pub. No.: WO2010/134558
PCT Pub. Date: Nov. 25, 2010

(65) Prior Publication Data
US 2012/0072150 A1    Mar. 22, 2012

(30) Foreign Application Priority Data

May 19, 2009 (JP) .................. 2009-120871
May 18, 2010 (JP) .................. 2010-114581

(51) Int. Cl.
*G01D 7/00* (2006.01)
*H01H 25/04* (2006.01)
(Continued)

(52) U.S. Cl.
CPC ............... *H01H 25/041* (2013.01); *G01B 7/00* (2013.01); *G01L 5/164* (2013.01); *G06F 3/0338* (2013.01)

(58) Field of Classification Search
CPC .................... G01B 7/00; G01L 5/164
USPC .................. 340/407.1, 407.2; 702/65
See application file for complete search history.

(56) References Cited

U.S. PATENT DOCUMENTS 5,343,765 A    9/1994  Okada
5,421,213 A    6/1995  Okada
(Continued)

FOREIGN PATENT DOCUMENTS

JP    04-148833    5/1992
JP    05-118942    5/1993
(Continued)

OTHER PUBLICATIONS

Title: Chapter 3, Vectors, Author: unknown, Date: accessed on Apr. 2, 2015, Publisher: College of William and Mary , URL: http://physics.wm.edu/~labs/101_manual/ch3.pdf , pp. 15-22.*

*Primary Examiner* — Lisa Caputo
*Assistant Examiner* — Roger Hernandez-Prewitt
(74) *Attorney, Agent, or Firm* — IPUSA, PLLC

(57) ABSTRACT

An operation input apparatus configured to receive a force from an operator, including: a board 10 including a placement surface on which coils 21~24 are placed, the coils being arranged in a circumferential direction of a circle formed by connecting points apart from a reference point by the same distance; a key 30 that is provided in a side where the force is input with respect to the board 10; and a return spring 51~54 elastically supporting the key 30, wherein the key 30 includes an opposed surface opposed to the placement surface and an operation surface configured to receive an application of the force, and causes an inductance of at least one of the coils 21~24 to change with an approach of the opposed surface to the placement surface due to the application of the force on the operation surface.

23 Claims, 64 Drawing Sheets

(51) Int. Cl.
*G01B 7/00* (2006.01)
*G01L 5/16* (2006.01)
*G06F 3/0338* (2013.01)

(56) References Cited

U.S. PATENT DOCUMENTS

| | | | |
|---|---|---|---|
| 5,687,080 A | | 11/1997 | Hoyt et al. |
| 5,959,863 A | * | 9/1999 | Hoyt et al. ................ 700/85 |
| 2003/0085793 A1 | | 5/2003 | Inoue et al. |
| 2005/0264530 A1 | * | 12/2005 | Takatsuka et al. ............ 345/160 |
| 2007/0257886 A1 | * | 11/2007 | Uotani et al. ................ 345/160 |
| 2008/0000766 A1 | * | 1/2008 | Honmatsu .................... 200/5 A |

FOREIGN PATENT DOCUMENTS

| | | |
|---|---|---|
| JP | 10-247129 | 9/1998 |
| JP | 2000-501206 | 2/2000 |
| JP | 2002-117751 | 4/2002 |
| JP | 2006-179250 | 7/2006 |

\* cited by examiner

OPERATION INPUT APPARATUS AND OPERATION INPUT DETECTION APPARATUS

TECHNICAL FIELD

The present invention relates to an operation input apparatus for receiving a force from an operator, and to an operation input detection apparatus for detecting the force.

BACKGROUND ART

Conventionally, a detection apparatus that detects a force based on variations of capacitance when an interval between electrodes changes is known (refer to patent documents 1, 2 and 3, for example). Also, a coordinate input apparatus that obtains movement data based on variations of voltage of a resonance coil caused by sliding of a predetermined member (refer to patent document 4, for example) is known.

RELATED-ART DOCUMENTS

Patent Document

[Patent Document 1] Japanese Patent Application Publication No. 4-148833
[Patent Document 2] Japanese Patent Application Publication No. 5-118942
[Patent Document 3] Japanese Patent Application Publication No. 2006-179250
[Patent Document 4] Japanese Patent Application Publication No. 10-247129

SUMMARY OF THE INVENTION

Problem to be Solved by Invention

In the case where the force of the operator is detected by utilizing the variations of the capacitance like techniques disclosed in the above-mentioned patent documents 1-3, there is a case where the force of the operator cannot be detected accurately since the capacitance sensitively changes due to touching by the operator.

Regarding this point, the method of detecting the force of the operator by using the voltage variation of a coil as disclosed in the patent document 4 is advantageous compared to the case in which the force of the operator is detected by using capacitance, in that change of inductance due to touching by the operator does not occur. However, only two-dimensional data is obtained according to the technique disclosed in patent document 4.

An object of the present invention is to provide an operation input apparatus and an operation input detection apparatus for detecting a force, that can detect a force of an operator three-dimensionally and that can improve detection accuracy.

Means to Solve the Problem

For achieving the object, there is provided an operation input apparatus of the present invention configured to receive a force of an operator, the operation input apparatus including:
a base part including a placement surface on which plural inductors are placed, the inductors being arranged in a circumferential direction of a circle formed by connecting points apart from a reference point by the same distance;
a displacement member that is provided in a side where the force is input with respect to the base part, the displacement member including an opposed surface opposed to the placement surface and an operation surface configured to receive an application of the force, and the displacement member being configured to cause an inductance of at least one of the inductors to vary with an approach of the opposed surface to the placement surface due to the application of the force on the operation surface;
a support member configured to support the displacement member such that an interval between the opposed surface and the placement surface elastically changes; and
an output part configured to output an output signal generated by variations of the inductance.

In addition, there is provided an operation input detection apparatus of the present invention, including:
the operation input apparatus; and
a calculation part configured to calculate a vector of the force by detecting a change of an X direction component of inductance and a change of a Y direction component of inductance based on the output signal for each of the plural inductors, wherein a plane perpendicular to a straight line connecting the reference point and the center portion of the circle is defined to be an XY plane.

Effect of the invention

According to the present invention, it is possible to detect a force of an operator three-dimensionally, and to improve detection accuracy.

MODE FOR CARRYING OUT THE INVENTION

In the following, embodiments for carrying of the present invention are described with reference to figures. The operation input apparatus of an embodiment of the present invention is an operation interface that receives a force by a finger and the like of an operator so as to output an output signal that changes according to the received force. Based on the output signal, an operation input by the operator is detected. By the detection of the operation input, a computer can ascertain operation details corresponding to the detected operation input.

For example, in an electronic apparatus such as a home-use or portable game machine, a portable terminal like a mobile phone and a music player, a personal computer, and an appliance, an operator can move a display object (instruction display such as a cursor and a pointer, a character, for example) on a screen of a display of the electronic apparatus according to operation details intended by the operator. Also, an operator provides a predetermined operation input so that an electronic apparatus can exert a desired function corresponding to the operation input.

In general, regarding an inductance L of an inductor such as a coil (wound wire), a following relation equation holds true, $$L = K \mu n^2 S / l$$

in which K indicates a coefficient, $\mu$ indicates a magnetic permeability, n indicates the number of coil turns, S indicates a cross-sectional area, and l indicates a magnetic path length. As is obvious from this relation equation, when parameters such as the coil turns and the cross-sectional area that depend on the shape are fixed, the inductance changes by changing surrounding magnetic permeability or by changing the magnetic path length.

In the following, embodiments of an operation input apparatus and an operation input detection apparatus that use the change of the inductance are described below. The operation input apparatus is configured to receive an operator's force input from a Z axial direction of a Cartesian coordinate system defined by the X axis, Y axis, and Z axis. The Z axial direction refers to a direction parallel to the Z axis. The operation input detection apparatus detects movement of a member that is displaced by an operation input of an operator based on a signal from the operation input apparatus (that is, based on a predetermined signal that changes according to the size of the inductance) so as to detect the operation input.

Figure 1:
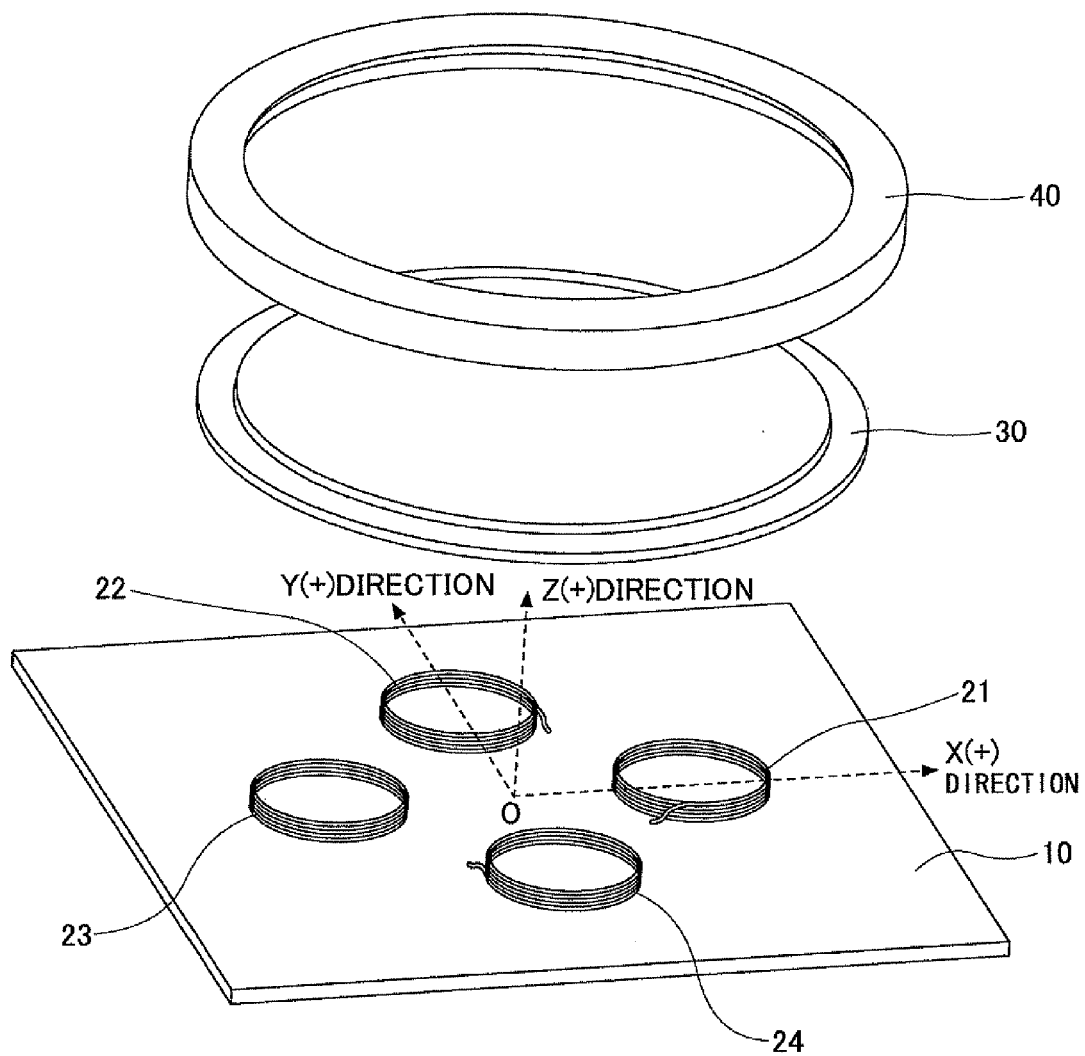
FIG. 1 is an exploded diagram of an operation input apparatus 1 which is an embodiment of the present invention.
Figure 2:
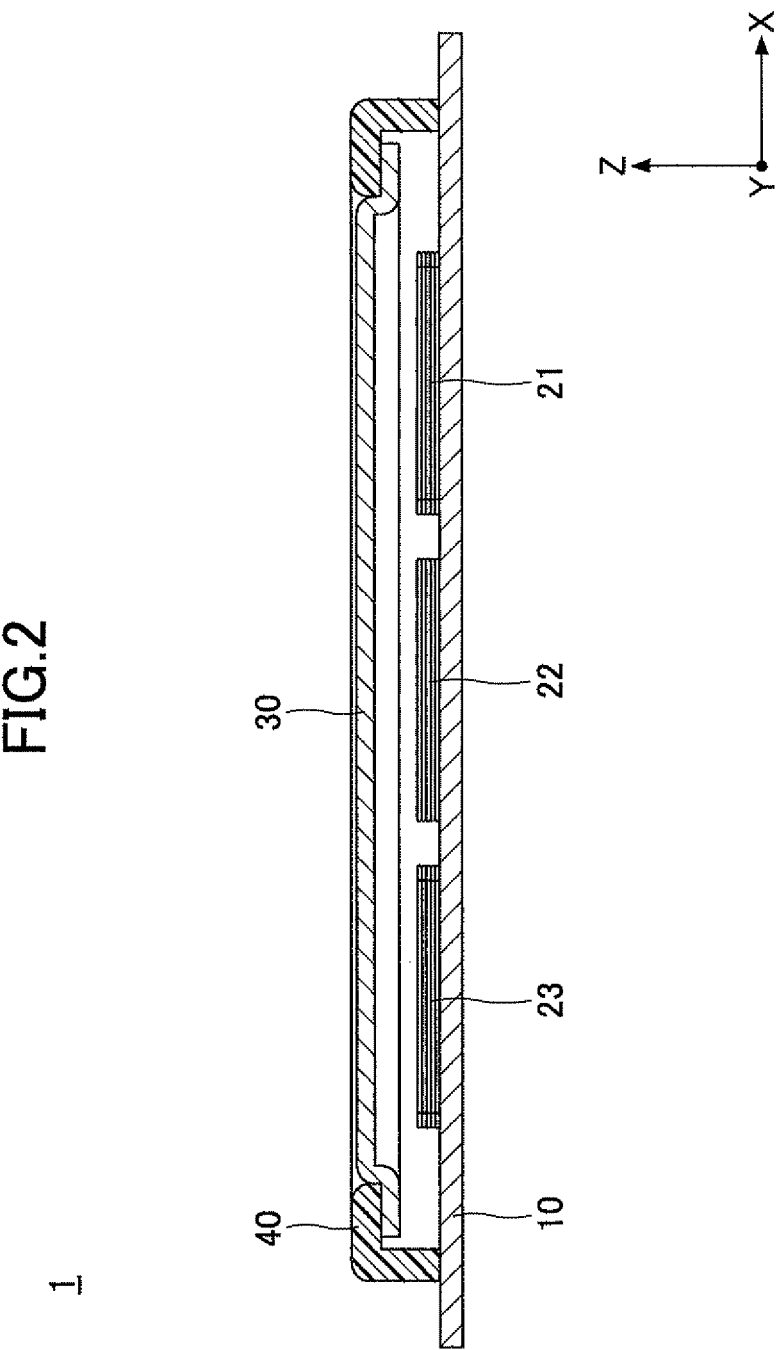
FIG. 2 is a cross-sectional view of the operation input apparatus 1.

FIG. 1 is an exploded perspective view of an operation input apparatus 1, which is a first embodiment of the present invention. FIG. 2 is a cross-sectional view of the operation input apparatus 1.

The operation input apparatus 1 includes a board 10 including a placement surface on which multiple inductors (four coils 21, 22, 23, and 24 in the case of FIG. 1) are placed. The board 10 is a base part having a placement surface parallel to an XY plane. The origin O, which is the point of reference of a three-dimensional Cartesian coordinate system, is set at a position a predetermined distance away from the placement surface to a side from which an operator's force is input (the upper side relative to the board 10 in the case of FIG. 1). The board 10 may be a resin board, but may also be a steel plate having sheet steel or silicon sheet steel as a base material in order to serve as a yoke.

The coils 21~24 are arranged in a circumferential direction of a virtual circle formed by connecting points equidistant from the origin O. It is preferable that the coils 21~24 be equally spaced in the circumferential direction in terms of facilitating calculation of a vector of an operator's force. If the coils 21~24 have the same characteristics, the coils 21~24 may be arranged to have the same distance between the centers of gravity of each adjacent two of the coils 21~24. The coils 21~24 are arranged 90° apart on the same circle to be positioned in the four directions of X(+), X(−), Y(+), and Y(−), respectively. The X(−) direction is at 180° from the X(+) direction in the XY plane, and the Y(−) direction is at 180° from the Y(+) direction in the XY plane. The coil 21 is placed on the positive side on the X axis relative to the origin O, the coil 22 is placed on the positive side on the Y axis relative to the origin O, the coil 23 is placed on the negative side on the X axis relative to the origin O, and the coil 24 is placed on the negative side on the Y axis relative to the origin O.

Further, the operation input apparatus 1 includes a key 30 that is a displacement member provided on a side from which an operator's force is input relative to the board 10. The plate-shaped key 30 is placed above the coils 21~24 provided on the board 10. The key 30 includes an opposed surface (the lower surface in FIG. 1) facing the placement surface on which the coils 21~24 are placed and an operation surface (the upper surface in FIG. 1) on which the operator's force is applicable. The key 30 is configured to cause the inductance of at least one of the four coils 21~24 to vary with the approach of the opposed surface to the placement surface on which the coils 21~24 are placed due to application of the operator's force on the operation surface. In order to cause variations in the inductance of the coils 21~24, the key 30 may be at least formed of a material higher in magnetic permeability than air. The relative magnetic permeability of the key 30 is preferably higher than or equal to 1.001. The key 30 may be magnetic material. The magnetic material is iron or ferrite, for example. The key 30 may also be resin mixed with powder of ferrite or the like.

The key 30 is supported by a case 40 so as to be movable in the Z axial direction. The case 40 supports the key 30 so as to allow the key 30 to move in a direction to approach the board 10 from its standby position with application of the operator's force on the operation surface, the standby position being the position of the key 30 in a standby state (initial state) where there is no application of the operator's force on the operation surface. The case 40 is fixed to the board 10.

Figure 3:
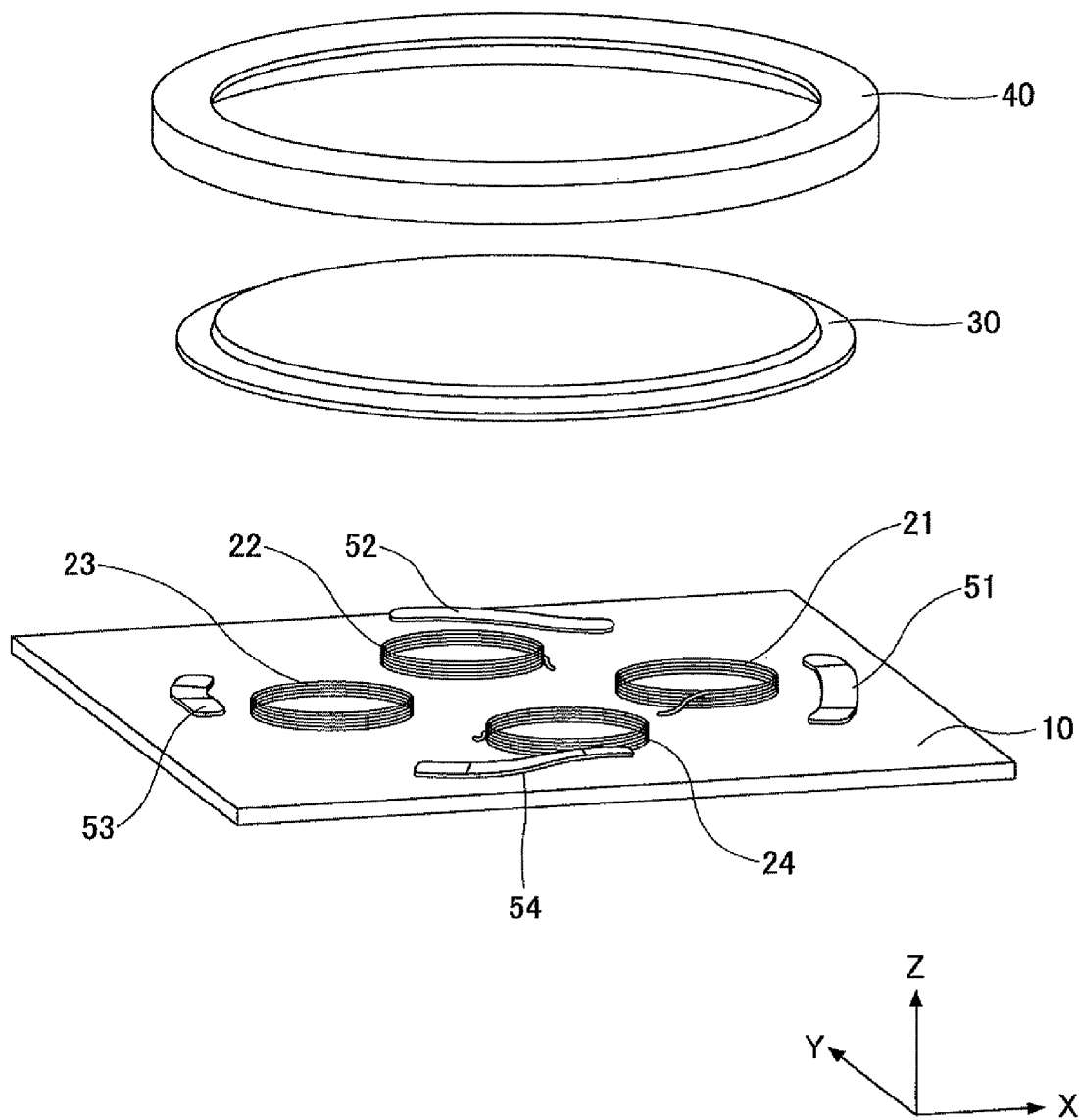
FIG. 3 is an exploded diagram of the operation input apparatus 1 to which return springs 51~54 are provided.
Figure 4:
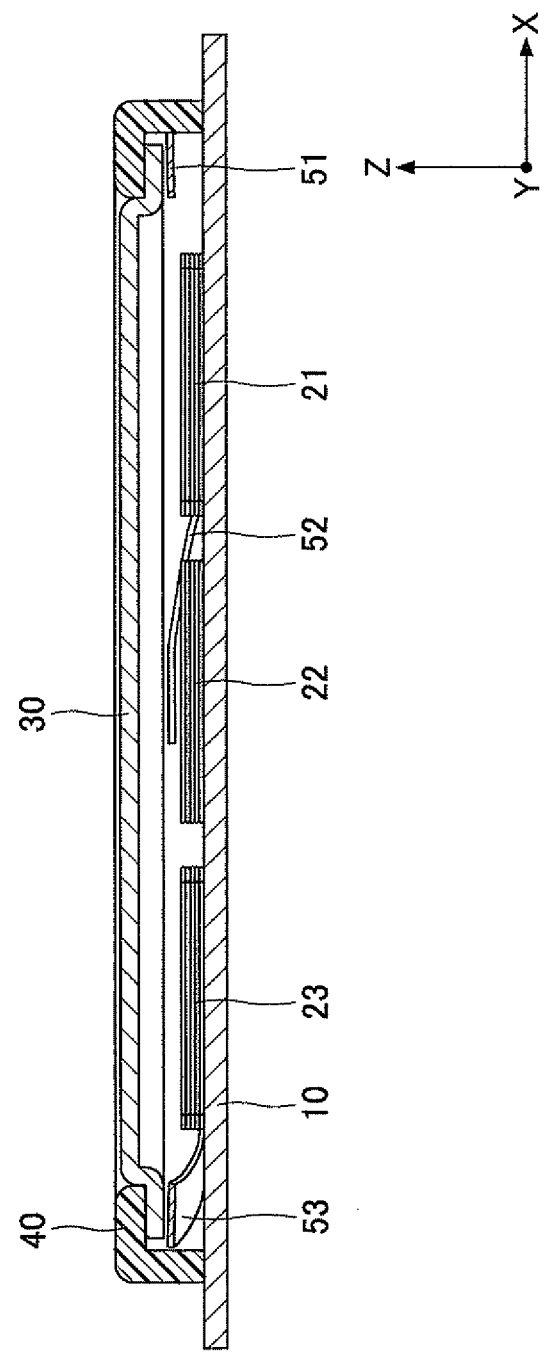
FIG. 4 is a cross-sectional view of the operation input apparatus 1 to which the return springs are provided.
Figure 5:
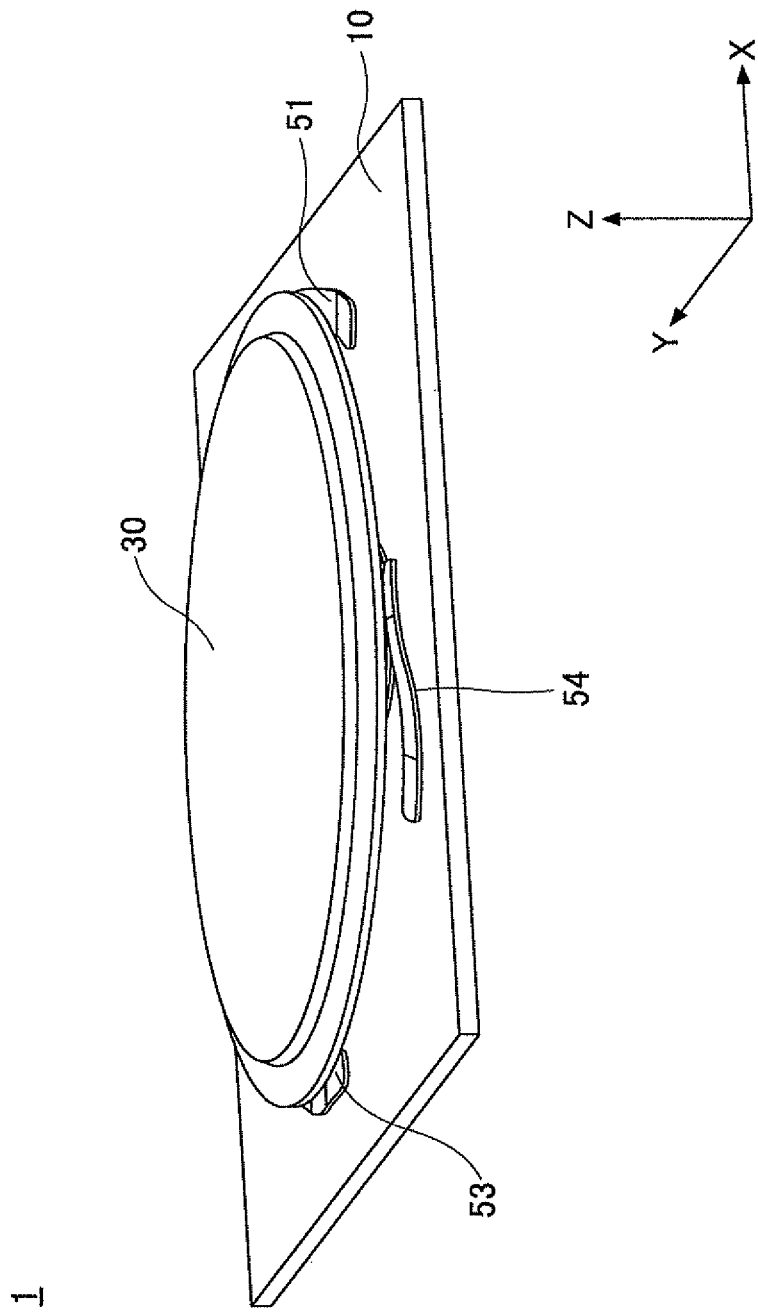
FIG. 5 is a perspective view of the operation input apparatus 1 showing a state in which a key 30 is placed on the return spring.

Further, the operation input apparatus 1 includes an elastic support member configured to elastically support the key 30 in directions in which the opposed surface of the key 30 and the placement surface of the board 10 face each other, so that the interval between the opposed surface of the key 30 and the placement surface of the board 10 changes elastically. For example, return springs 51, 52, 53, and 54 for returning the key 30 to its standby position may be provided outside the coils 21~24 on the placement surface of the board 10 as the elastic support member as shown in FIG. 3, FIG. 4, and FIG. 5. The return springs 51~54 are plate-shaped elastic bodies.

The elastic support member may be provided between the placement surface of the board 10 and the opposed surface of the key 30. The elastic support member is configured to elastically support the key 30 in such a manner as to prevent application of the operator's force from causing the key 30 to come into contact with any of the coils 21~24. The elastic support member supports the key 30 in such a manner as to allow the key 30 to be inclined relative to the XY plane perpendicular to the Z axis and to move in the Z axial direction. Further, the elastic support member may also support the key 30 with the opposed surface of the key 30 being urged in a direction away from the placement surface of the board 10.

The elastic support member is configured to elastically support the key 30 so that the operation surface of the key 30 is parallel to the XY plane in a state with no application of the operator's force on the operation surface. The operation surface of the key 30 may be a flat surface or a surface formed to be concave or convex relative to the XY plane. By changing the shape of the operation surface as desired, it is possible to improve operability for the operator. Further, the operation surface of the key 30 may be circular, elliptical, or polygonal.

Figure 41:
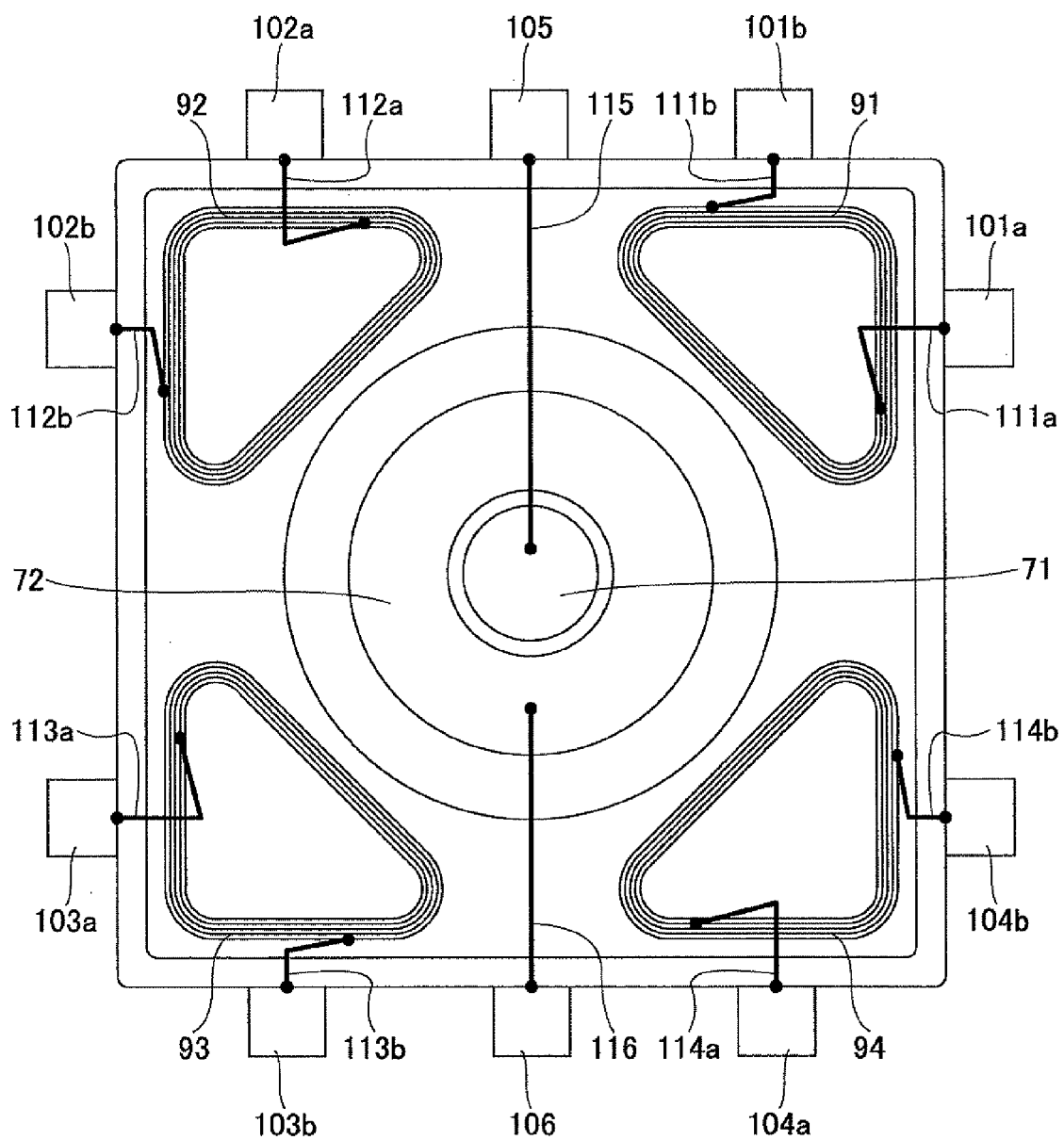
FIG. 41 is a structural diagram of a housing 41.

Further, the operation input apparatus 1 includes an output part configured to output an output signal generated by a change in the inductance of at least one of the coils 21~24 to a predetermined operation input detection apparatus. The output part is electrically connected to an end portion of each of the coils 21~24. This output part is provided for each of the coils 21~24 so that variations of inductance caused in the coils 21~24 may be detected on a coil-by-coil basis. For example, wiring (111a, 111b~114a, 114b) connected to the end portion of each of the coils 21~24 and a terminal (101a, 101b~104a, 104b) connected to the wiring (111a, 111b~114a, 114b) may be provided as the output part, as shown in FIG. 41 (the details are described later).

Figure 6:
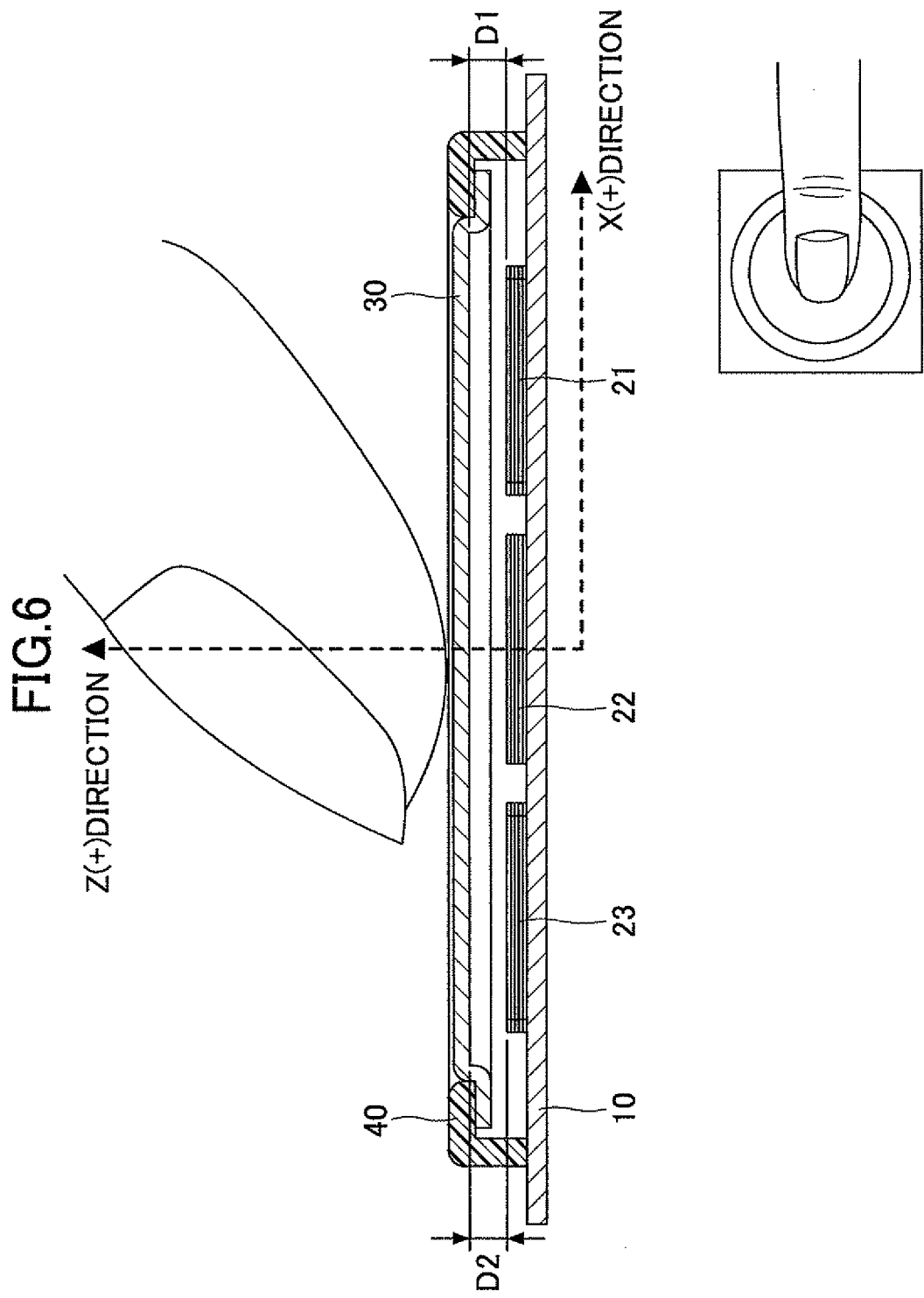
FIG. 6 is a cross-sectional view of the operation input apparatus 1 showing a state where the operator is placing a finger on the key 30.
Figure 7:
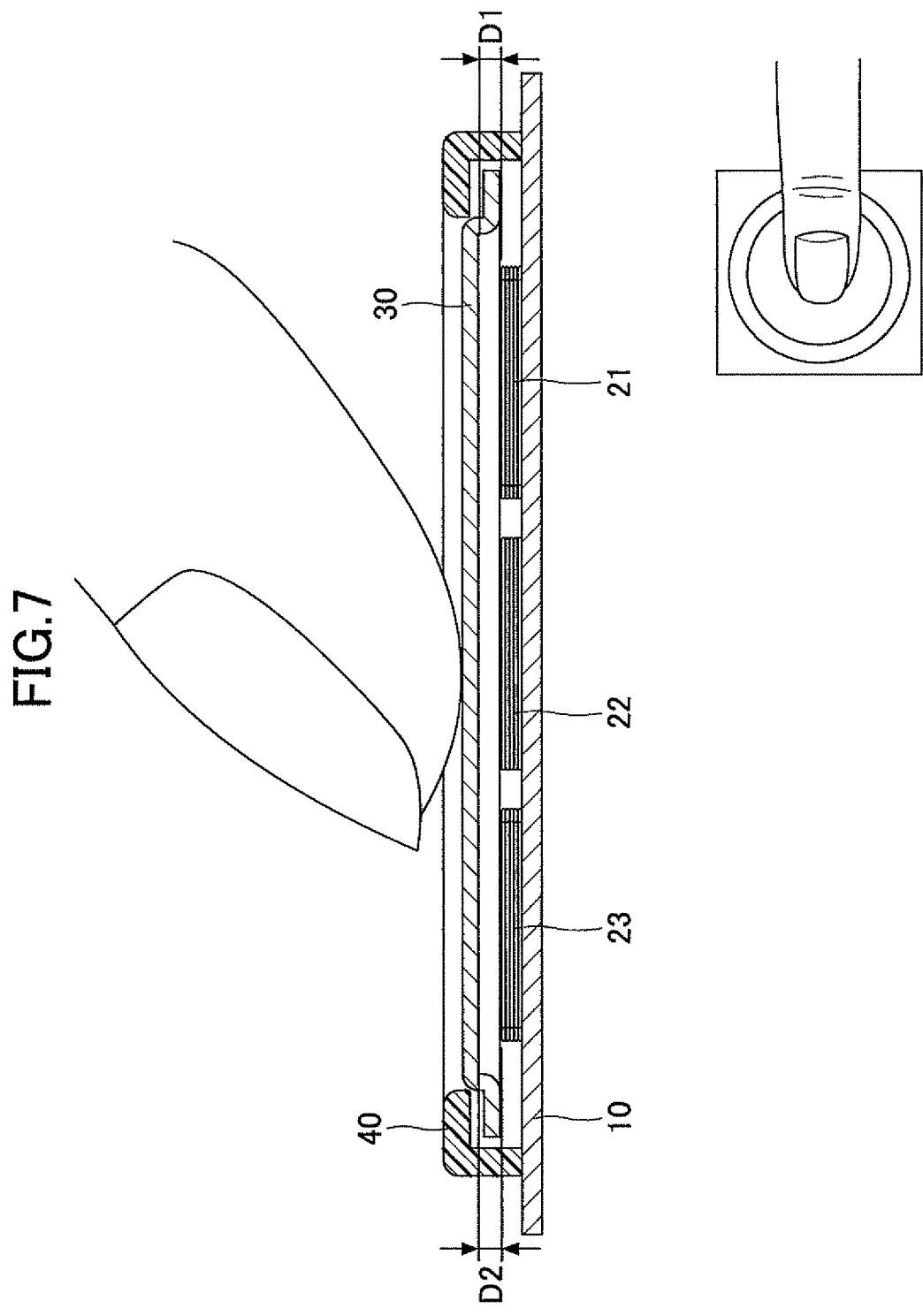
FIG. 7 is a cross-sectional view of the operation input apparatus 1 showing a state where the center of the key 30 is pressed.
Figure 8:
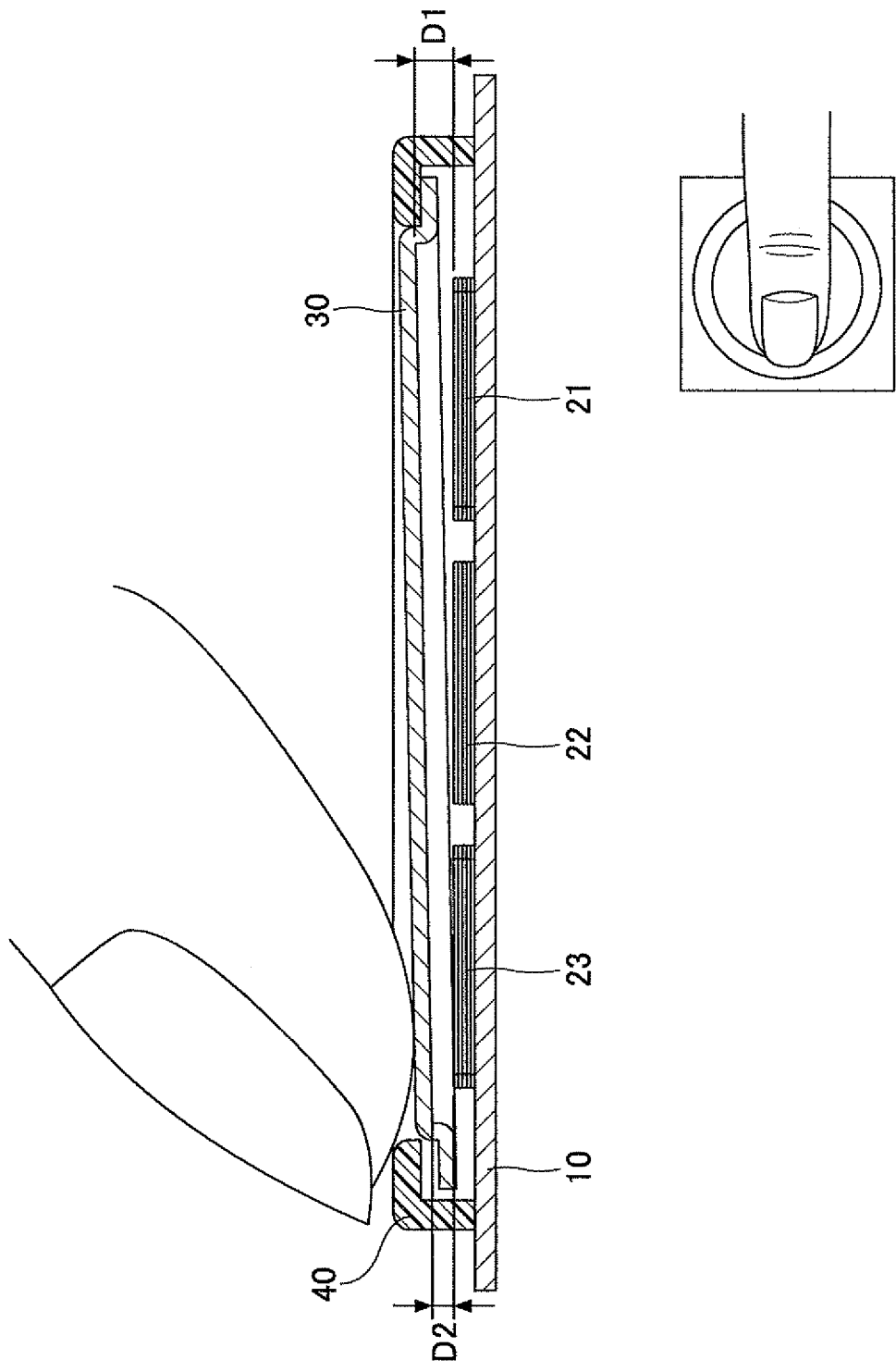
FIG. 8 is a cross-sectional view of the operation input apparatus 1 showing a state where a position of the X(−) direction of the key 30 is pressed.

FIG. 6, FIG. 7, and FIG. 8 are diagrams for illustrating states of the operation input apparatus 1 at the time of the operator operating the operation input apparatus 1. In each of FIG. 6, FIG. 7, and FIG. 8, the lower right portion shows the position of a finger on the operation surface of the key 30.

FIG. 6 shows a state where the operator is placing a finger on the operation surface, which is the backside of the key 30, without applying force. There is no change in the inductance of each of the coils 21~24 in the standby state of FIG. 6 where there is no downward pressing of the key 30 with a finger of the operator.

FIG. 7 shows a state where a center portion of the operation surface of the key 30 is pressed. In the state of FIG. 7, the distances between the key 30 and the coils 21~24 (indicated by D1 and D2 in FIG. 7) are reduced so that the inductance of each of the coils 21~24 increases. The distance D1 indicates a distance in the Z axial direction on the X(+) direction side, which is the positive side of the X axis. The distance D2 indicates a distance in the Z axial direction on the X(−) direction side, which is the negative side of the X axis. The amount of pressing of the key 30 at a position in the X directions may be detected based on the difference between the inductance of the coil 21 and the inductance of the coil 23. The amount of pressing of the key 30 at a position in the Y directions may be detected based on the difference between the inductance of the coil 22 and the inductance of the coil 24. These amounts of pressing may be detected as analog values. In the state of FIG. 7, the differences of inductance between the X directions and the Y directions, which are zero or less than or equal to a preset detection threshold, are determined to be zero. However, by also calculating the sum of the inductances of the coils 21~24 at the same time, it is possible to detect the pressing of the center portion of the operation surface of the key 30 on the Z axis. The amount of pressing of the key 30 with the center portion of its operation surface being pressed may also be detected as an analog value.

FIG. 8 shows a state where the key 30 is pressed on the X(−) direction side (D2<D1). In the state of FIG. 8, it is possible to detect the presence of the point of application of pressing at a position in the X(−) direction on the operation surface of the key 30 based on the difference between the inductance of the coil 21 and the inductance of the coil 23.

A description is given, with reference to FIG. 9 through FIG. 15, of a method of calculating a direction in which a force is input relative to the origin O (a position of input on the XY plane) and the magnitude of the force (the amount of pressing in the Z axial direction). The operation input detection apparatus (refer to FIG. 15, for example, details of which will be described later) calculates the position of input of a force in the XY plane and the amount of pressing in the Z axial direction based on evaluation values representing a change in the X directional component and a change in the Y directional component, respectively, of inductance.

Figure 9:
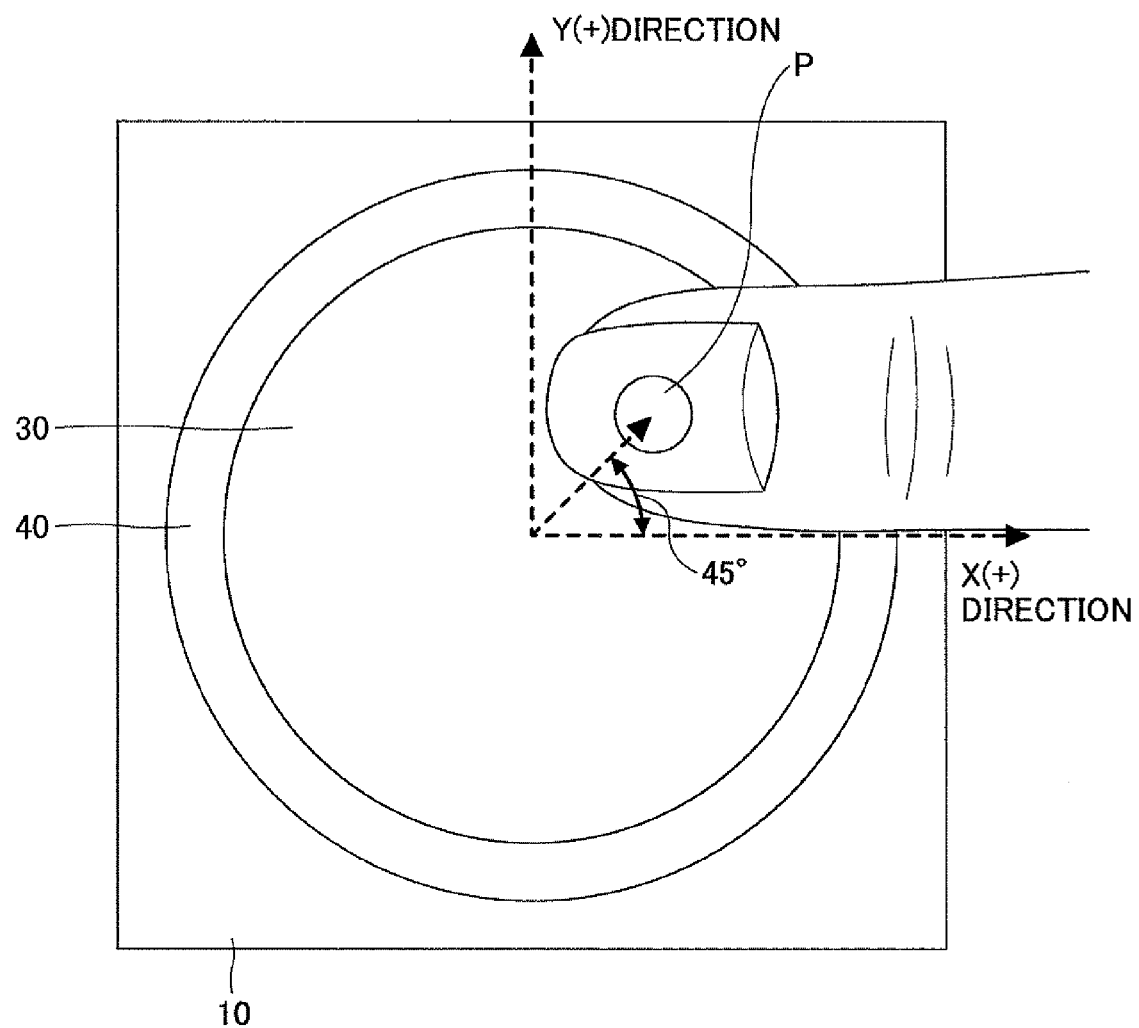
FIG. 9 is a plan view of the operation input apparatus 1 in which a finger is put on a position of 45° direction of the XY plane.

As shown in FIG. 9, in the case of operating the key 30 by pressing a position P (a point of force application on the operation surface of the key 30) in a direction of 45° in the XY plane with a finger, a change (difference) in inductance is caused in each of the X directional component and the Y directional component.

It is possible to increase calculation accuracy and reduce calculation time by correcting or normalizing in advance the amount of change of inductance due to application of the operator's force. Therefore, the inductances of the four coils 21~24 in the state where there is no pressing in any direction in the XY plane (standby state) and in the state of a full stroke are prestored in a memory. The inductances stored in the memory may be values preset based on design values or values actually measured at the time of manufacturing, or may be measured based on an instruction signal from a user at the time of use by the user. Further, the maximum value of each inductance during use may be learned. Detected values of inductance vary between the minimum value in the standby state and the maximum value in the full-stroke state thus obtained. In measuring inductance in each direction in the XY plane, the inductance may be evaluated on a coil-by-coil basis or a difference in inductance between opposed two of the coils may be evaluated. The amount of change in inductance of each of the coils in response to pressing by the operator is corrected or normalized using these minimum and maximum values.

A description is given of a calculation for detecting the direction of pressing (a position at which pressing is performed) and the amount of pressing in the XY plane, taking, as an example, a case where pressing is performed with both components in the X(+) direction and the Y(+) direction as shown in FIG. 9.

The amount of change in the X directional component of inductance is detected based on an X directional difference value, which is a difference between the corrected or normalized amount of change in inductance of the coil 21 placed in the X(+) direction and the corrected or normalized amount of change in inductance of the coil 23 placed in the X(−) direction. Likewise, the amount of change in the Y directional component of inductance is detected based on a Y directional difference value, which is a difference between the corrected or normalized amount of change in inductance of the coil 22 placed in the Y(+) direction and the corrected or normalized amount of change in inductance of the coil 24 placed in the Y(−) direction. That is, the X directional difference value corresponds to the evaluation value representing the amount of change in the X directional component of inductance, and the Y directional difference value corresponds to the evaluation value representing the amount of change in the Y directional component of inductance.

Figure 10:
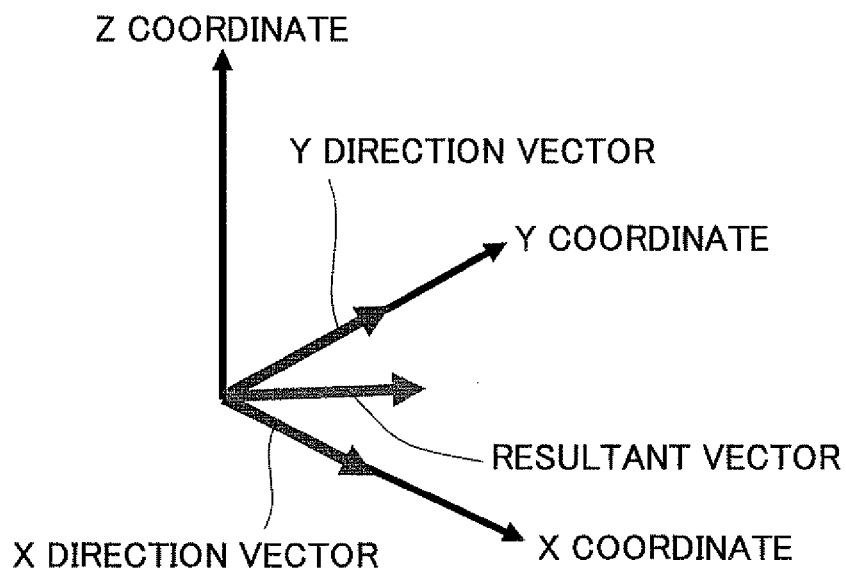
FIG. 10 is a diagram of a vector in the XYZ space.
Figure 11:
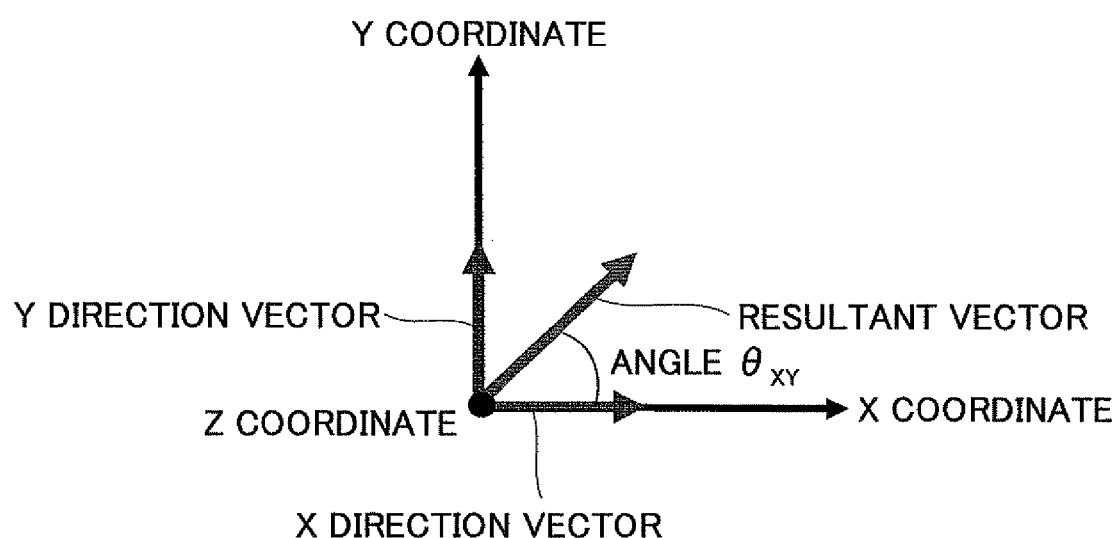
FIG. 11 is a diagram of a vector in the XY plane.

For example, it is assumed that the X directional difference value is calculated to be 0.5 and the Y directional difference value is calculated to be 0.5 in the state of FIG. 9 in the case where the above-described correction or normalization is performed such that the maximum value of the X directional difference value and the maximum value of the Y directional difference value are both 1. These two evaluation values are determined as an X coordinate vector and a Y coordinate vector. Then, as shown in FIG. 10, a vector resulting from the composition of the two vectors is calculated in the XY plane. As shown in FIG. 11, the angle formed by this resultant vector in the XY plane with respect to a reference direction (for example, the X axis direction) is determined as $\Theta_{XY}$. That is, the vector length of the resultant vector corresponds to the amount of pressing, and the vector angle $\Theta_{XY}$ corresponds to the direction of input force.

In the case of this example, the vector length of the resultant vector is 0.707 ($=\sqrt{(0.5^2+0.5^2)}$), and the vector angle $\Theta_{XY}$ is 45° ($=\tan^{-1}(0.5/0.5)$). A method like this makes it possible to detect all 360° directions and to detect the amount of pressing. Further, it is possible to detect pressing in the Z axial direction by calculating the sum of the inductances and determining the sum as an evaluation value for the amount of pressing of the entire key 30 in order to detect the case of pressing in the Z axial direction.

Figure 12:
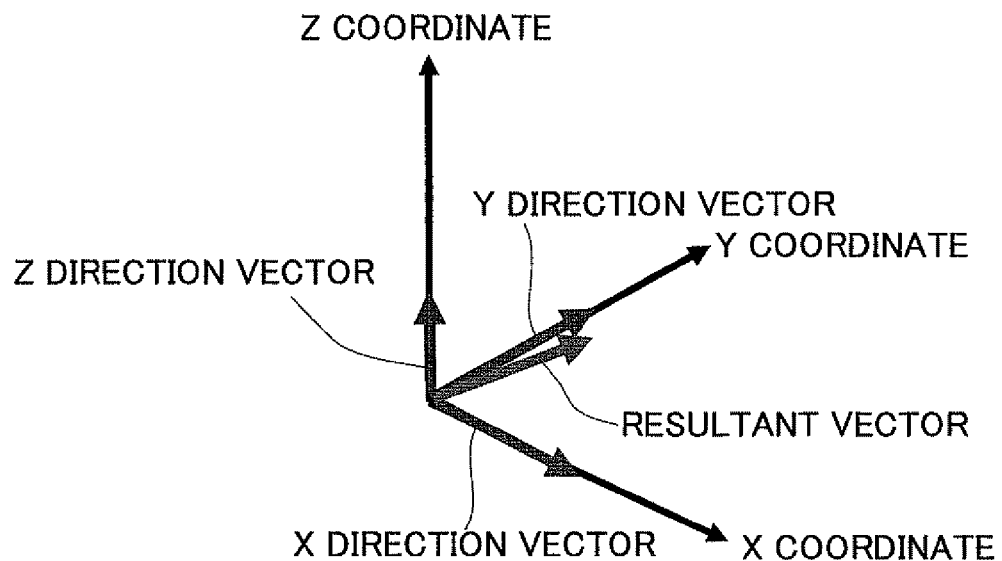
FIG. 12 is a diagram of a vector in the XYZ space.
Figure 13:
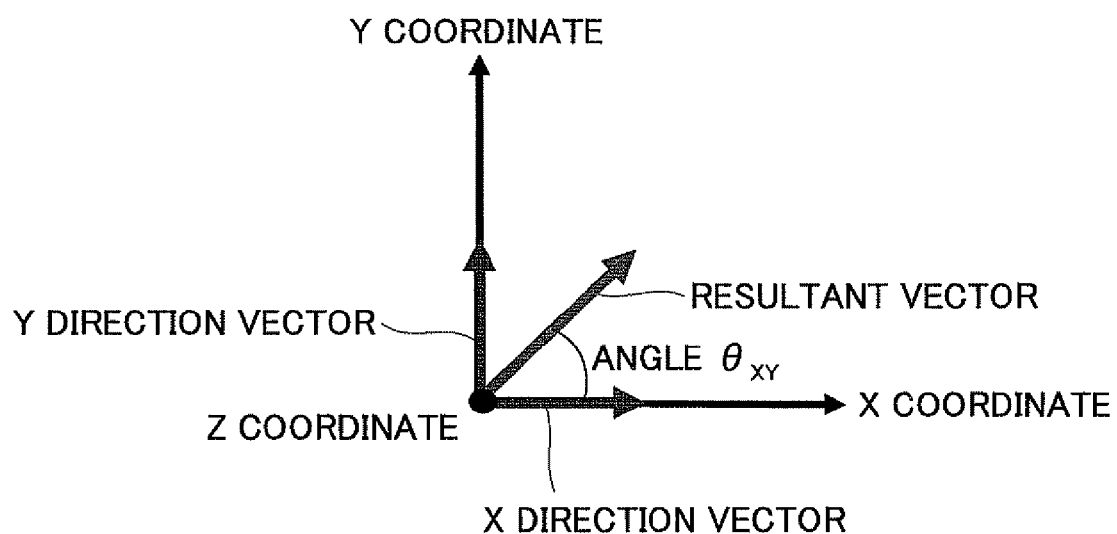
FIG. 13 is a diagram of a vector in the XY plane.
Figure 14:
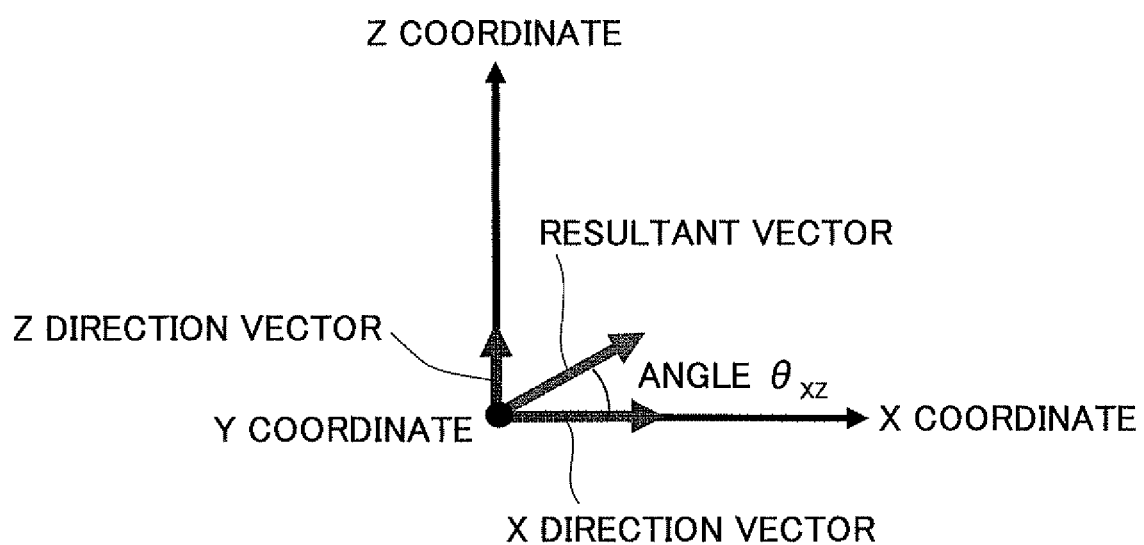
FIG. 14 is a diagram of a vector in the XY plane.

Next, another example is described of a calculation method for calculating the input direction (input position on the XY plane) of a force relative to the origin O and the magnitude of the force. Processing until detection of inductance of each direction is the same as the above-mentioned example of the calculation method. As shown in FIG. 12, the vector in the Z axial direction is obtained from the sum of inductances of the coils so that the sum is determined to be the vector component in the Z axial direction in the XYZ space. The resultant vector is evaluated in the XYZ space.

For example, in the case where the above-described correction or normalization is performed so that the maximum value of the X directional difference value and the maximum value of the Y directional difference value are both 1, since the sum of the inductances of the four coils at the time of full stroke is 4, the evaluation value in the Z axial direction is normalized by calculating ¼ of the sum of the inductances. The X directional difference value is calculated to be 0.5 and the Y directional difference value is calculated to be 0.5 in the state of FIG. 9. Since the sum of the Z direction is 1, it is normalized to 0.25 which is ¼ of 1. These three evaluation values are determined to be vectors of each coordinate. Then, as shown in FIG. 12, a vector resulting from the composition of the three vectors is calculated in the XYZ space. A direction of input by a finger can be obtained as an angle $\Theta_{XY}$ of a resultant vector obtained by projecting a three-direction resultant vector onto the XY plane (refer to FIG. 13). The amount of pressing is evaluated by the vector length of the resultant vector in the three axial space. Also, the amount of pressing of the whole of the key 30 is evaluated by an angle $\Theta_{XZ}$ of a resultant vector obtained by projecting the three-direction resultant vector onto the XZ plane.

Figure 15:
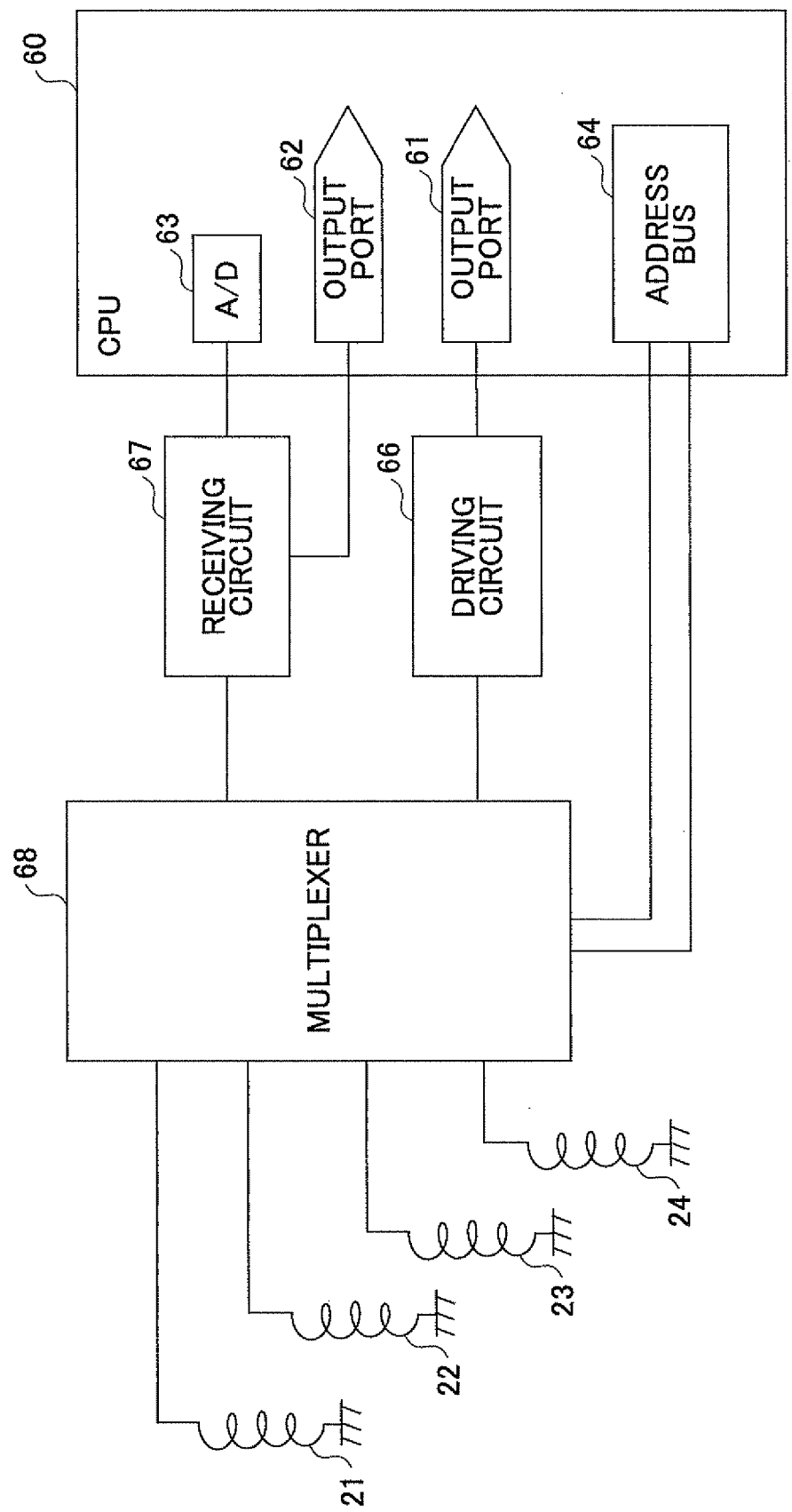
FIG. 15 is a block diagram illustrating a first detection circuit example configured to detect a change of inductance.

FIG. 15 is a block diagram illustrating a first detection circuit example configured to detect a change in inductance. The inductance detection circuit is a calculation part configured to detect a change in inductance of each of the coils 21~24. The inductance detection circuit includes a CPU 60, which is a computation part, a driving circuit 66 connected to a first output port 61 of the CPU 60, a multiplexer (MUX) 68 connected to first ends of the coils 21~24, whose second ends are grounded, and a receiving circuit 67, which is connected to a second output port 62 and an A/D port 63 of the CPU 60. The multiplexer 68 connects the coils 21~24 on the board 10 to the CPU 60 through the shared receiving circuit 67 and driving circuit 66. The connection destination of the multiplexer 68 is uniquely selected by addressing from the CPU 60 through an address bus 64. Accordingly, the inductances of the coils are detected sequentially at different detection times on a coil-by-coil basis.

Figure 16:
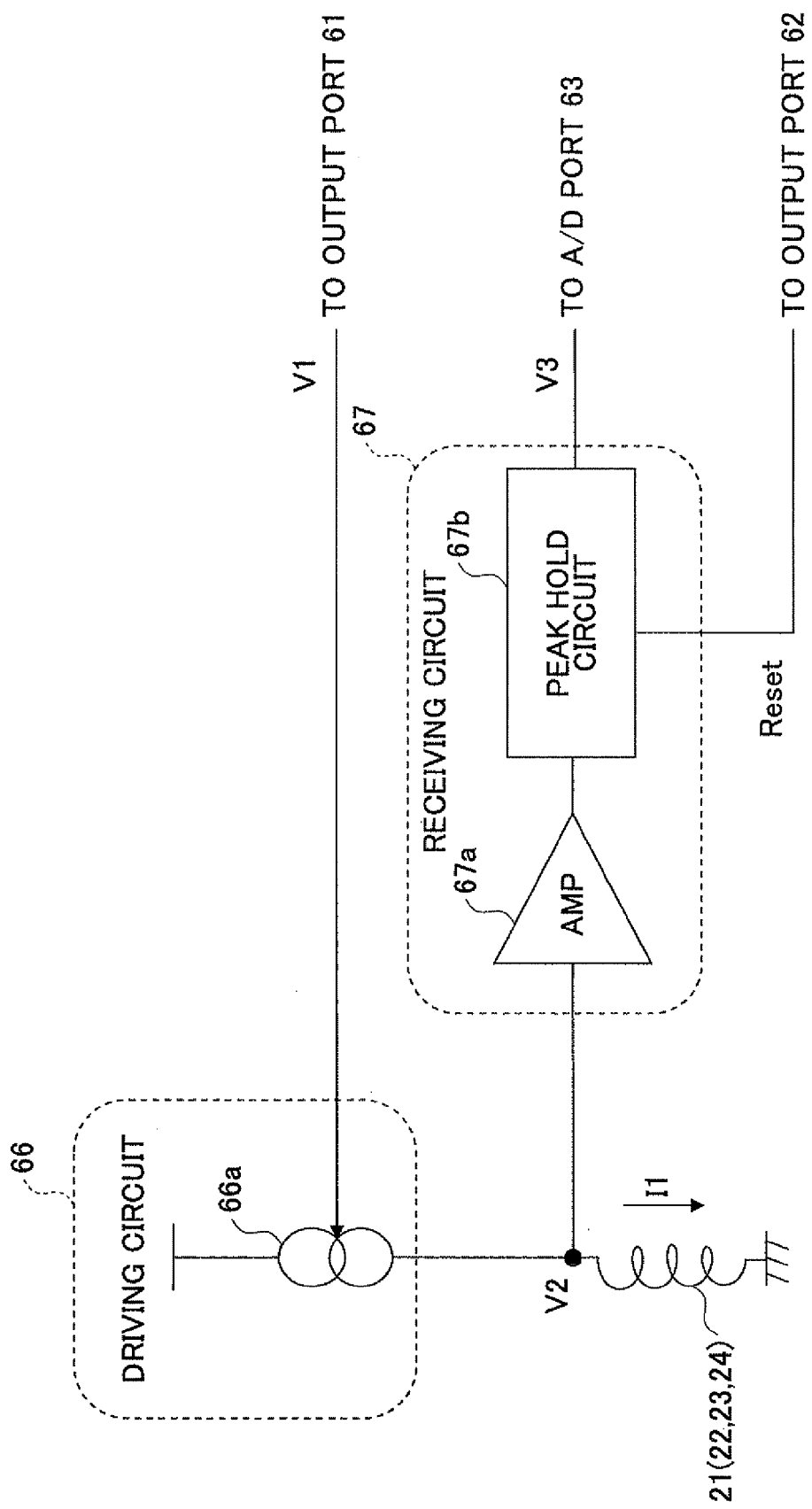
FIG. 16 is a block diagram of the driving circuit 66 and the receiving circuit 67.

FIG. 16 is a block diagram of the driving circuit 66 and the receiving circuit 67 in FIG. 15. The driving circuit 66 is configured to cause electric current to flow through each of the coils 21~24 by controlling the output current of a constant current source 66a in accordance with an output signal from the output port 61 of the CPU 60. The receiving circuit 67 inputs the voltage generated as a result of causing electric current to flow through each of the coils 21~24 to a peak hold circuit 67b, which may be replaced with a bottom hold circuit, through an amplifier 67a. A peak value (analog value) held by the peak hold circuit 67b is input to the A/D port 63 to be converted into a digital value by an A/D converter.

Figure 17:
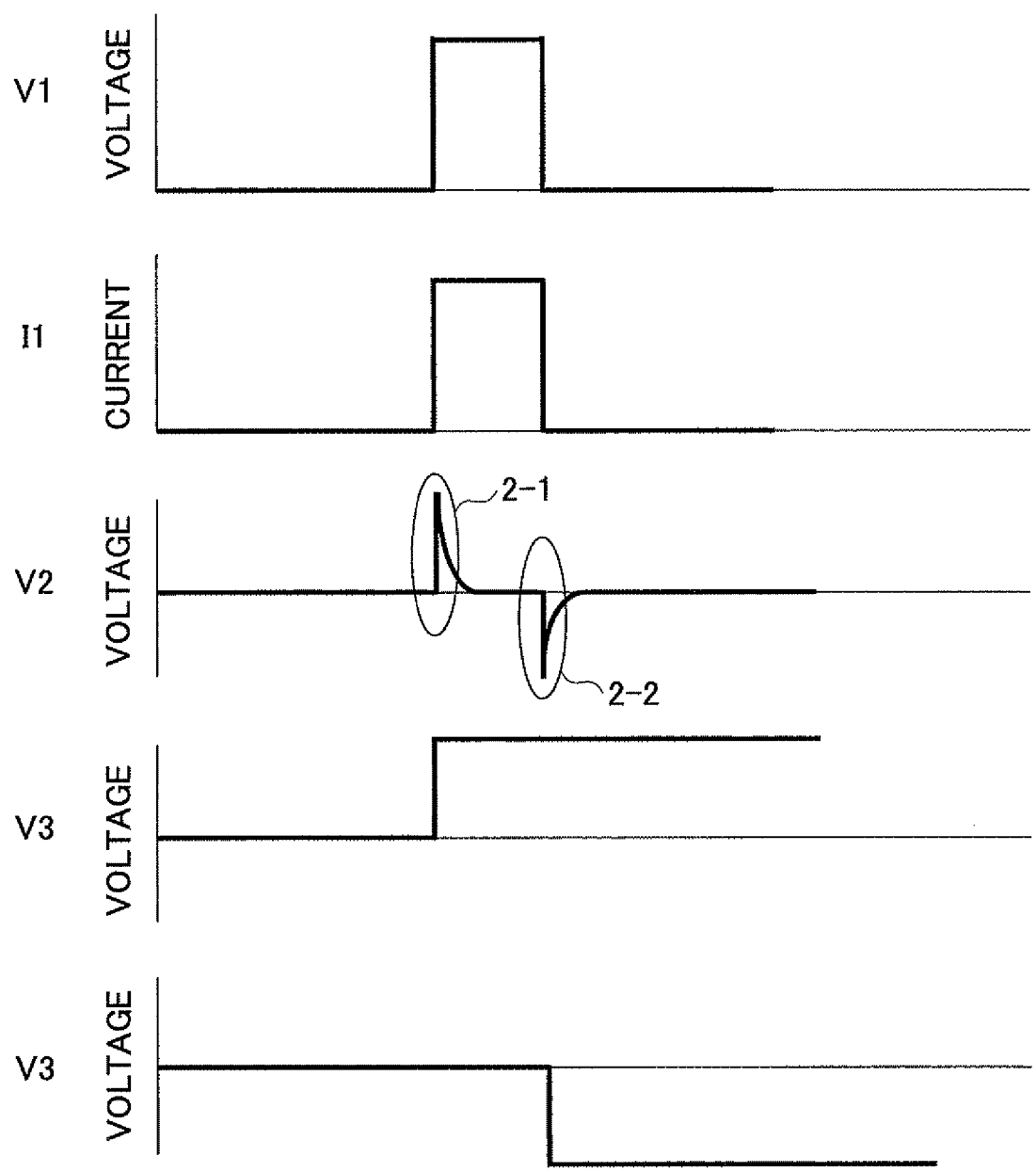
FIG. 17 is a diagram illustrating waveforms at respective points in FIG. 16.

FIG. 17 is a diagram illustrating waveforms at respective points in FIG. 16. A voltage waveform of a square wave is output from the output port 61 of the CPU 60. This voltage causes the constant current circuit 66a to cause a constant electric current to flow through the coil. Thereby, the coil generates a voltage V2 of a differentiated waveform. As the voltage waveform V2, a waveform 2-1 synchronizing with the rise of the voltage waveform V1 and a waveform 2-2 synchronizing with the fall of the voltage waveform V1 are obtained. The waveform 2-2 is opposite in polarity to the waveform 2-1. The amplifier 67a amplifies the voltage waveform V2 to a size suitable for the dynamic range of the A/D converter. By performing peak holding or bottom holding on the voltage waveform V2, the held value is taken into the A/D converter (the A/D port 63). The amplitude values of the waveforms 2-1 and 2-2 increase in proportion to the magnitude of the inductance of the coil. Accordingly, by detecting the amplitude value, it is possible to evaluate the magnitude of the inductance of each of the coils.

Figure 18:
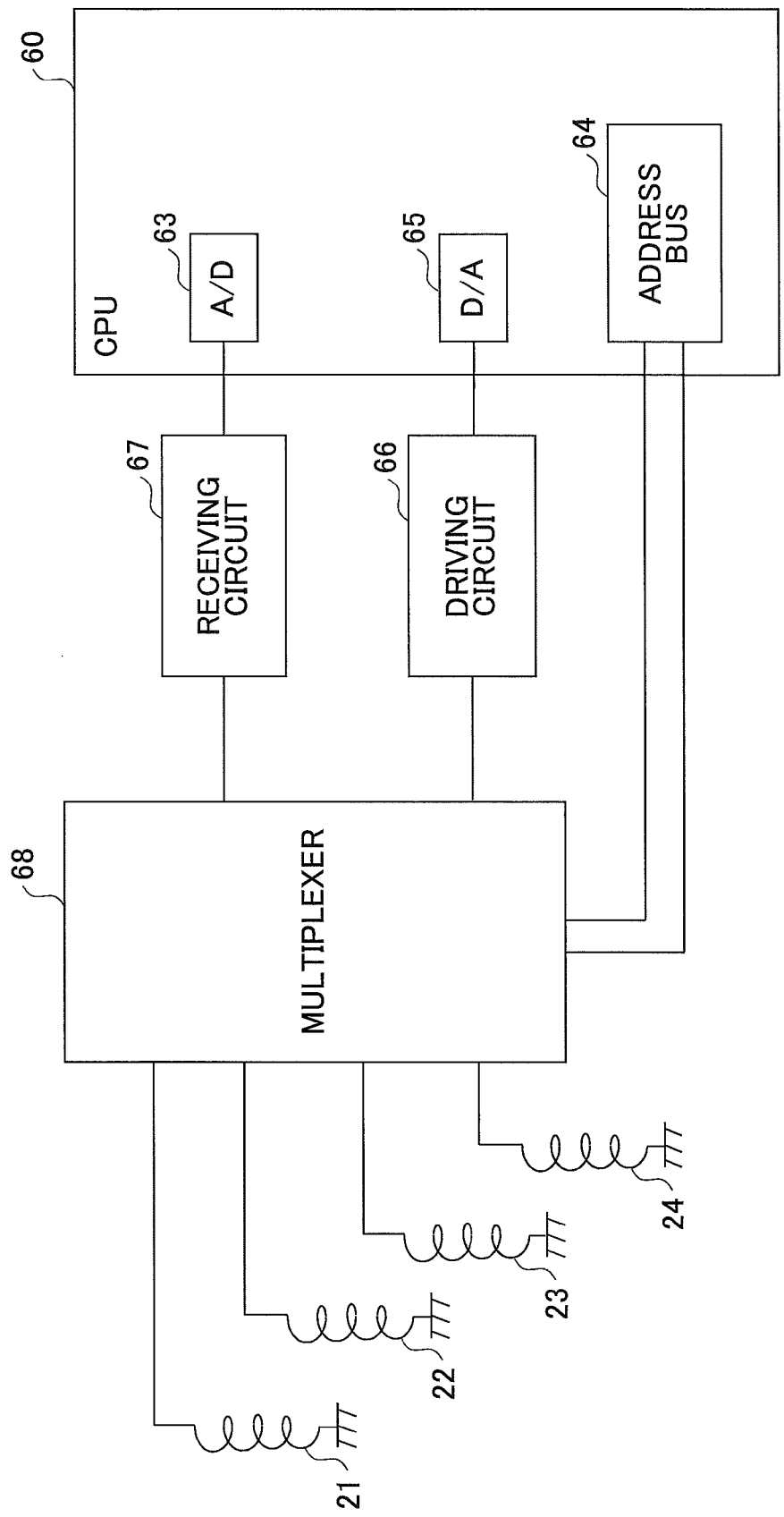
FIG. 18 is a block diagram illustrating a second detection circuit example configured to detect a change of inductance.

FIG. 18 is a block diagram illustrating a second detection circuit example configured to detect a change in inductance. The inductance detection circuit is a calculation part configured to detect a change in the inductance of each of the coils 21~24. The inductance detection circuit includes a CPU 60, which is a computation part, a driving circuit 66 connected to a DA port 65 of the CPU 60, a multiplexer (MUX) 68 connected to first ends of the coils 21~24, whose second ends are grounded, and a receiving circuit 67, which is connected to an AD port 63. The multiplexer 68 connects the coils on the board 10 to the CPU 60 through the shared receiving circuit 67 and driving circuit 66. The connection destination of the multiplexer 68 is uniquely selected by addressing from the CPU 60 through an address bus 64. Accordingly, the inductances of the coils are detected sequentially at different detection times on a coil-by-coil basis.

Figure 19:
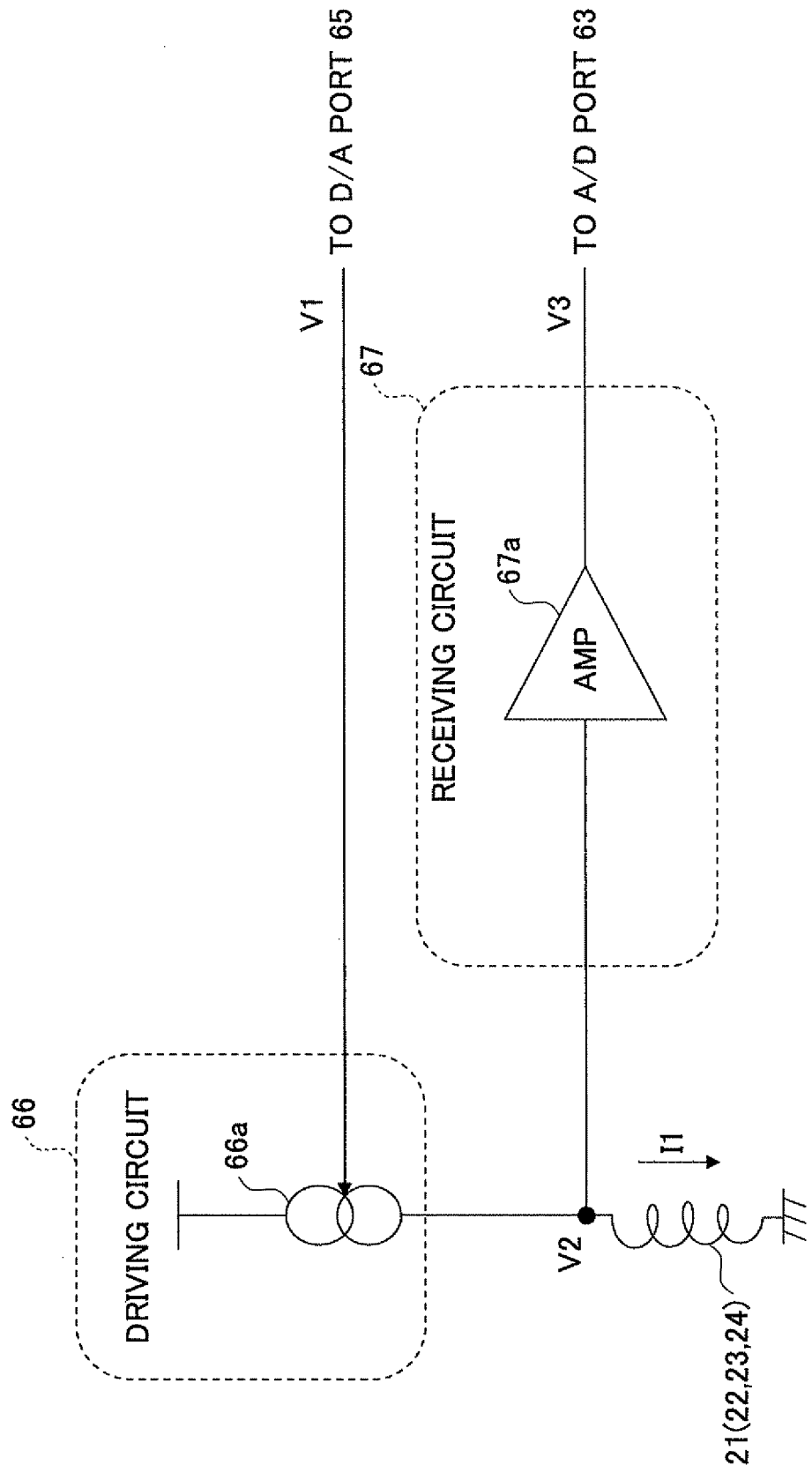
FIG. 19 is a block diagram of the driving circuit 66 and the receiving circuit 67.

FIG. 19 is a block diagram of the driving circuit 66 and the receiving circuit 67 in FIG. 18. The driving circuit 66 is configured to cause electric to flow through each of the coils 21~24 by controlling the output current of a constant current source 66a in accordance with an output signal from the DA port 65 of the CPU 60. The receiving circuit 67 inputs the voltage generated as a result of causing electric current to flow through the coils to the AD port 63 through the amplifier 67*a*. The analog value input to the AD port 63 is converted into a digital value by an A/D converter.

Figure 20:
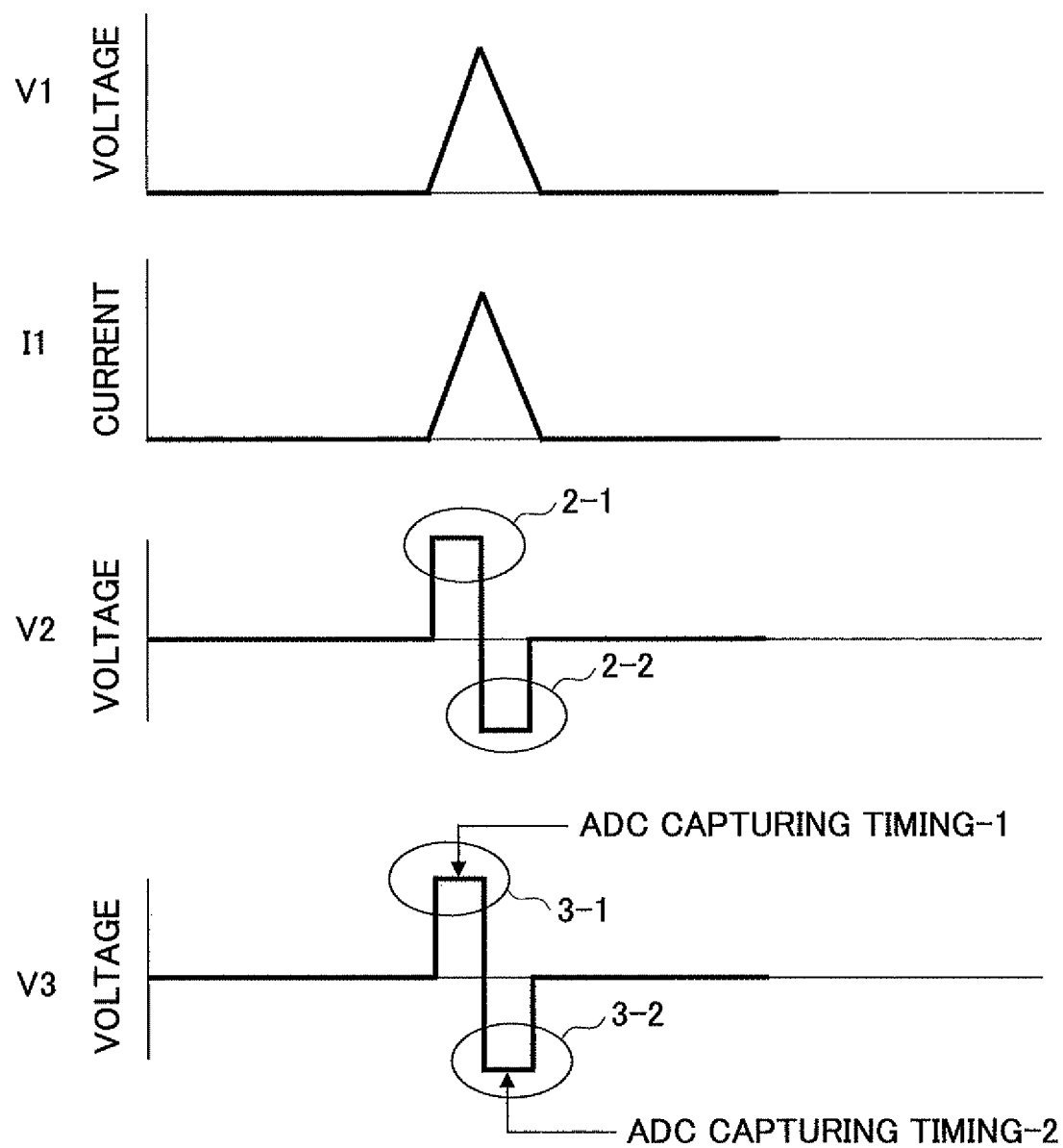
FIG. 20 is a diagram illustrating waveforms at respective points in FIG. 19.

FIG. 20 is a diagram illustrating waveforms at respective points in FIG. 19. A voltage waveform of a triangle wave is output from the DA port 65 of the CPU 60. In the triangle wave, the slope of the rising edge is constant (that is, the rising edge is a straight line). In this example, slopes of the rising and falling edges are the same. This voltage causes the constant current circuit 66*a* to flow a current I1 that increases as the voltage V1 increases and that decreases as the voltage V1 decreases. Thereby, the coil generates a voltage V2 that is a differentiation of the waveform of the current I2. Since V1 increases and decreases linearly, the waveform of V2 becomes a rectangular wave including constant voltage sections corresponding to increase and decrease of V2 respectively. As the output waveform V2, a voltage 2-1 corresponding to the rise of the triangle wave is obtained, and a voltage 2-2 corresponding to the fall of the triangle wave is obtained. The waveform 2-2 is opposite in polarity to the waveform 2-1. The amplifier 67*a* amplifies the voltage waveform V2 to a size suitable for the dynamic range of the A/D converter. The A/D converter takes in the amplitude value of the voltage waveform V3 in a period in which the voltage of the voltage waveform V3 is constant at synchronization timing based on driving output timing. The amplitude values of the waveforms 3-1 and 3-2 increase in proportion to the magnitude of the inductance of each coil. Accordingly, by detecting the amplitude value, it is possible to evaluate the magnitude of the inductance of each of the coils.

Also, if the current I1 shown in FIG. 17 flows while the inductance is changing, a voltage V2 having a slope is generated in the constant voltage section of V2 shown in FIG. 20. The voltage V2 having the slope may be held by the sample-hold circuit at synchronization timing based on the driving output timing, and the held value may be taken in by the A/D converter. Also, values in the periods of the waveforms 3-1 and 3-2 may be taken by the A/D converter, so that a value obtained by adding or averaging absolute values of the taken values may be used for evaluation of the size of the inductance.

Figure 21:
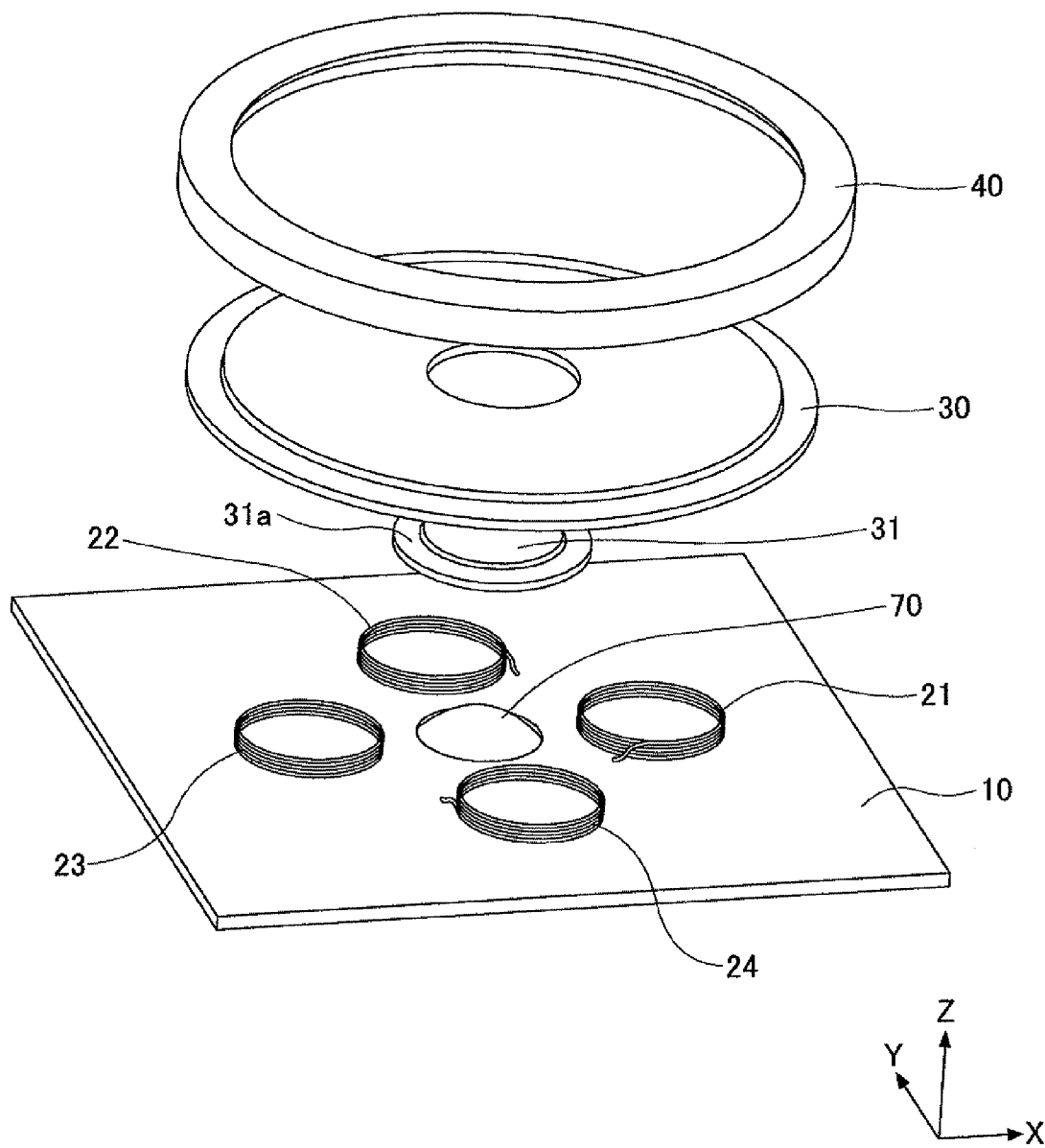
FIG. 21 is an exploded diagram of an operation input apparatus 2 which is a second embodiment of the present invention.
Figure 22:
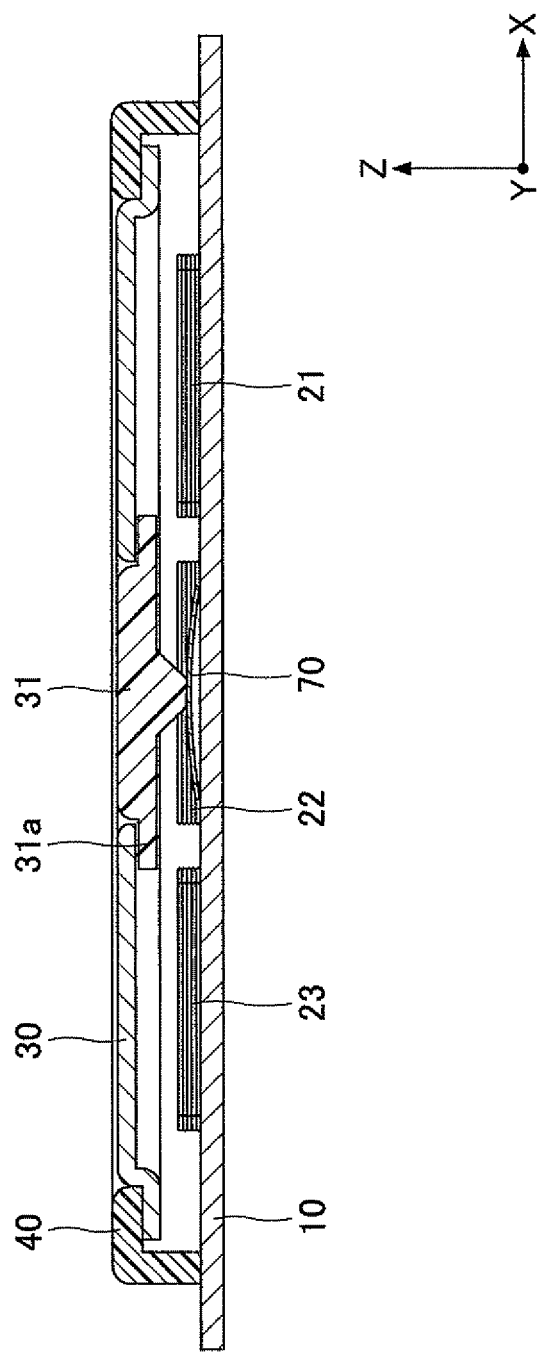
FIG. 22 is a cross-sectional view of the operation input apparatus 2.

FIG. 21 is an exploded view of an operation input apparatus 2, which is a second embodiment of the present invention. FIG. 22 is a cross-sectional view of the operation input apparatus 2. In these drawings, as to the same elements as those described in the above examples, a description thereof is omitted.

The operation input apparatus 2 includes a click spring 70 provided on the placement surface of the board 10 at its center portion on the Z axis surrounded by the coils 21~24. The click spring 70 is a dome-shaped elastic member configured to provide a feeling of clicking to the operator pressing the operation surface with a finger.

Further, the operation input apparatus 2 includes a center key 31 on the Z axis which is sandwiched and held between the key 30 and the click spring 70. The center key 31 is supported in contact with the click spring 70. This makes it possible to reduce the thickness of the operation input apparatus in the Z axial direction compared with the case where the center key 31 is supported without contacting the click spring 70. The center key 31 is a press part having a surface exposed on the operation surface of the key 30 on the Z axis.

The center key 31 is configured to deform the click spring 70 from the Z axis direction side in response to application of the operator's force on at least one of the operation surface of the key 30 and the exposed surface. The click spring 70 is deformed by the pressing of both the key 30 and the center key 31 downward due to the application of the operator's force on the operation surface. The click spring 70 is also deformed by the downward pressing of the center key 31 without the downward pressing of the key 30 due to the application of the operator's force on not the operation surface but the exposed surface. The center key 31 is positioned by being fit into a through hole open at both the operation surface and the opposed surface opposed to the placement surface of the board 10. The center key 31 may be circular, elliptical, or polygonal.

For example, the center key 31 includes a flange 31*a* formed at its edge. The flange 31*a* is a step part protruding like a brim at the edge of the center key 31. The center key 31 is held by being sandwiched between the opposed lower surface of the key 30 and the top of the click spring 70 with the flange 31*a* being in contact with the key 30 in the periphery of the center hole (through hole). The portion of the center key 31 that is fit into the center hole, which portion includes the exposed surface, is held by the center hole serving as a guide. The operator may touch the exposed surface. The operation surface of the key 30 and the exposed surface of the center key 31 in the standby state may be at the same position in the Z axial direction. Alternatively, the position of the operation surface may be closer to the board 10 than the position of the exposed surface in the Z axial direction. The operator's force is applied on the exposed surface of the center key 31 without being applied on the operation surface of the key 30, so that the position of the exposed surface moves in the direction in which the force is applied relative to the operation surface with the operation surface remaining at the same position in the Z axial direction.

Figure 23:
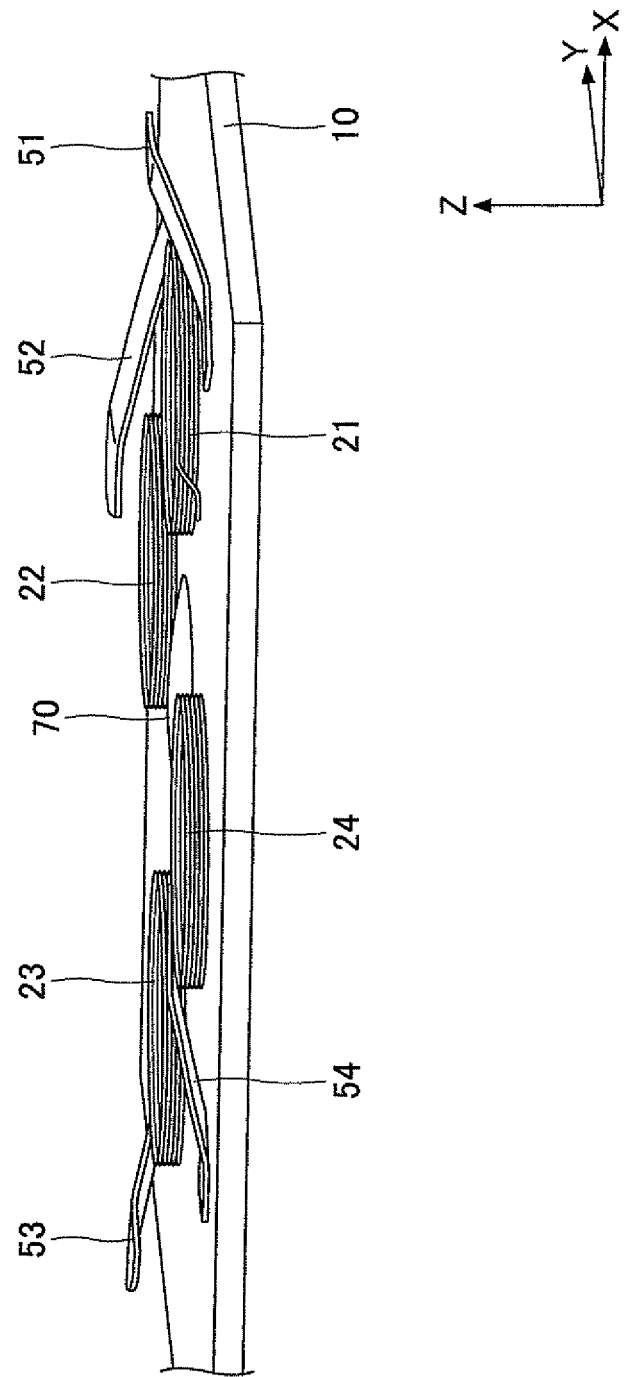
FIG. 23 is a placement diagram of return springs 51~54.

As shown in FIG. 23, return springs 51, 52, 53, and 54 may be provided on the placement surface of the board 10 outside the coils 21~24 for returning the key 30 back to a waiting position.

Figure 24:
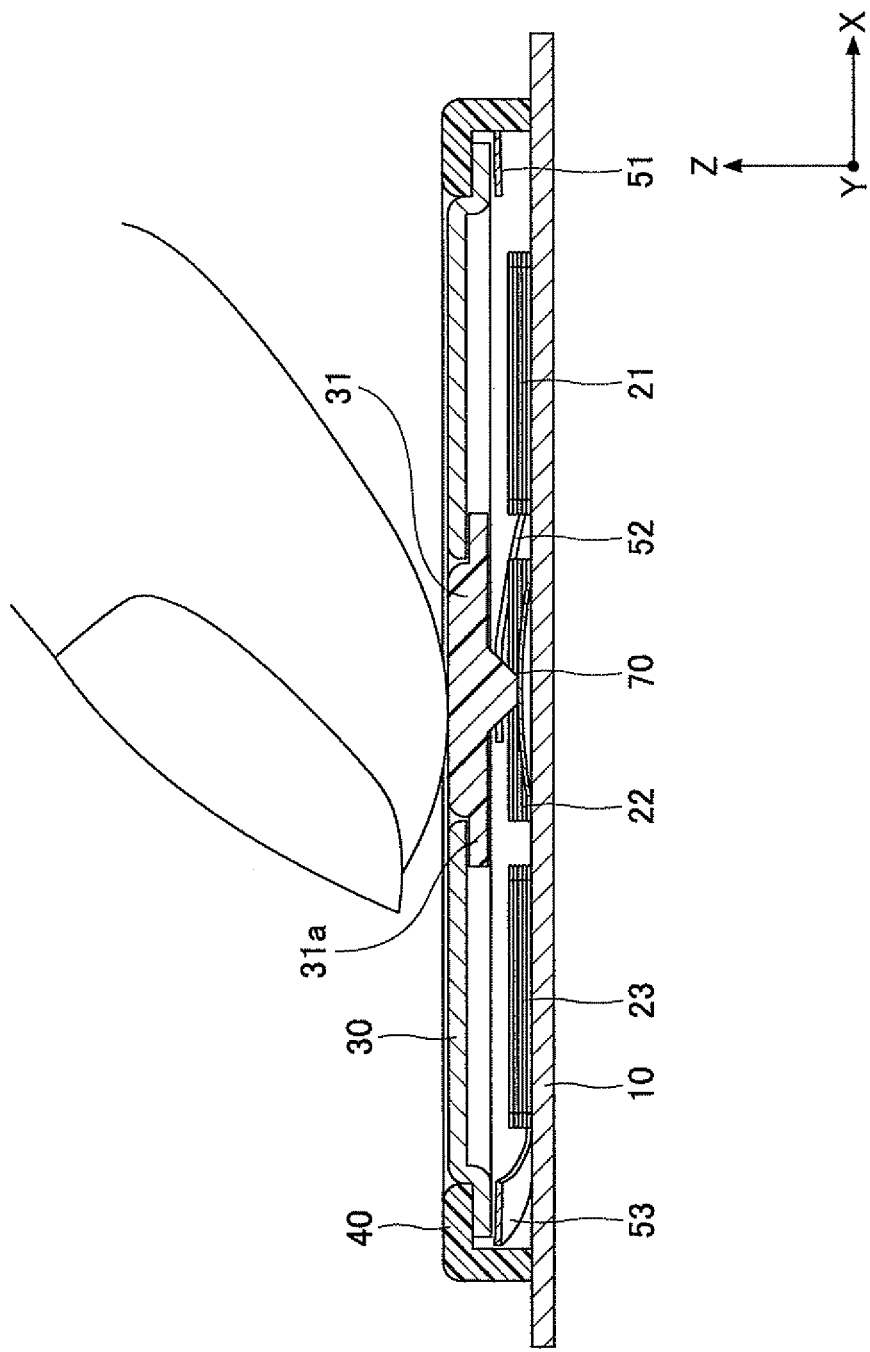
FIG. 24 is a cross-sectional view of the operation input apparatus 2 showing a state where the operator is placing a finger on the center key 30.
Figure 25:
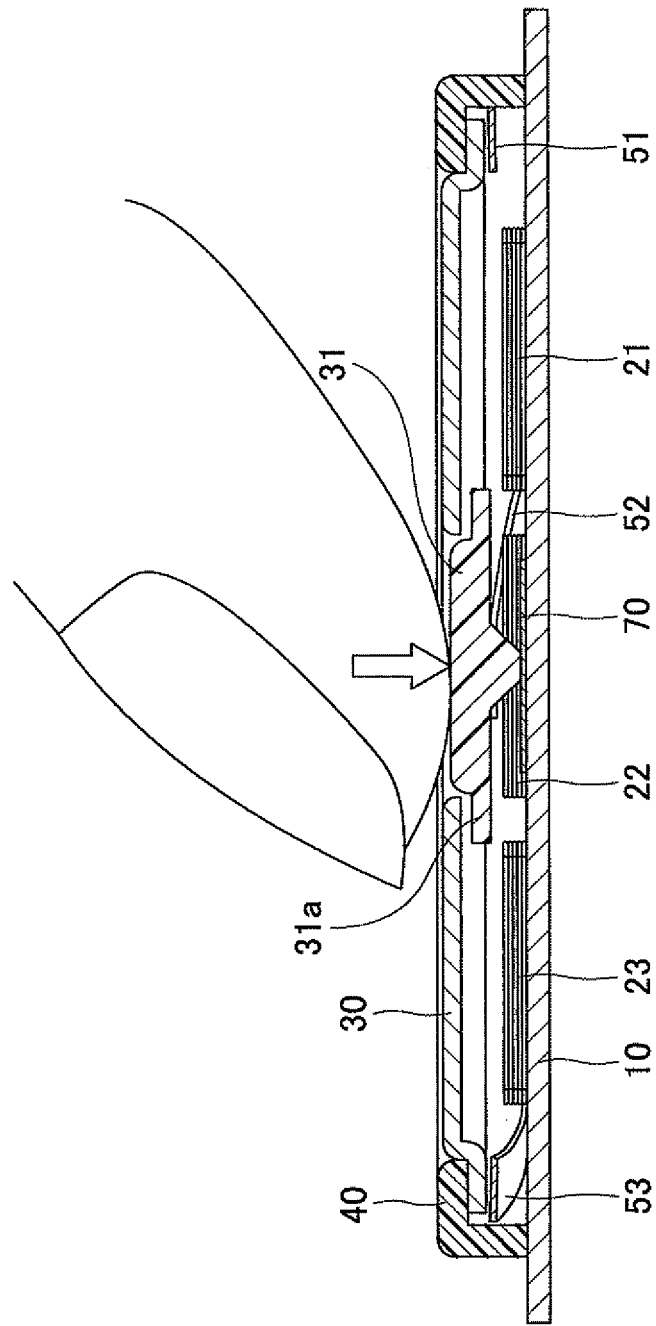
FIG. 25 is a cross-sectional view of the operation input apparatus 2 showing a state where the center of the center key 31 is pressed.
Figure 26:
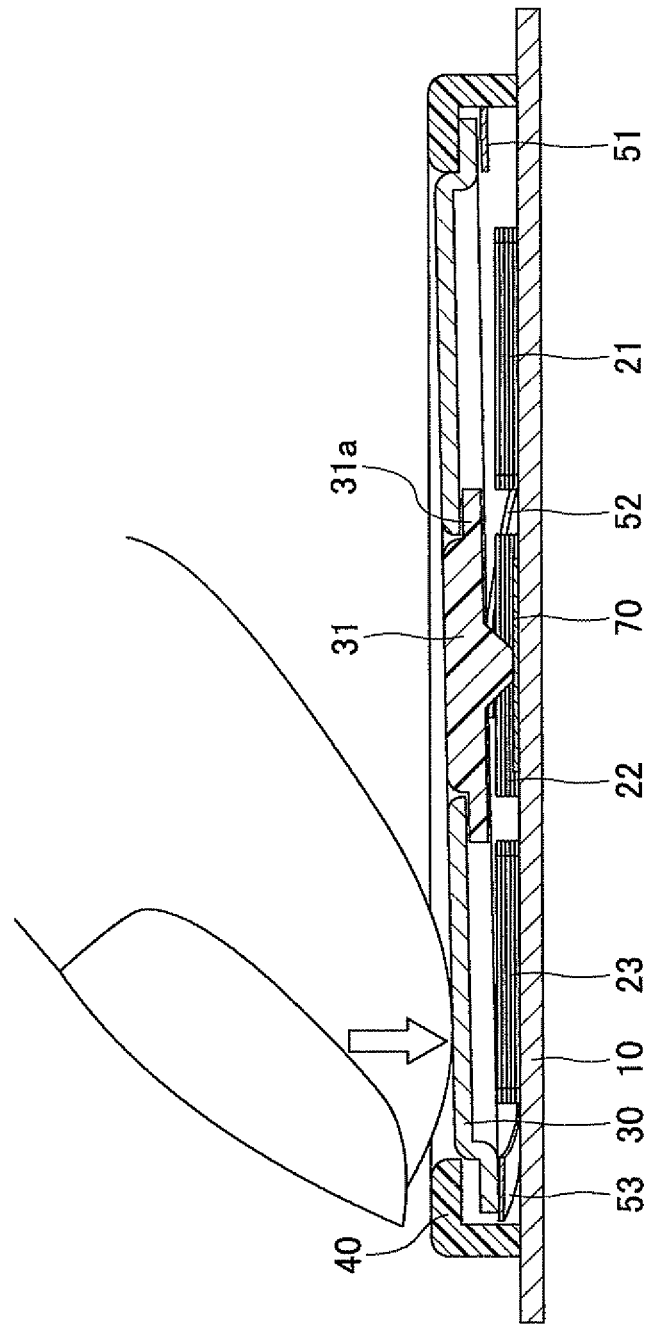
FIG. 26 is a cross-sectional view of the operation input apparatus 2 showing a state where a position of the X(−) direction of the center key 31 is pressed.

FIGS. 24 through 26 are diagrams for illustrating states of the operation input apparatus 2 when the operator operates the operation input apparatus 2.

In FIG. 24 and FIG. 25, the center key 31 is in contact with the top of the click spring 70 and is held at the center hole of the key 30. The key 30 is held by the return springs 51 through 54 to be prevented from falling downward. Therefore, pressing the center key 31 with a finger causes the center key 31 to move downward independently to deform the click spring 70, thereby a feeling of clicking is giving to the fingertip and contacts are closed as described later. That is, the click spring 70 operates as a switch.

In FIG. 26, pressing a portion of the key 30 around the hole, into which the center key 31 is fit, causes the key 30 to move downward while deforming the return springs. At this point, since the center key 31 includes the flange 31*a*, the center key 31 also moves downward in conjunction with the downward movement of the key 30. As the key 30 moves downward, as mentioned above, the key 30 having a function of a yoke member comes close to the coils, so that magnetic permeability and magnetic path length around the coils decrease. Thus, inductance increases. The detection circuit detects the change of the inductance. On the other hand, the center key 31 moving downward in conjunction with the key 30 causes the click spring 70 to deform, so that feeling of clicking is given to the fingertip, and the switch is caused to short circuit.

When the click spring 70 closes due to downward movement of the center key 31, a preset inductance at the time of closure may be compared with an actual inductance, so that the change in inductance due to the change of temperature and ambient environment can be recognized as a difference, and a detection value of inductance may be corrected using the difference.

Figure 27:
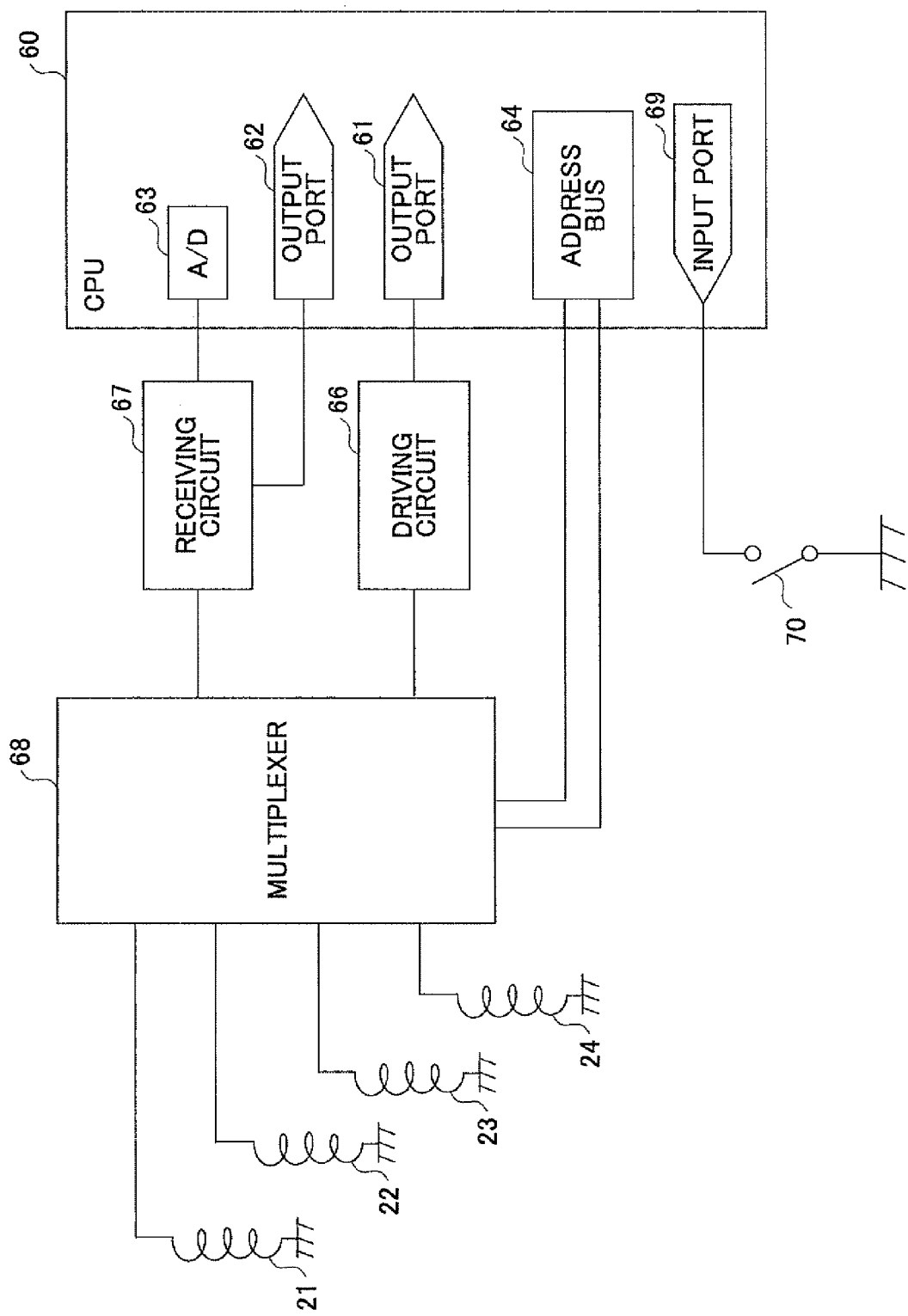
FIG. 27 is a block diagram illustrating a third detection circuit example configured to detect a change of inductance.

FIG. 27 is a block diagram illustrating a third detection circuit example configured to detect a change in inductance. The inductance detection circuit is a calculation part configured to detect a change in the inductance of each of the coils 21~24, and is a determining part configured to determine that an operator's force is input based on a deformation detection signal generated by the deformation of the click spring 70. An input port 69 for detecting switch closure by the click spring 70 is added to the CPU 60 of the first detection circuit shown in FIG. 15. The input port 69 may be also provided in the CPU 60 of the second detection circuit shown in FIG. 18.

Figure 28:
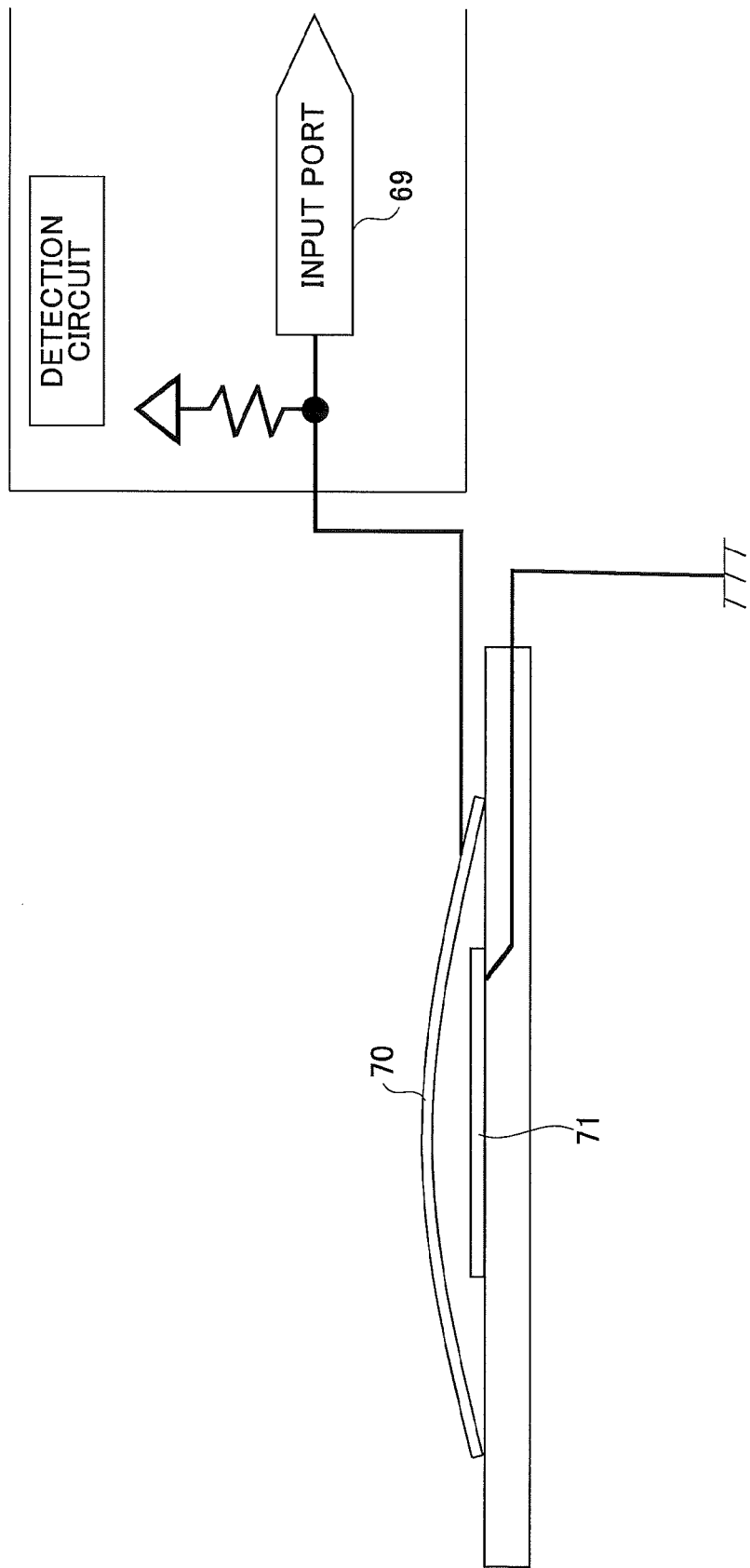
FIG. 28 shows a placement example of a click spring 70.
Figure 29:
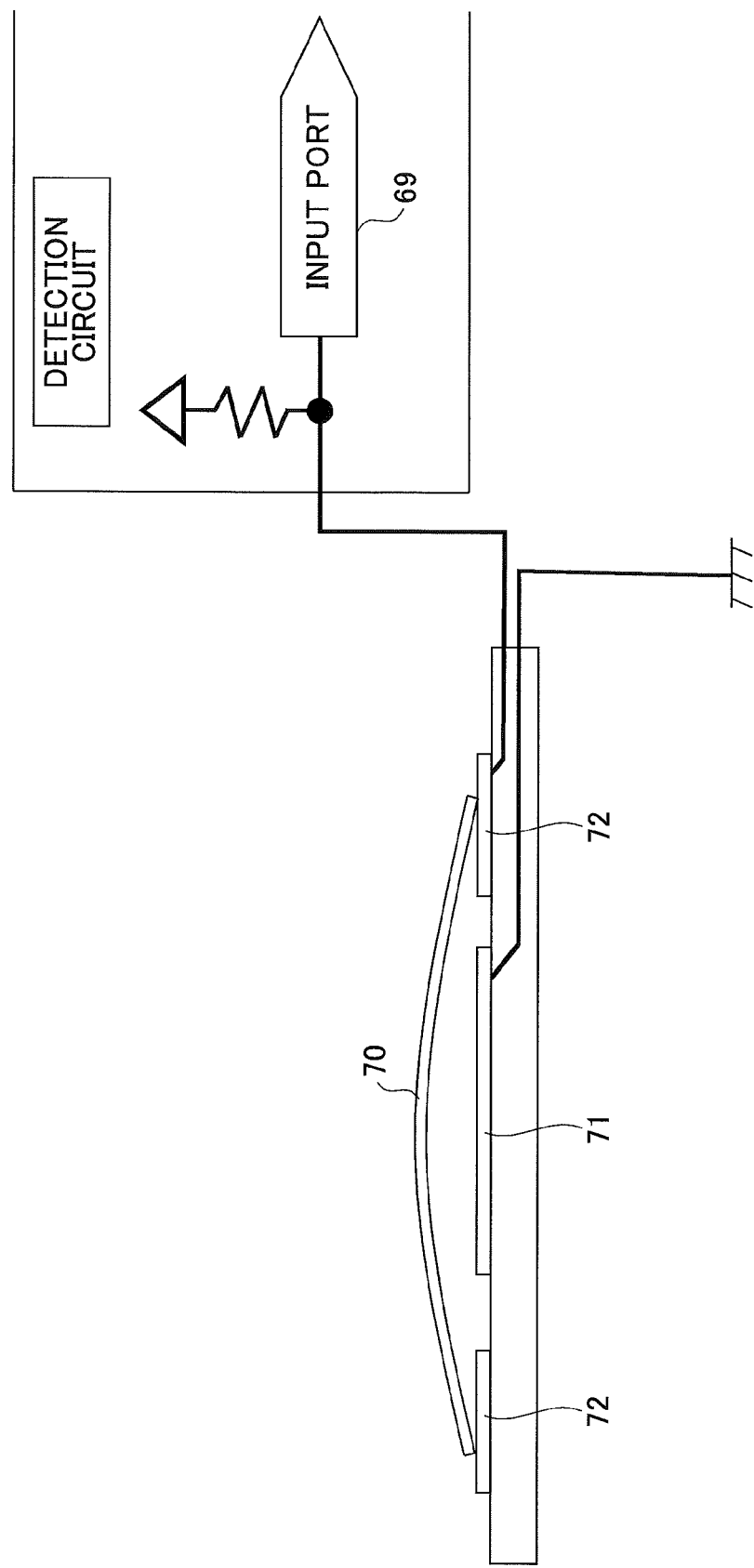
FIG. 29 shows a placement example of a click spring 70.

FIGS. 28 and 29 are diagrams illustrating the structure of the click spring 70. The operation input apparatus 3 includes a detection part configured to output the deformation detection signal generated due to deformation of the click spring 70. As the detection part, a contact part 71 is provided in the case of FIG. 28, and contact parts 71 and 72 are provided in the case of FIG. 29.

In FIG. 28, a contact part 71 that is a conductor such as a pattern is formed on the placement surface of the board 10. A conductor part such as a lead connected to the input port 69 and a pattern is connected to the click spring 70. A conductor part such as a lead connected to the ground and a pattern is connected to the contact part 71. The click spring 70 contacts the contact part 71 due to deformation when clicking.

In FIG. 29, contact parts 71 and 72 that are conductors such as patterns are formed on the placement surface of the board 10. The ring-shape contact part 72 is formed around the contact part 71 (refer to after-mentioned FIG. 45). A conductor part such as a lead connected to the input port 69 and a pattern is connected to the contact part 72. A conductor part such as a lead connected to the ground and a pattern is connected to the contact part 71. The click spring 70 causes the contact part 71 and the contact part 72 to be short-circuited by the deformation at the time of clicking.

Figure 30:
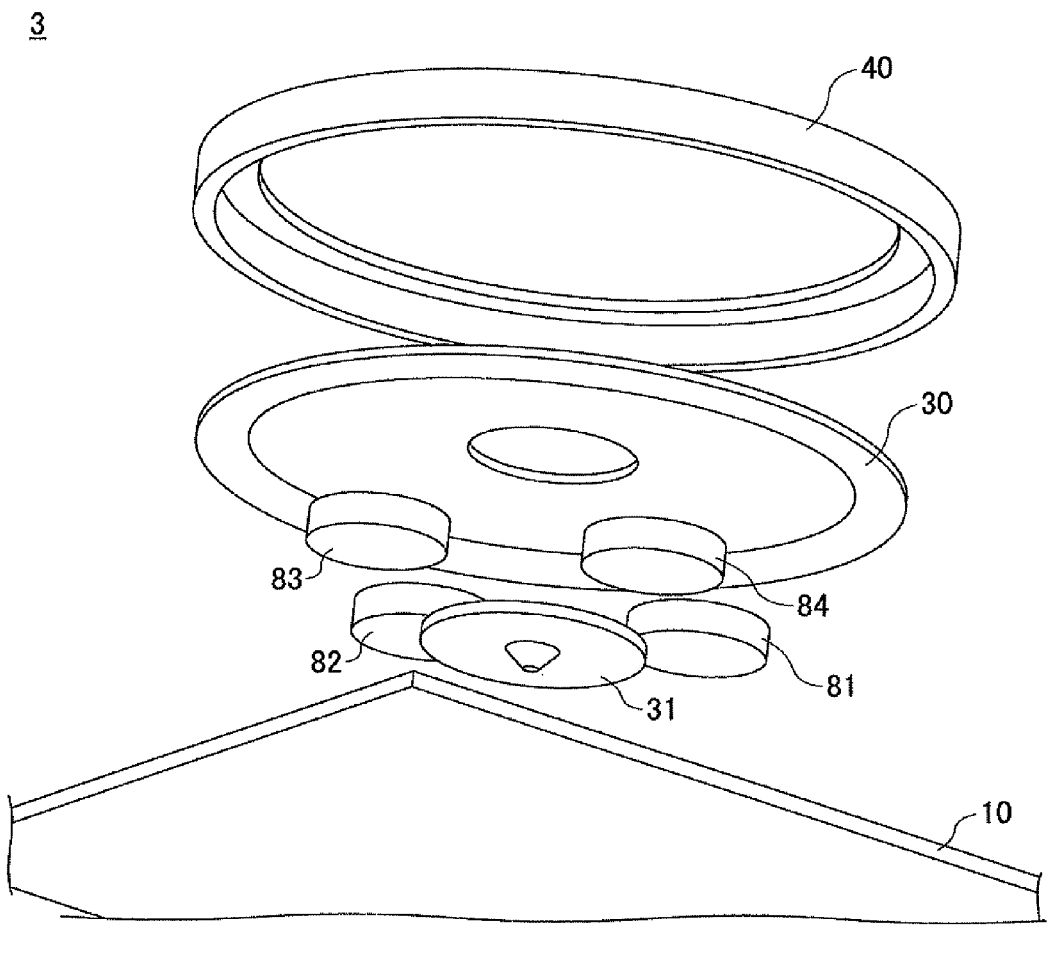
FIG. 30 is an exploded diagram of an operation input apparatus 3 which is a third embodiment of the present invention.
Figure 31:
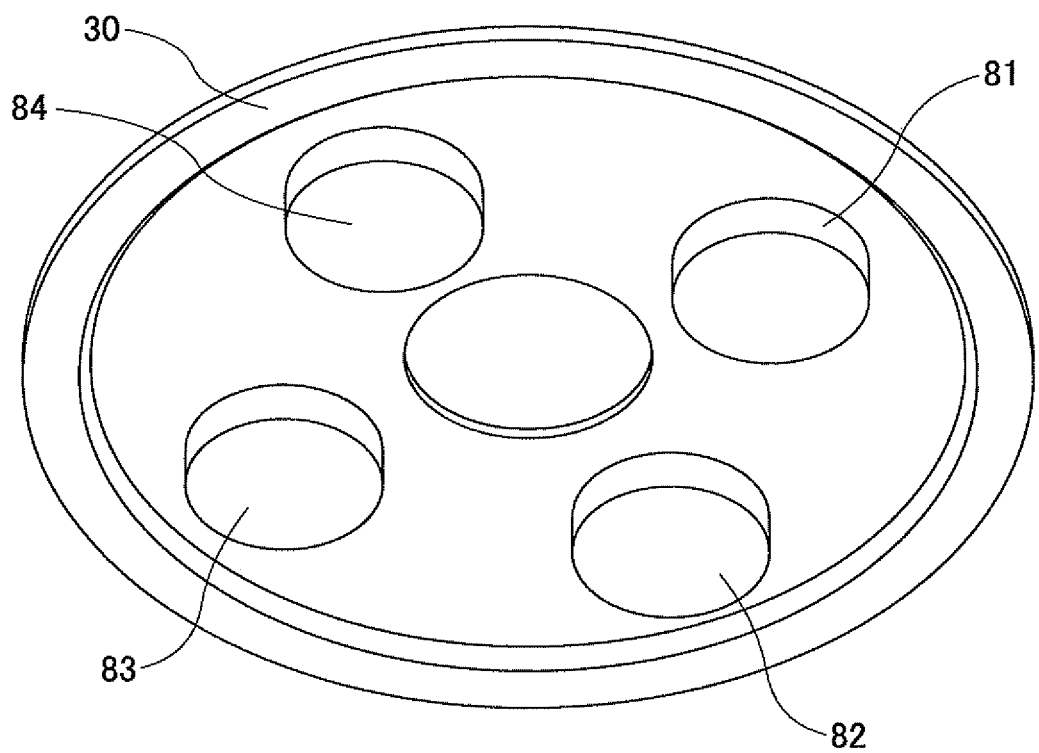
FIG. 31 is a diagram in which a core is provided in the key 30.
Figure 32:
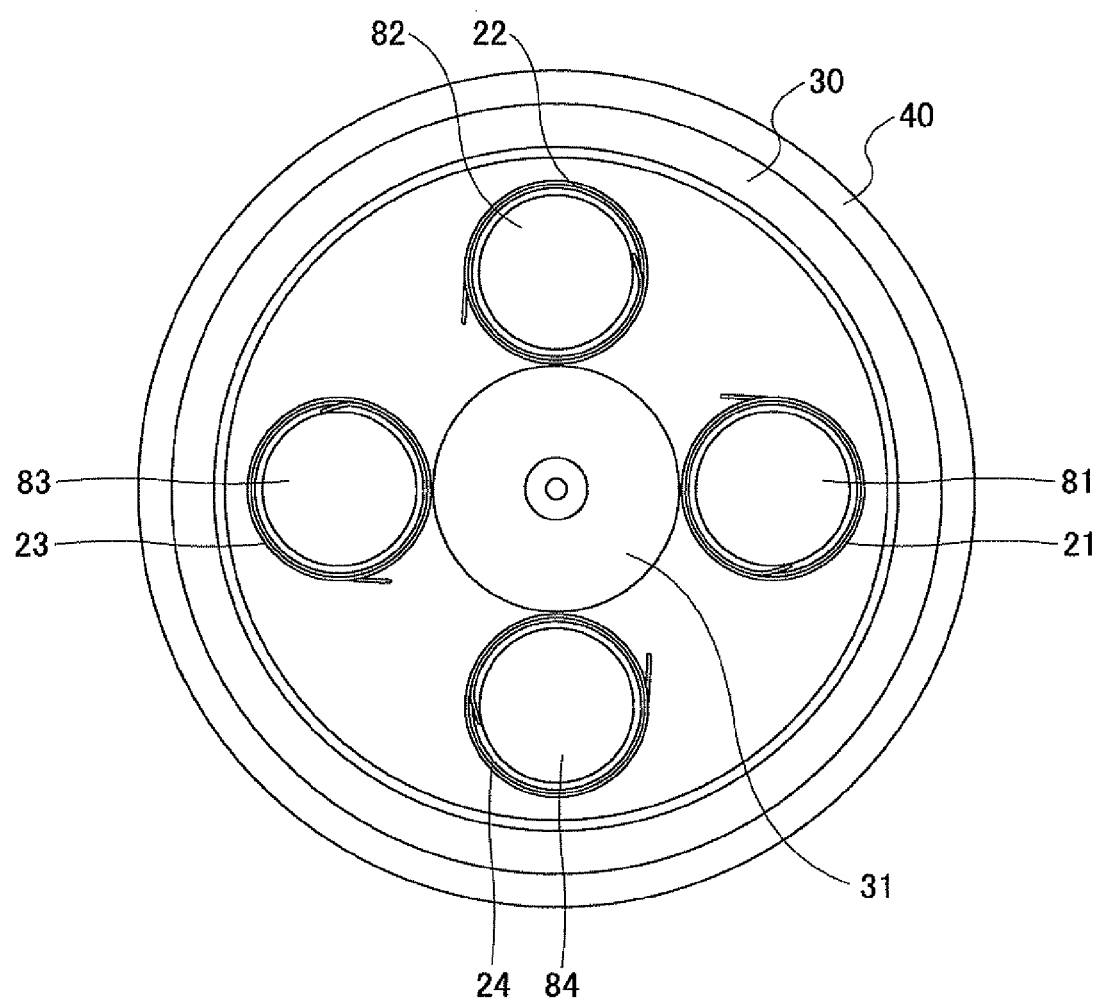
FIG. 32 is a diagram showing position relationship among components.

FIG. 30 is an exploded view of an operation input apparatus 3, which is a third embodiment of the preset invention. FIG. 31 is a diagram illustrating that as many cores as the number of coils placed on the placement surface of the board 10 are provided on the opposed surface of the key 30 facing the board 10. FIG. 32 is a diagram illustrating the positional relationship of the case 40, the key 30, cores 81~84, the coils 21~24, and the center key 31 viewed along the Z axis. As to the same elements as those described in the above-mentioned examples, a description thereof is omitted.

As shown in FIG. 30 through FIG. 32, the four cores 81~84 are connected to the opposed surface side of the key 30 so as to move vertically in the same direction as the movement of the key 30 when the key 30 vertically moves. The core is an inductance increasing member that increases the absolute value of the inductance of at least one of the coils 21~24. The cores 81~84 are placed at positions facing the coils respectively. The outside diameter of each of the cores 81~84 is smaller than the inside diameter of the coils 21~24 opposing each of the cores.

Figure 33:
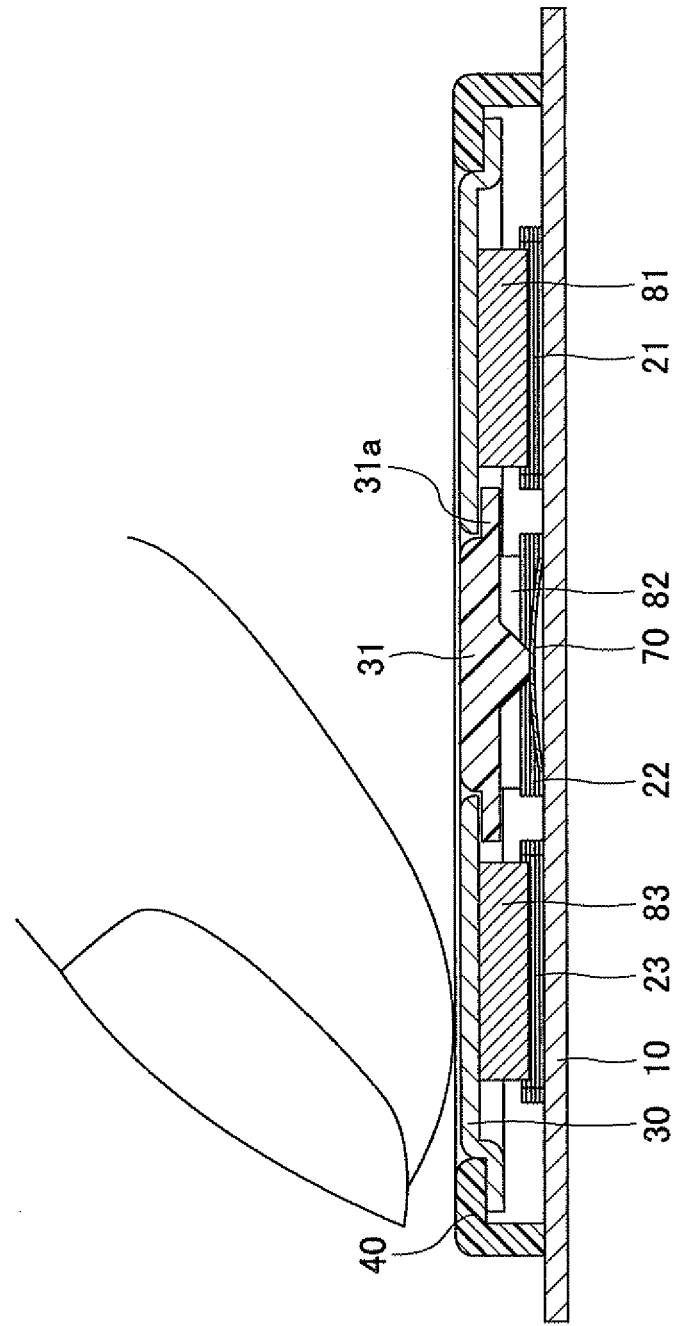
FIG. 33 is a cross-sectional view of the operation input apparatus 3 showing a state where the operator is placing a finger on the key 30.
Figure 34:
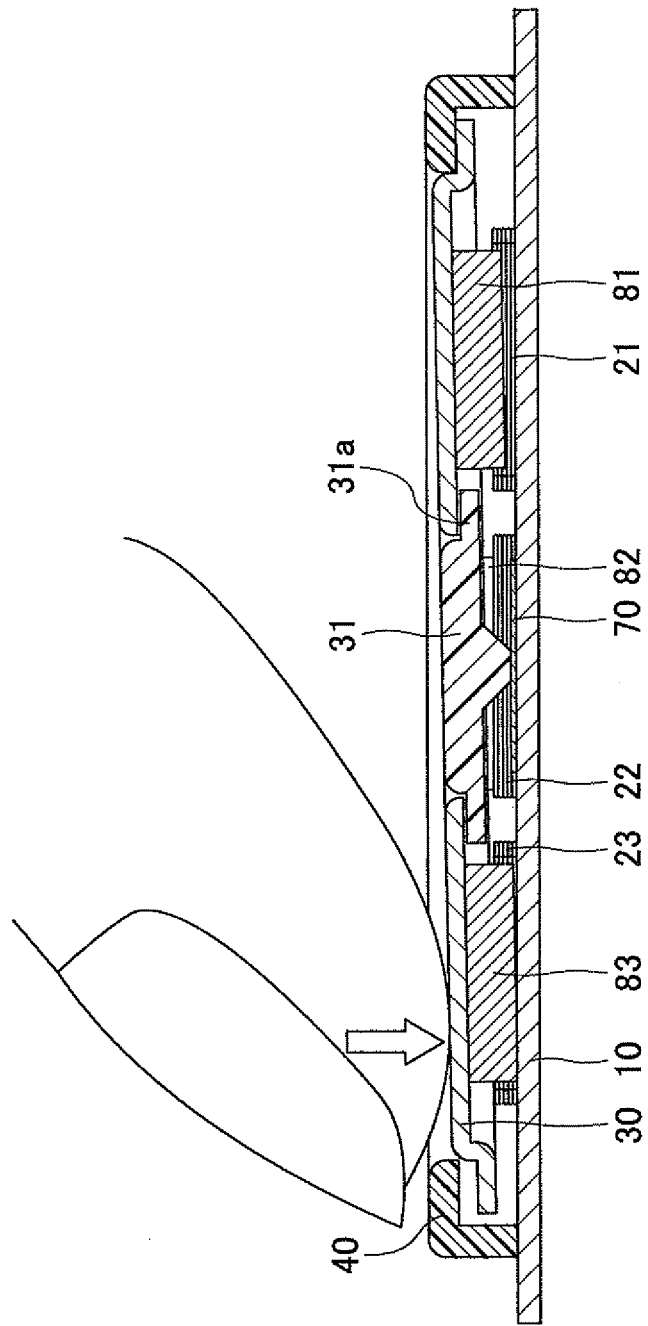
FIG. 34 is a cross-sectional view of the operation input apparatus 3 showing a state where a position of the X(−) direction of the key 30 is pressed.

FIG. 33 and FIG. 34 are diagrams for illustrating states of the operation input apparatus 3 at the time of the operator operating the operation input apparatus 3. As shown in FIG. 33, in the state where the key 30 is not pressed, the cores 81~84 are positioned on the upper side of the coils 21~24, respectively. Then, as shown in FIG. 34, when the key 30 is pressed, the cores 81~84 enter insides of the coils 21~24, respectively, without contacting the coils 21~24 as the key 30 moves downward. The entry of the cores 81~84 into the corresponding coils 21~24 increases the magnetic permeability around the coils to increase their inductances. In particular, the ambient magnetic permeability of the coil 23 among the four coils increases to increase the inductance of the coil 23 since a force is applied on the operation surface above the coil 23.

Therefore, according to the third embodiment, the magnetic permeability in the state in which an operator's force is not applied can be higher than the case without a core, so that the absolute value of inductance can be increased. This effect makes it possible to reduce the height of coils and accordingly to reduce the thickness of the operation input apparatus in the Z axial direction. And, the current flowing through the coils can be reduced. Further, the gradient of an increase in inductance at the time of entry of a core into a coil is greater than in the case of being merely approached by a yoke, so that it is possible to increase sensitivity to the amount of pressing of the operation surface. Further, since it is possible to vary inductance with the movement of a core, it is possible to easily detect inductance variations without providing a function of a yoke to the key 30. Accordingly, it is possible to form the key 30 with nonmagnetic material. Further, since the core is not thin like a yoke and has a structure free of stress application, fragile material such as ferrite may be used for the core.

Also, according to the third embodiment in which the core is provided as an inductance increase member, it is possible to widen a range within which an amount of stroke of the key 30 in each direction can be detected with high accuracy, compared with the configuration in which there is no core (for example, the above-mentioned first and second embodiments). This effect is described with reference to FIGS. 54~62.

Figure 54:
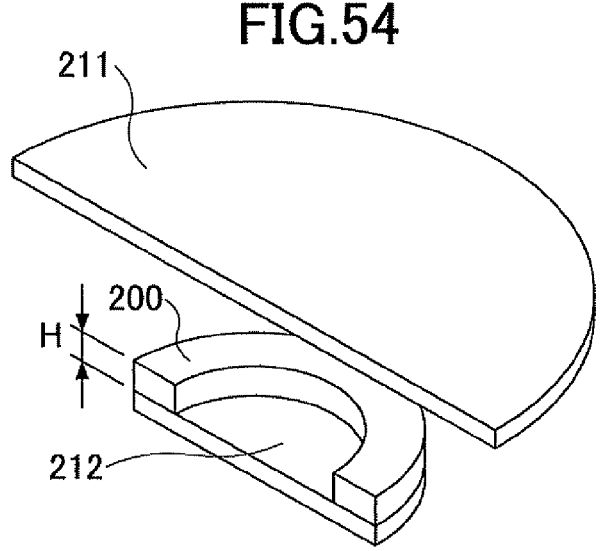
FIG. 54 is a cross-sectional perspective view of an analysis model that is a simplified form of the configuration without the core.

FIG. 54 is a cross-sectional perspective view of an analysis model that is a simplified form of the configuration without the core. FIG. 54 omits a left-side half of the circular analysis model. This analysis model includes an upper yoke 211 above the coil 200 that is vertically movable, and includes a lower yoke 212 that is fixed at the lower side of the coil 200. H indicates a height of the coil 200.

Figure 55:
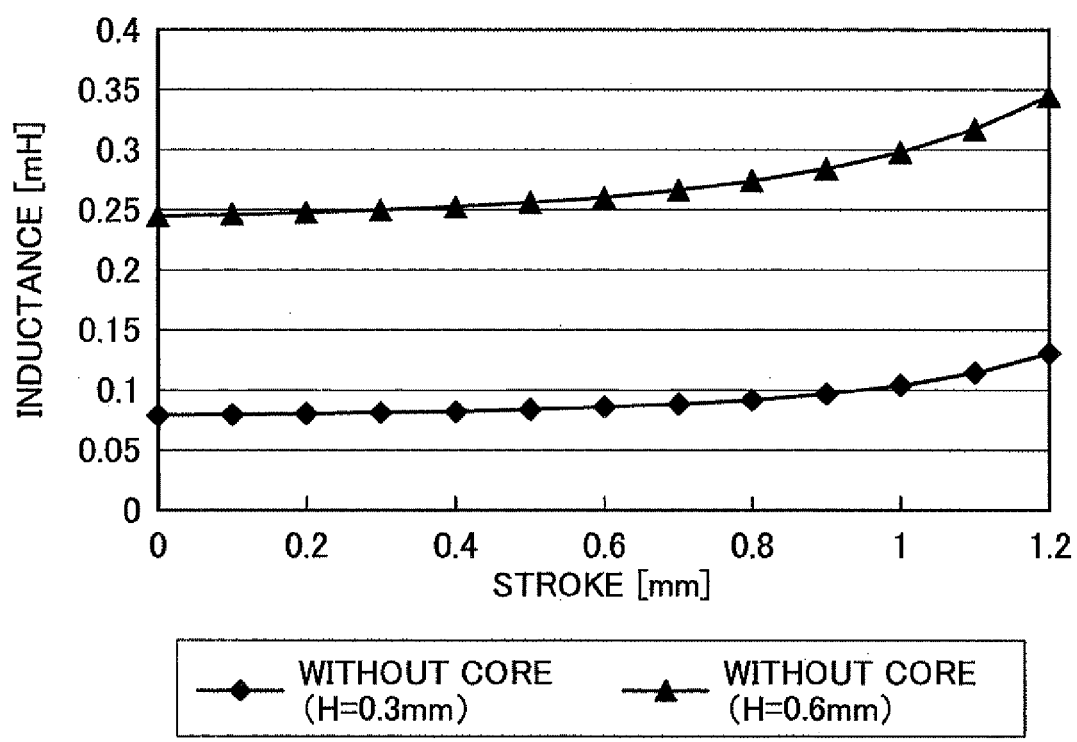
FIG. 55 is a diagram showing change of inductance of the coil 200 with respect to the amount of vertical stroke of the upper yoke 211 in the analysis model of FIG. 54.

FIG. 55 is a diagram showing variations of inductance of the coil 200 with respect to the amount of vertical stroke of the upper yoke 211. The amount of stroke in an initial state of positional relationship between the upper yoke 211 and the coil 200 corresponds to zero, and the stroke amount when the upper yoke 211 comes closest to the coil 200 corresponds to 1.2 mm. According to the specification of the coil 200, the outside diameter is $\phi 3$, inside diameter is $\phi 2$, and the diameter of wire is $\phi 0.025$. The number of turns of the coil 200 in the case when the height H is 0.3 mm is 130, and the number of turns of the coil 200 in the case when the height H is 0.6 mm is 260.

As shown in FIG. 55, in a range (equal to or greater than about 0.6 mm) in which the stroke amount of the upper yoke 211 is large, variations of the inductance with respect to the stroke amount of the upper yoke 211 are large. Therefore, in the range, the stroke amount of the upper yoke 211 can be detected with relatively high accuracy by detecting the size of the inductance. On the other hand, in a range of initial movement (about 0~0.6 mm) in which the stroke amount of the upper yoke 211 is small, variations of the inductance with respect to the stroke amount of the upper yoke 211 are small. Therefore, compared to the range in which the stroke amount of the upper yoke 211 is large, it is difficult to detect the stroke amount of the upper yoke 211 with high accuracy.

Figure 56:
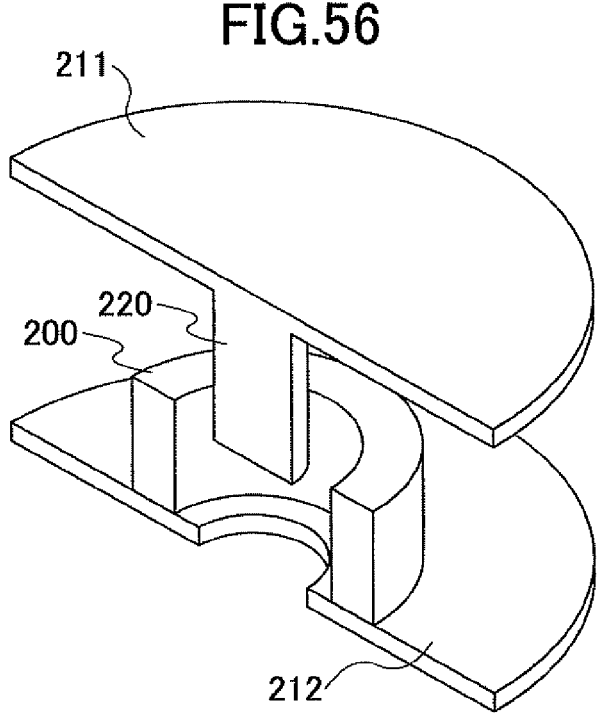
FIG. 56 is a cross-sectional perspective view of an analysis model that is a simplified form of the configuration having a core.

FIG. 56 is a cross-sectional perspective view of an analysis model that is a simplified form of the configuration having a core. FIG. 56 also omits a left-side half of the circular analysis model. Compared to the analysis model shown in FIG. 54, this analysis model includes a cylindrical core 220 that is formed on the lower surface of the upper yoke 211 such that the cylindrical core 220 can be inserted into a hollow portion of the coil 200.

A magnetic field (magnetic flux) generated in the coil 200 loops in the magnetic circuit formed by the core 220, the upper yoke 211 and the lower yoke 212. The inductance of the coil is determined by an average relative permeability around the coil. The average relative permeability around the coil is determined by a magnetic resistance that is determined by a magnetic path length of the magnetic circuit formed by the core 220, the upper yoke 211 and the lower yoke 212.

By forming the core 220 on the lower surface of the upper yoke 211 such that it can be inserted into the inside of the coil 200, a magnetic path can be formed for inducing the magnetic flux generated by the coil 200 to a position apart from the coil 200 (that is, a position of the upper yoke 211). Therefore, the magnetic flux passing through the hollow portion of the coil 200 can be prevented from looping toward the outside of the coil 200 before the magnetic flux reaches the upper yoke. Thus, even though the upper yoke 211 is apart from the coil 200, variations of inductance of the coil 200 can be provided by the movement of the upper yoke 211. Therefore, compared with the case where the core 220 is not provided, it is possible to widen the range in which the stroke amount of the upper yoke 211 can be detected with high accuracy.

Figure 57:
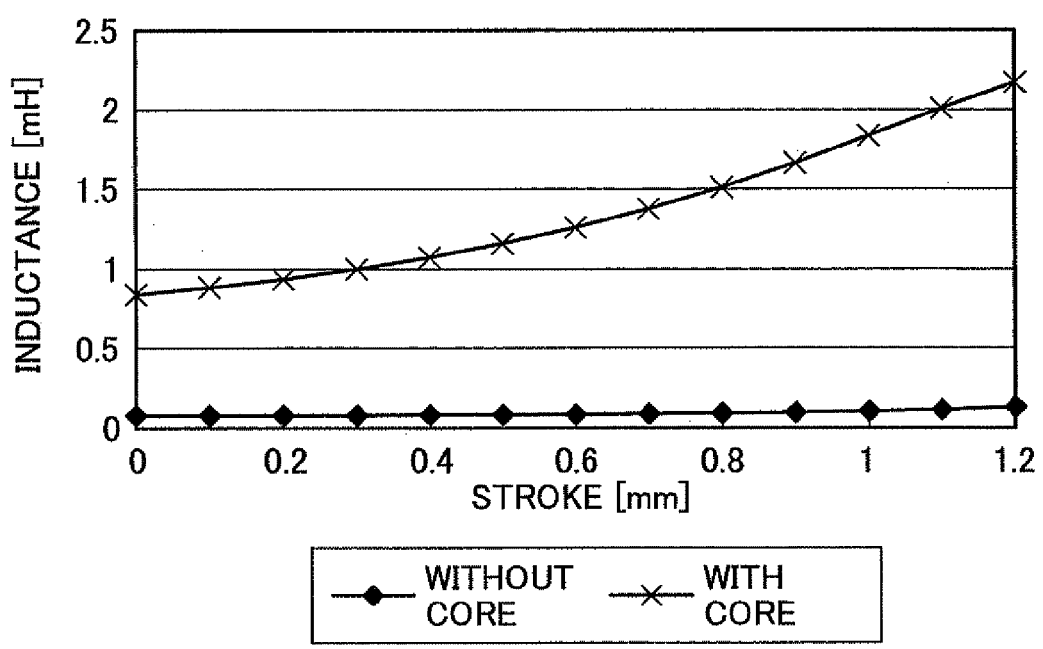
FIG. 57 is a diagram showing variations of inductance of the coil 200 with respect to the amount of vertical stroke of the upper yoke 211 in the case without the core 220 and the case with the core 220.

FIG. 57 is a diagram showing variations of inductance of the coil 200 with respect to the amount of vertical stroke of the upper yoke 211 in the case without the core 220 (FIG. 54) and in the case with the core 220 (FIG. 56). The magnetic path length decreases (the stroke amount becomes longer) as the upper yoke 211 with the core 220 comes closer to the coil 200, so that the inductance of the coil 200 changes to increase. Therefore, by measuring correspondence relationship between the sliding amount of the upper yoke 211 and the inductance of the coil 200 beforehand, an operation input detection apparatus can detect the sliding amount of the upper yoke 211 corresponding to the measured inductance with high accuracy according to the correspondence relationship measured beforehand.

Also, as shown in FIG. 57, in the case where the core 220 is provided, variations of inductance with respect to the stroke amount of the upper yoke 211 are large not only in the range in which the stroke amount of the upper yoke 211 is large but also in the range of the initial move in which the stroke amount of the upper yoke 211 is small. Thus, the stroke amount of the upper yoke 211 can be detected with high accuracy over a wide range.

Figure 58A:
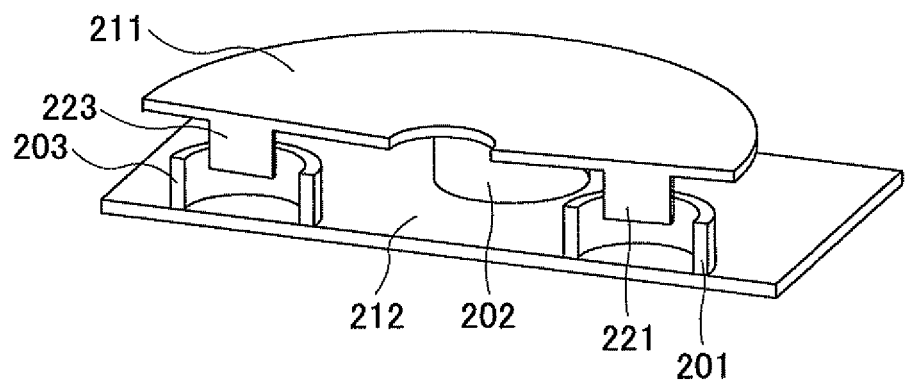
FIG. 58A is a cross-sectional perspective view of an analysis model in which cylindrical cores opposed to respective coils are formed on the upper yoke 211.
Figure 58B:
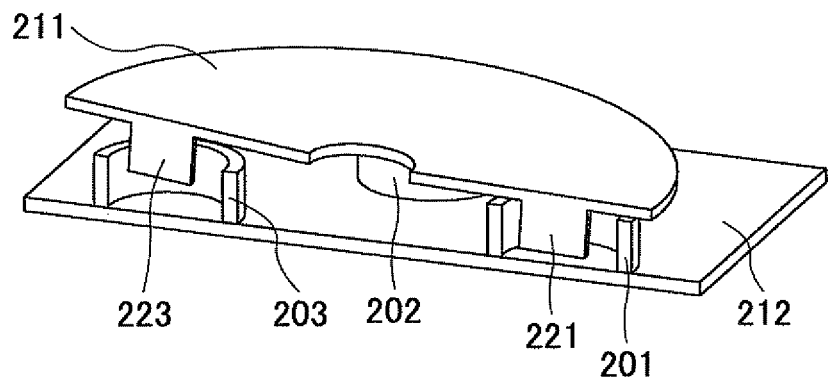
FIG. 58B is a cross-sectional perspective view of an analysis model in which the upper yoke 211 is inclined toward the coil side 201 with respect to the XY plane.
Figure 59:
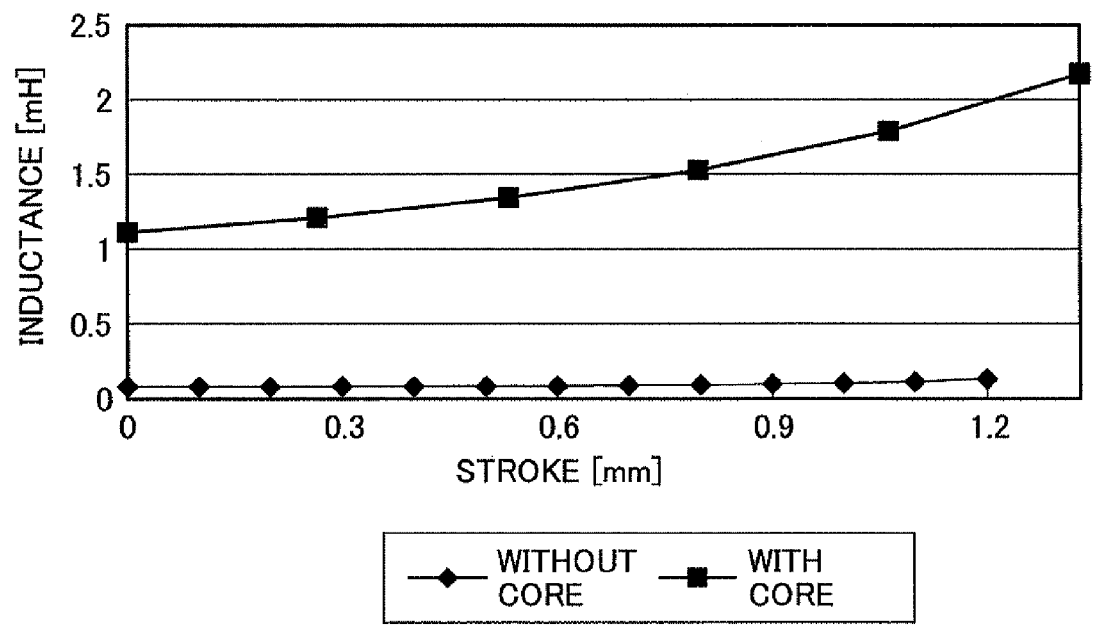
FIG. 59 is a diagram showing variations of inductance of the coil 201 with respect to the stroke amount of the upper yoke 211 when the upper yoke 211 is inclined toward the coil side 201 with respect to the XY plane, in the case with and without the four cores in the configuration shown in FIG. 58.

FIGS. 58A and 58B are cross-sectional perspective views of an analysis model in which cylindrical cores opposed to respective coils are formed on the upper yoke 211. FIGS. 58A and 58B omit a left-side half of the circular analysis model including four coils 201~204 and four cores 221~224. FIG. 59 is a diagram showing variations of inductance of the coil 201 with respect to the stroke amount of the upper yoke 211 when the upper yoke 211 is inclined toward the coil 201 with respect to the XY plane (FIG. 58B), in the case with and without the four cores in the configuration shown in FIG. 58.

Also, as shown in FIG. 59, in the case where the cores are provided, variations of inductance with respect to the stroke amount of the upper yoke 211 are large not only in the range in which the stroke amount of the upper yoke 211 is large but also in the range of the initial move in which the stroke amount of the upper yoke 211 is small. Thus, the stroke amount of the upper yoke 211 can be detected with high accuracy over a wide range.

Figure 60:
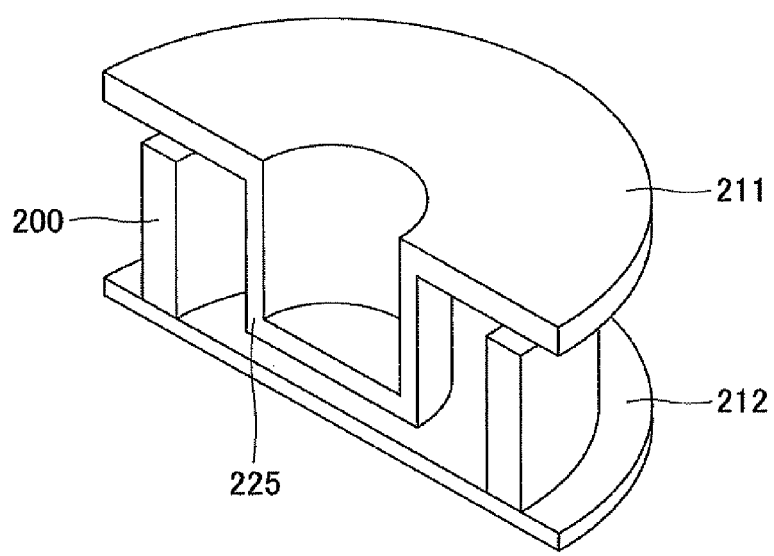
FIG. 60 is a cross-sectional perspective view of an analysis model including a core 225 of a drawing shape.
Figure 61:
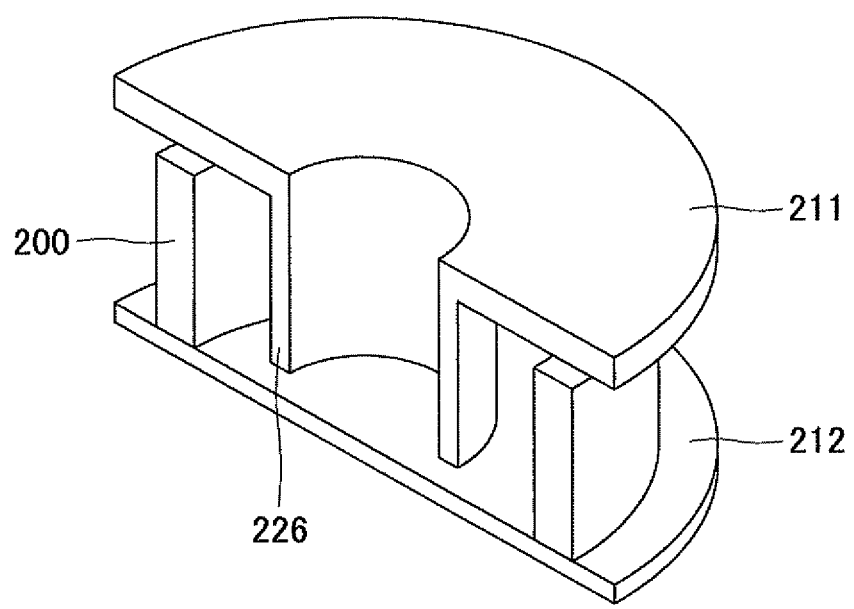
FIG. 61 is a cross-sectional perspective view of an analysis model including a core 226 of burring shape.

FIG. 60 is a cross-sectional perspective view of an analysis model including a core 225 of a drawing shape. FIG. 61 is a cross-sectional perspective view of an analysis model including a core 226 of a burring shape. The core 225 can be formed by performing a drawing process on the upper yoke 211 to form a cylindrical shape. The core 226 is formed by performing a burring process on the upper yoke 211 to form a cylindrical shape. By forming the core by the process for the upper yoke 211, the upper yoke and the core can be integrated, so that the number of components can be reduced.

Figure 62:
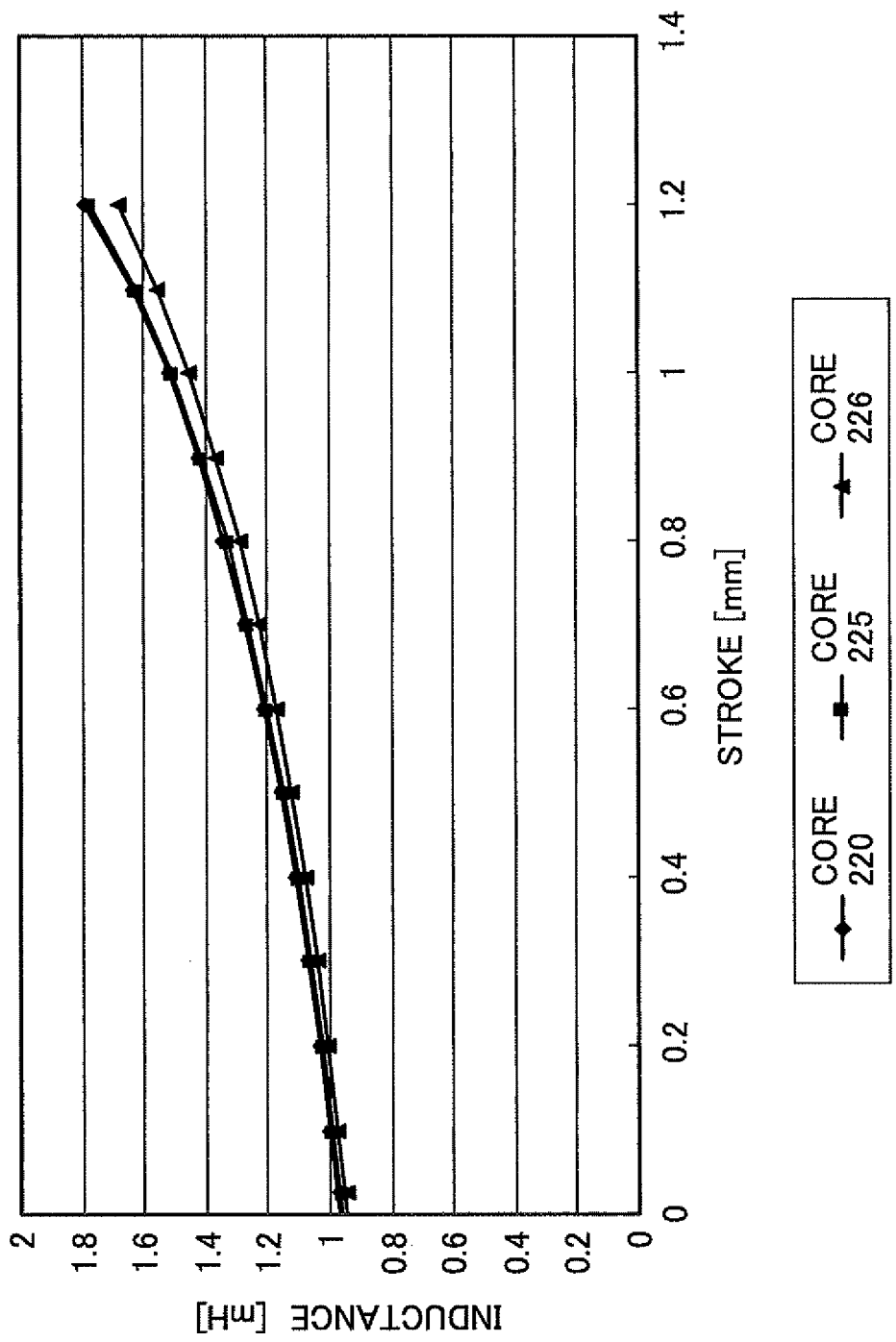
FIG. 62 is a diagram showing variations of inductance of the coil 200 with respect to the stroke amount of the upper yoke 211 in each of the cases of the cylindrical core 220, the core 225 of drawing shape and the core 226 of the burring shape.

FIG. 62 is a diagram showing variations of inductance of the coil 200 with respect to the stroke amount of the upper yoke 211 in each of the cases of the cylindrical core 220, the core 225 of the drawing shape and the core 226 of the burring shape. The diameter of the core is 2.5 mm, and the thickness of the core is 0.4 mm, and the height of the core is 1.9 mm. As shown in FIG. 62, regardless of the shape of the core, variations of inductance with respect to the stroke amount of the upper yoke 211 are large not only in the range in which the stroke amount of the upper yoke 211 is large but also in the range of the initial move in which the stroke amount of the upper yoke 211 is small. Thus, the stroke amount of the upper yoke 211 can be detected with high accuracy over a wide range.

As mentioned above, by providing the core as the inductance increase member above and below the coil, it is possible to widen the range in which the stroke amount to each direction of the key 30 functioning as a yoke (or the key 30 to which a yoke member is attached) can be detected with high accuracy, compared with the configuration without the core (for example, the above-mentioned first and the second embodiments). Also, since the inductance linearly changes with respect to the change of the stroke amount over the whole range where the stroke is available, analog values of the stroke amount of the key 30 can be linearly detected.

Figure 35:
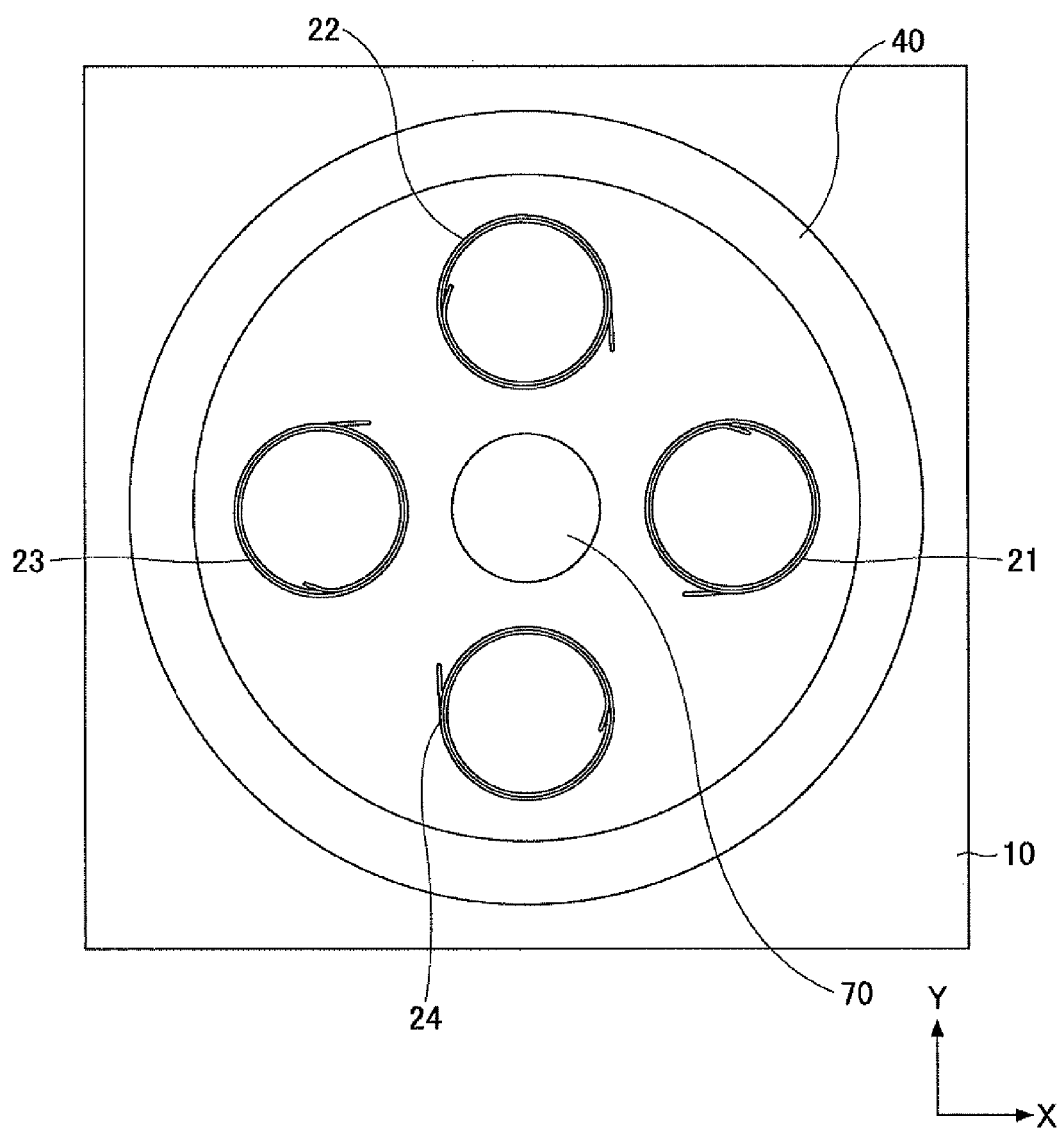
FIG. 35 shows a first placement example of coils 21~24.
Figure 36:
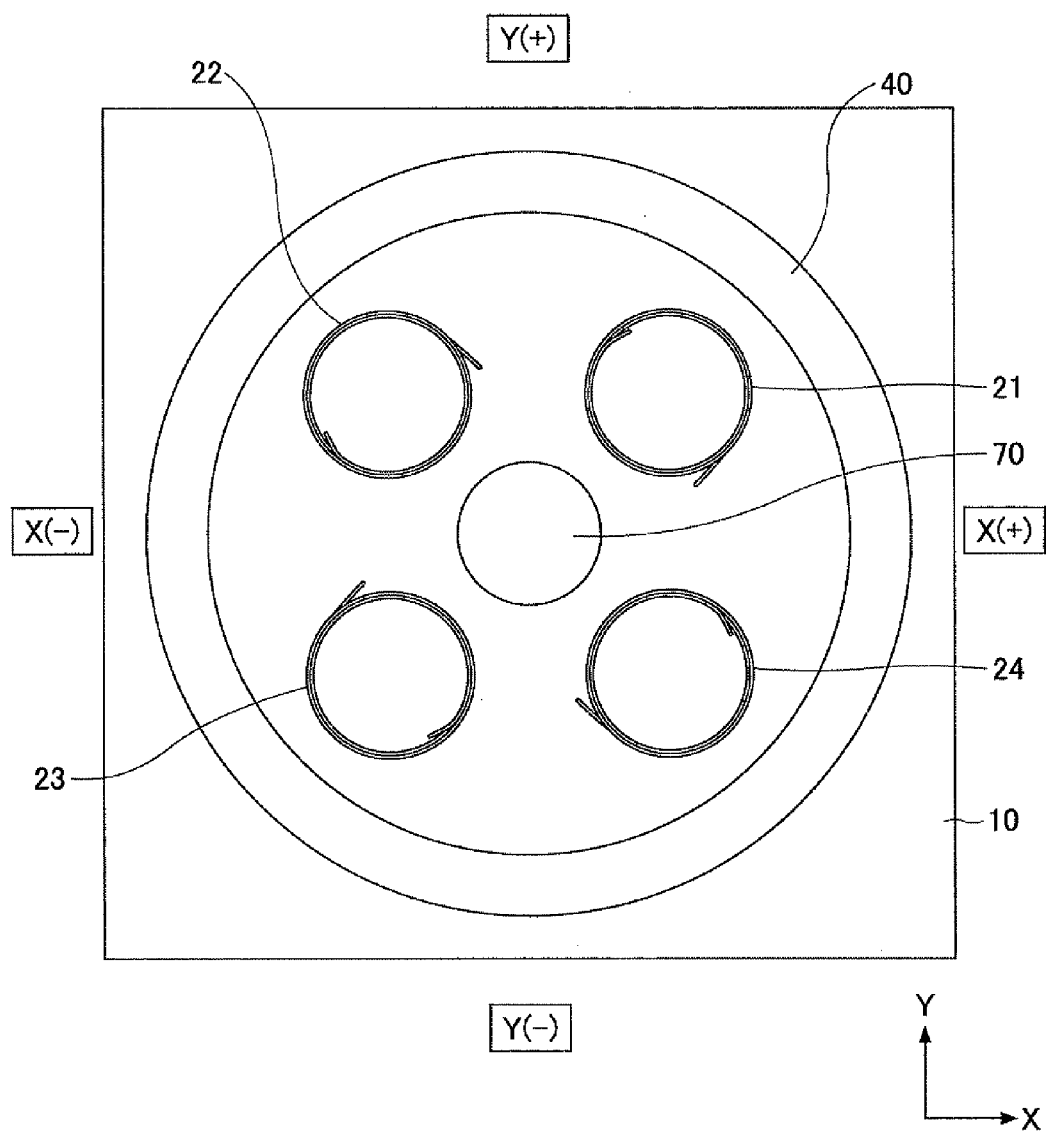
FIG. 36 shows a second placement example of coils 21~24.

FIG. 35 and FIG. 36 are diagrams showing placement positions of the coils 21~24 viewed from the Z axis direction. As shown in FIG. 35, coils 21 and 23 may be placed on the X axis, and the coils 22 and 24 may be placed on the Y axis. Alternatively, as shown in FIG. 36, the coil 21 may be placed on the first quadrant of the XY plane, the coil 22 may be placed on the second quadrant, the coil 23 may be placed on the third quadrant, and the coil 24 may be placed on the fourth quadrant.

In the case of FIG. 36, the inductance of the Y directional component Y(+) of the positive side can be detected according to the sum of inductances of the coil 21 and the coil 22, and the inductance of the X directional component X(+) of the positive side can be detected according to the sum of inductances of the coil 21 and the coil 24. The inductance of the Y directional component Y(−) of the negative side can be detected according to the sum of inductances of the coil 23 and the coil 24, and the inductance of the X directional component X(−) of the negative side can be detected according to the sum of inductances of the coil 22 and the coil 23. In accordance with the above-mentioned concrete examples of the calculation method, the vector of the force of the operator can be calculated based on the sum of the four directions.

Therefore, according to the placement example shown in FIG. 36, it is needless to say that detection in 360° directions in the XY plane is available. In addition to that, it is possible to detect sensitivity of an arrow key (X, Y axis directions) as the sum of two coils, the arrow key being frequently operated in a mobile phone, a game machine and the like. Therefore, detection sensitivity can be improved. Thus, in the case where an apparatus that receives an output of the operation input apparatus utilizes only the XY directions, the sensitivity doubles, so that it becomes possible to downsize the apparatus by designing it with the same sensitivity.

Figure 37:
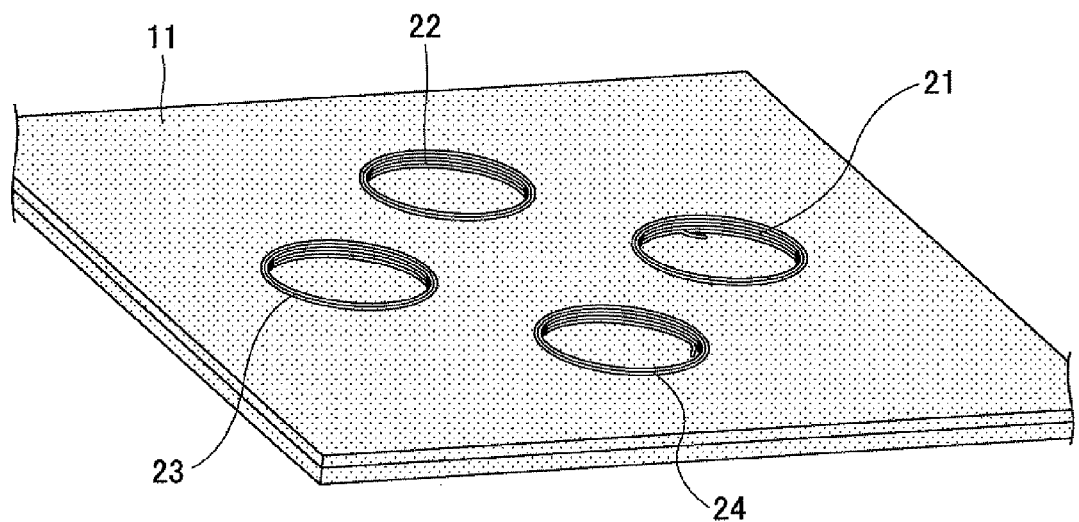
FIG. 37 shows an example in which the coil is placed in a resin holder 11.

FIG. 37 shows an example in which coils are placed in a resin holder 11. The coils are covered by resin for protecting the coils. For example, coils are cemented to the resin. The holder corresponds to the base part having the placement surface on which coils are placed. The resin and the coils may be formed integrally using insert molding. Alternatively, the resin and the coils may be formed by pressing the coils into the resin. Also, in order to increase the absolute value of the inductance, resin in which power of high magnetic permeability is mixed may be used.

Figure 38:
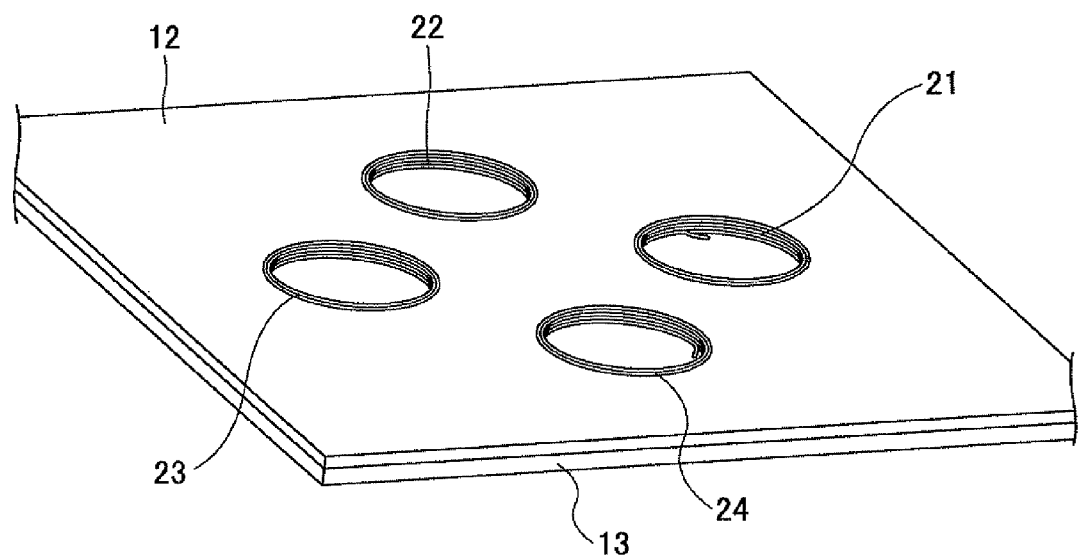
FIG. 38 shows an example in which the coil is placed in a resin holder 11.

FIG. 38 shows an example in which coils are placed in a resin holder 12. The coils are covered by resin for protecting the coils. For example, coils are cemented to the resin. A steel plate functioning as a yoke is attached on the under surface of the holder 12 using an adhesive and the like. The resin and the coils may be formed integrally using insert molding. Alternatively, the resin and the coils may be formed by pressing the coils into the resin. The steel plate may be integrally-molded. Also, a steel plate board having a copper foil pattern may be used.

Figure 39:
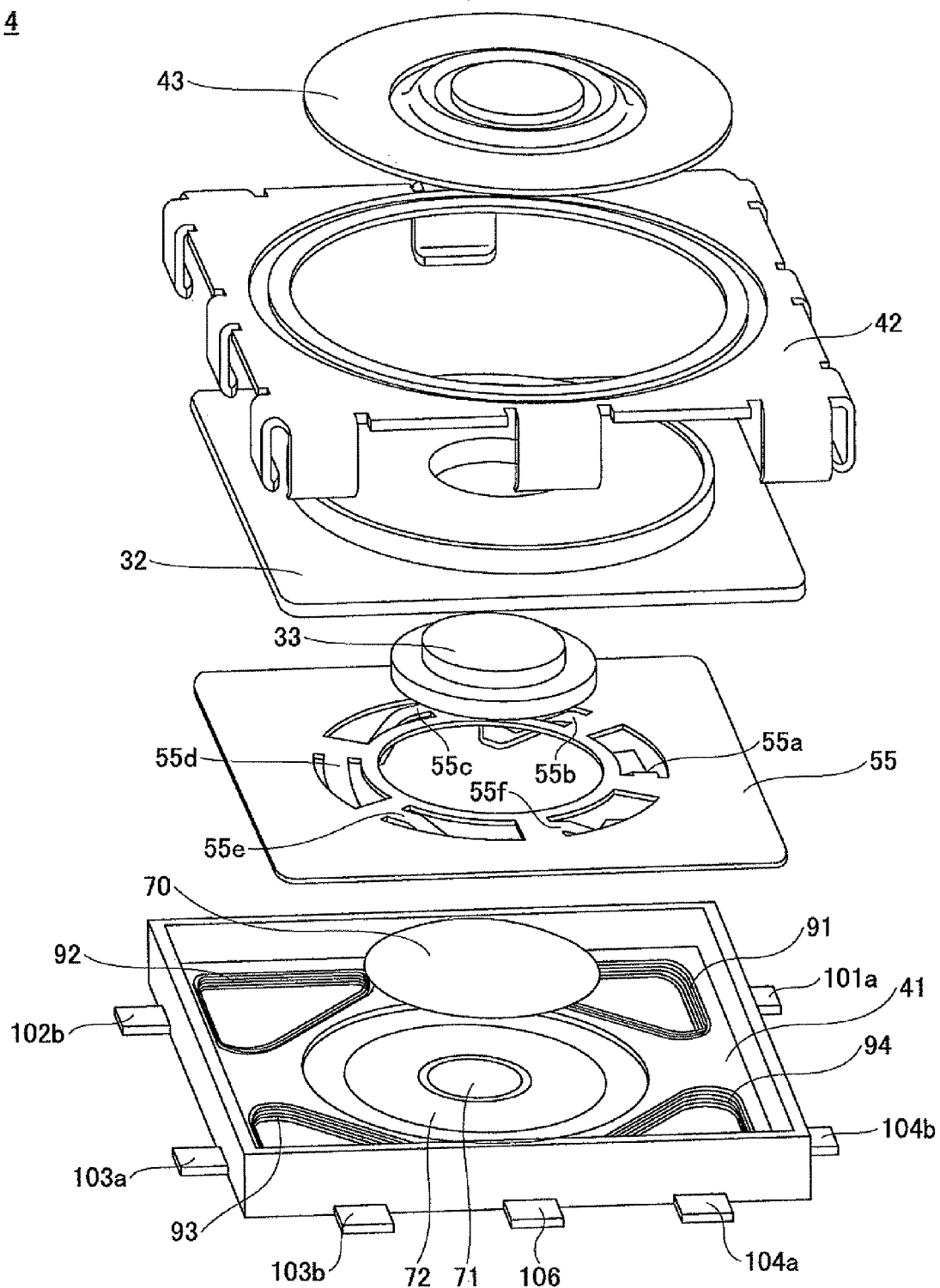
FIG. 39 is an exploded diagram of an operation input apparatus 4 which is a fourth embodiment of the present invention.
Figure 40:
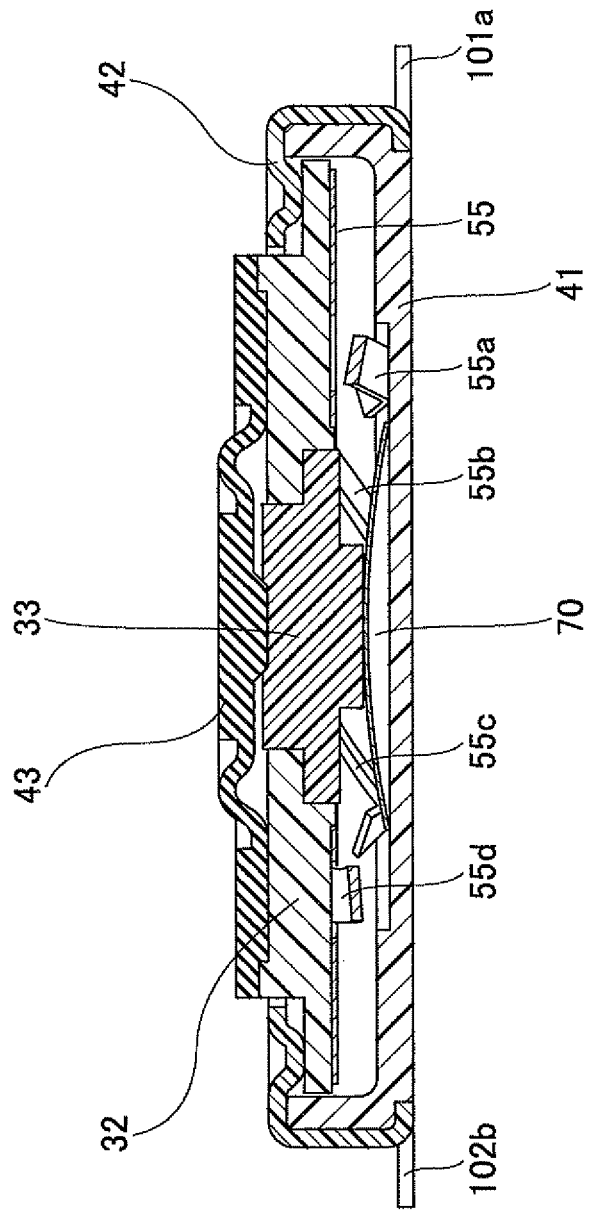
FIG. 40 is a cross-sectional view of the operation input apparatus 4.

FIG. 39 is an exploded perspective view of an operation input apparatus 4, which is a fourth embodiment of the present invention. FIG. 40 is a cross-sectional view of the operation input apparatus 4. In these drawings, as to the same elements as those described in the above examples, a description thereof is omitted.

In the operation input apparatus 4, a part of the yoke is molded like a spring shape, so that the yoke also functions as an elastic support function for elastically supporting the key 32. That is, the return spring 55 that is an elastic support member also functions as a yoke, wherein the elastic support member elastically supports the key 32, which is a displacement member, in the Z direction. Plate spring parts 55a~55f are formed at a part of the return spring 55.

The return spring 55 is placed within a housing 41. The part of the plane shape of the return spring 55 formed by steel material is opposed to coils 91~94, so that the part functions as a yoke. A hole is opened at the center of the return spring 55. Around the hole, plate spring parts 55a~55f protruding toward the downside housing 41 are placed equiangularly in a concentric fashion. Although the number of the plate spring parts is 6 in this embodiment, the number may be equal to or greater than 3 on condition that the return spring 55 has elasticity and the magnetic permeability is higher than that of the air. As long as the condition is satisfied, the material is not limited.

A key 32 is placed above the return spring 55. When a force is applied to the key 32 with a fingertip and the like, the force-applied part bends and moves downward. A center button 33 is placed such that it passes through in the Z axial direction the center hole of the plane-like return spring 55. The operation input apparatus 4 includes the center button 33, on the Z axis, that is held by being sandwiched between the key 32 and the click spring 70. The center button 33 is held in contact the click spring 70. Accordingly, it is possible to reduce thickness of the whole operation input apparatus in the Z axial direction, compared with the case where it is held while it does not contact with the click spring 70. The center button 33 is a pressing part including, on the Z axis, an exposed surface exposed on the operation surface of the key 32. A flange is formed on the outer edge of the center button 33 such that the center button 33 is positioned in a state where it fits in the center hole of the key 32. The center button 33 is held by being sandwiched between the opposed lower surface of the key 32 and the top of the click spring 70 with the flange being in contact with the key 32 in the periphery of the center hole (through hole). Therefore, the center button 33 may move downward individually, and also the center button 33 moves downward along with move of the key 32 when the key 32 is pressed downward. The center button 33 is in contact with the top of the click spring 70 that is placed on the housing 41.

The center button 33 deforms the click spring 70 from the Z axial direction side when an operator's force is applied to at least one of the operation surface of the key 32 and the exposed surface of the center button 33. When the operator's force is applied to the operation surface of the key 32, all of the key 32, the center button 33 and the return spring 55 are depressed, so that the click spring 70 deforms. Also, when the operator's force is applied to the exposed surface of the center button 33 without being applied to the operation surface of the key 32, the key 32 and the return spring 55 are not depressed while the center button 33 is depressed, so that the click spring 70 deforms.

Four coils 91~94 are embedded in the housing 41. Triangular coils 91~94 in each of which a lead is wound like a triangle shape are placed at four corners of the rectangular housing 41. The housing 41 may be a polygonal shape, or may be a circular shape.

Also, the housing 41 is provided with contact parts 71 and 72 of two polarities that are formed by conductive patterns. The dome-like click spring 70 is placed on the contact parts 71 and 72.

A key cover 43 is made of flexible rubber and the like, and the key cover 43 covers the upper part of the operation surface of the key 32. By providing the key cover 43, water and dust can be prevented from coming inside, and a joint portion can be hidden when viewed from the outside. But, the key cover 43 is not essential in this embodiment (it is omitted hereinafter) from the viewpoint of its function.

A case cover 42 holds the key 32, the center button 33 and the return spring 55 by being attached to the housing 41.

According to the operation input apparatus 4, the return spring 55 can be provided with the function of the elastic support member and the function of the yoke, so that the number of components can be reduced. In addition, the return spring 55 functions as a yoke, and the key 32 is placed on the return spring 55. Thus, it is not necessary to use magnetic material for the key 32, and resin may be selected as the material of the key 32. Also, by placing the coils 91~94 at four corners by which a plane area of the return spring 55 can be widely kept, and by using the triangular shape for the coils, the size of the coil can be maximized, so that space can be used efficiently. Further, by placing many spring parts evenly and in a concentric fashion around the center hole of the return spring 55, an even return force can be obtained for every pressing direction.

FIG. 41 is a structural diagram of the housing 41 viewed from the Z axial direction. The housing 41 includes four coils 91~94, contact parts 71 and 72 of two polarities, 10 terminals 101a and the like, and internal wiring 111a and the like for connecting them. The housing 41 is molded by resin. The resin may be a resin in which powder such as ferrite is mixed in order to increase magnetic permeability. Material for the contact part, internal wiring and terminal may be electrically conductive material (copper, steel, gold, silver, for example).

The internal wiring 111a~114a connected to one end part of the coil 91~94 is connected to a terminal 101a~104a that is connected to a predetermined operation input detection apparatus (detection apparatus including the multiplexer 68 and the like shown in FIG. 15, for example). The internal wiring 111*b*~114*b* connected to another end part of the coil 91~94 is connected to a terminal 101*b*~104*b* that is connected to the ground. The internal wiring 115 connected to the contact part 71 is connected to a terminal 105 connected to the ground. The internal wiring 116 connected to the contact part 72 is connected to a terminal 106 connected to a predetermined operation input apparatus (detection apparatus including the CPU 60 and the like shown in FIG. 27, for example).

Figure 42:
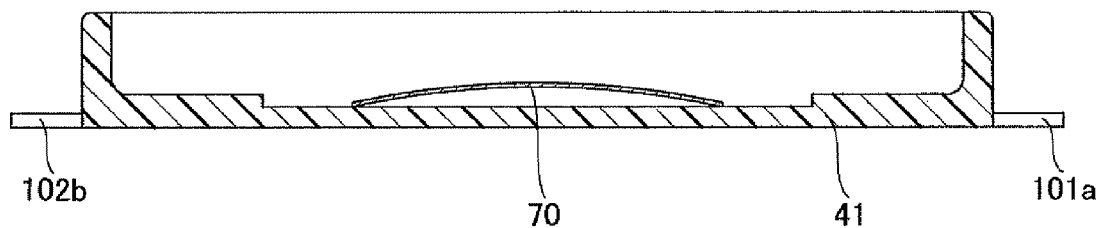
FIG. 42 is a cross-sectional view of the housing 41.
Figure 43:
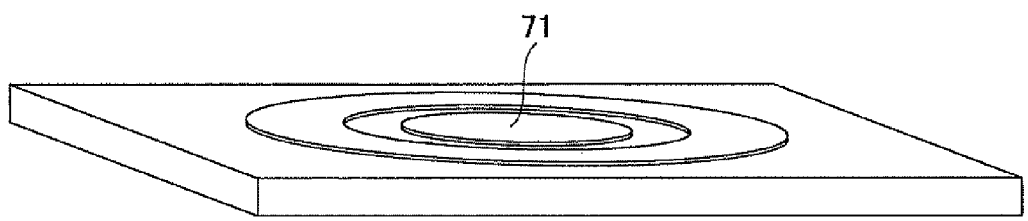
FIG. 43 is a placement diagram of a contact part 71 that is placed on the housing 41.
Figure 44:
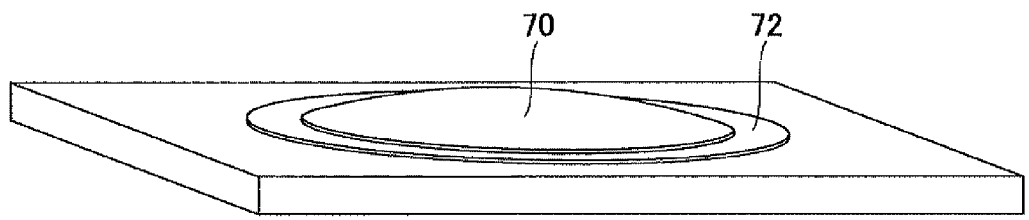
FIG. 44 is a placement diagram of the click spring 70 and a contact part 72 that are placed on the housing 41.
Figure 45:
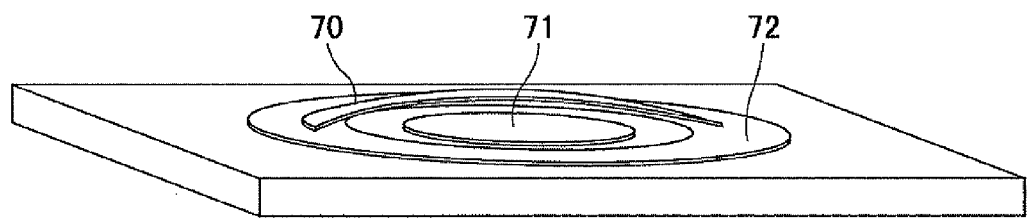
FIG. 45 is a diagram showing a section shape of the click spring 70

FIG. 42 is a cross-sectional view in a state in which the click spring 70 is included in the housing 41. In addition, FIGS. 43~45 are shown in order to illustrate the state in an understandable way. FIG. 43 shows shapes of the two contact parts placed on the housing 41. FIG. 44 is a diagram in which the click spring 70 is placed on the contact parts. FIG. 45 is a diagram showing a section only for the click spring 70. The click spring 70 covers the upper side of the contact parts with being electrically connected to the contact part 72. Since the click spring 70 has a dome-like shape, the click spring 70 is not in contact with the contact part 71 placed inside the click spring 70. When the click spring 70 depressed from the upper side deforms, the contact part 71 and the contact part 72 inside the click spring are short-circuited.

Figure 46:
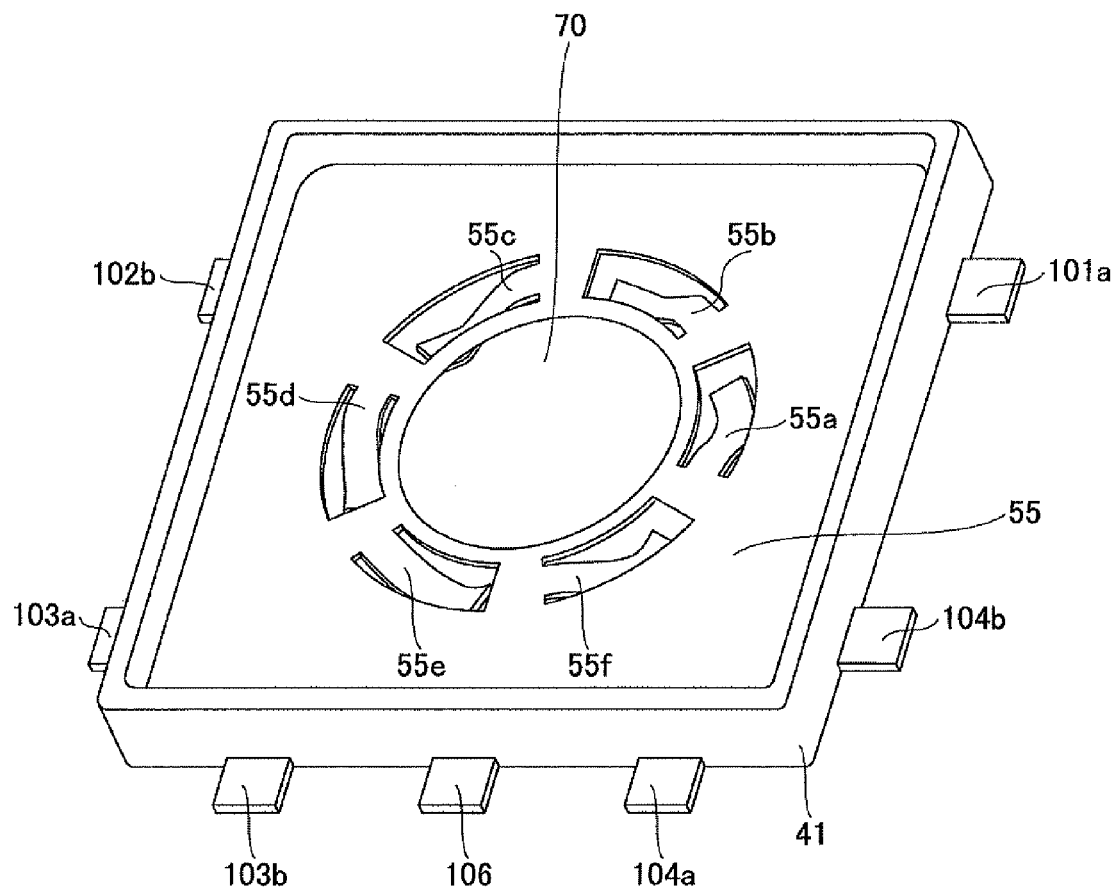
FIG. 46 is a perspective view showing a placement state of the return spring 55.
Figure 47:
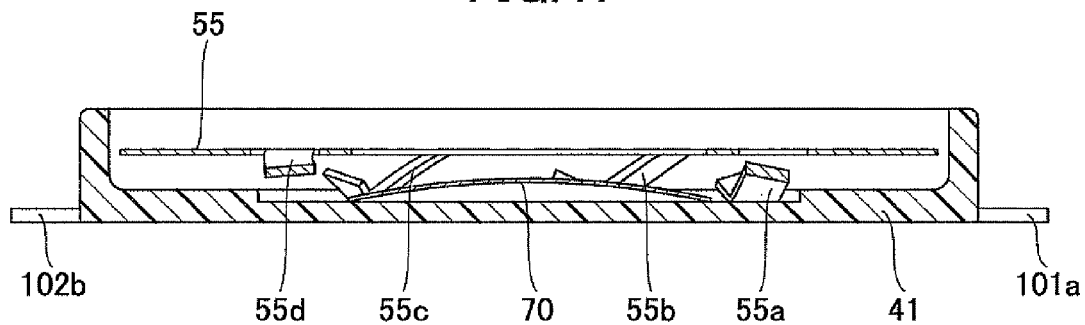
FIG. 47 is a perspective view showing a placement state of the return spring 55.

FIG. 46 is a perspective view showing a placement state of the return spring 55. FIG. 47 is a cross-sectional view showing a placement state of the return spring 55. The plate spring parts 55*a*~55*f* of the return spring 55 are provided around the center hole, so that the planar space can be kept in the four corners of the return spring 55. The planar part of the four corners is opposed to the coils 91~94 placed in the housing 41.

Figure 48:
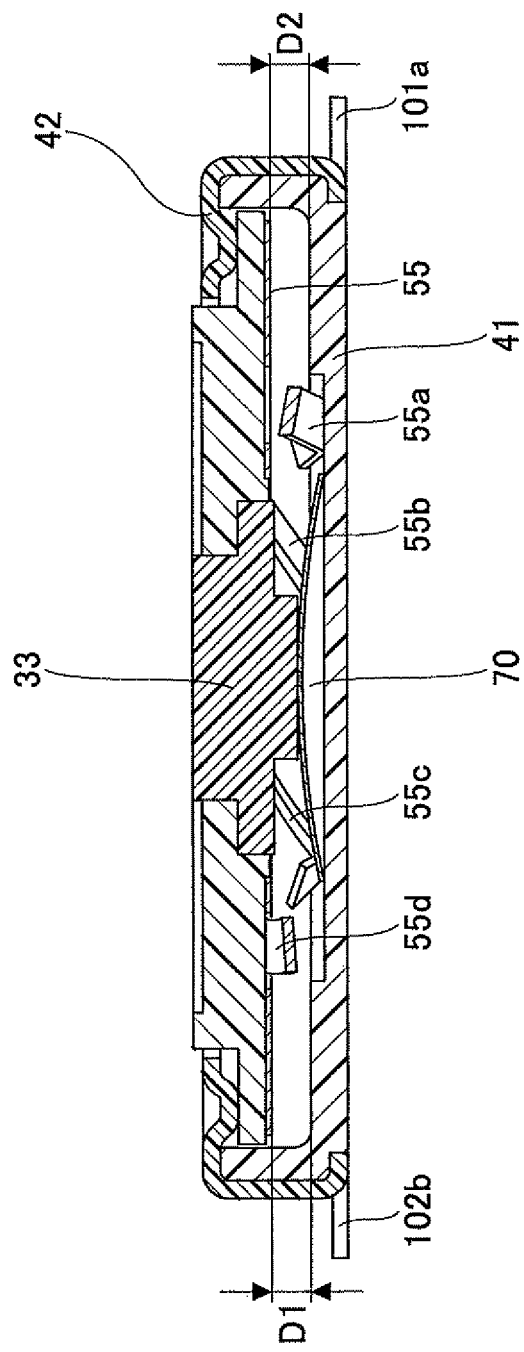
FIG. 48 is a cross-sectional view of the operation input apparatus 4 showing an initial state in which no operator's force is applied.
Figure 49:
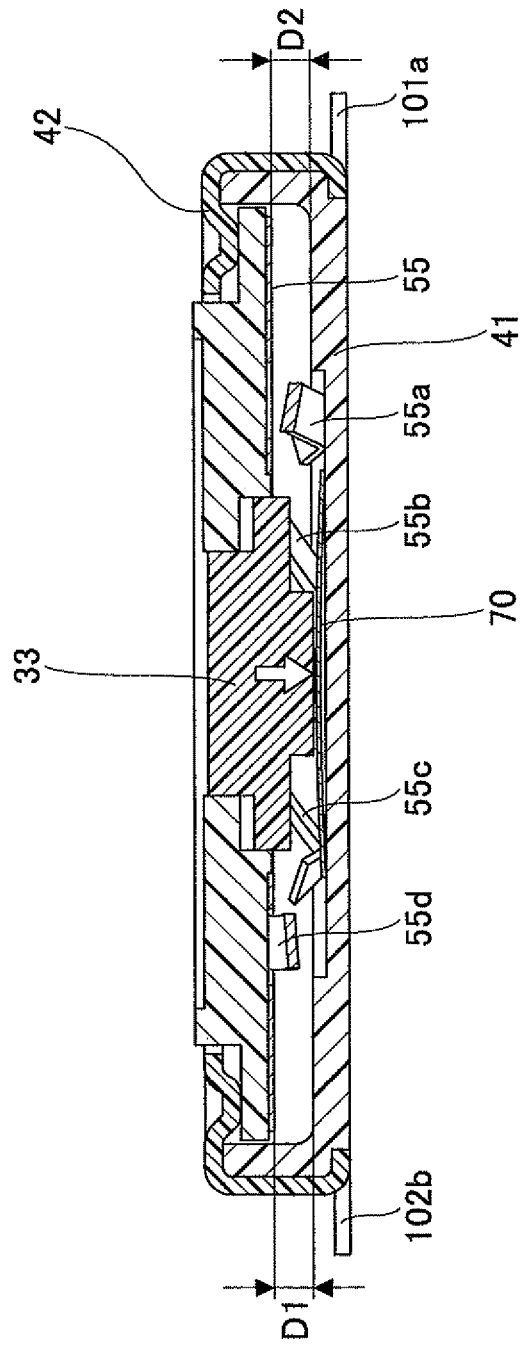
FIG. 49 is a cross-sectional view of the operation input apparatus 4 showing a state in which the center button 33 is pressed.
Figure 50:
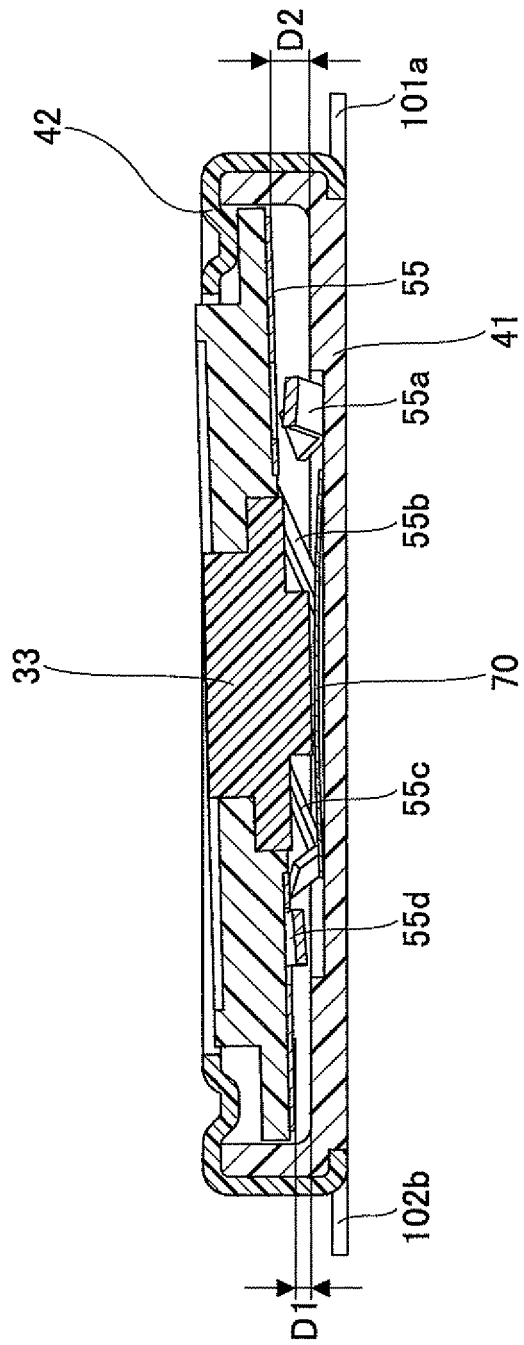
FIG. 50 is a cross-sectional view of the operation input apparatus 4 showing a state in which a position of the X(−) direction of the key 32 is pressed.

FIGS. 48~50 are diagrams for illustrating states of the operation input apparatus 4 at the time of the operator operating the operation input apparatus 4. FIG. 48 is a cross-sectional view of the operation input apparatus 4 showing a waiting state in which no operator's force is applied. FIG. 49 is a cross-sectional view of the operation input apparatus 4 showing a state in which only the center button 33 is pressed. FIG. 50 is a cross-sectional view of the operation input apparatus 4 showing a state in which a position of the X(−) direction of the key 32 is pressed.

In the case when only the center button 33 is pressed, since the center button 33 is held at the hole of the key 32, the center button 33 moves downward individually without downward movement of the key 32 (without change of the position of the key 32 in Z direction from the waiting state), so that the click spring 70 deforms. Accordingly, feeling of clicking is provided, and the contact parts 71 and 72 are short-circuited by the deformation of the click spring 70.

In the case when the key 32 is pressed, a force is applied to the return spring 55 so that the plate spring part deforms. The downward movement of the return spring 55 having the function of a yoke causes the inductance to change. At this time, the center button 33 moves downward with the key 32 to deform the click spring 70. Accordingly, feeling of clicking is provided, and the contact parts 71 and 72 are short-circuited by the deformation of the click spring 70.

Figure 51:
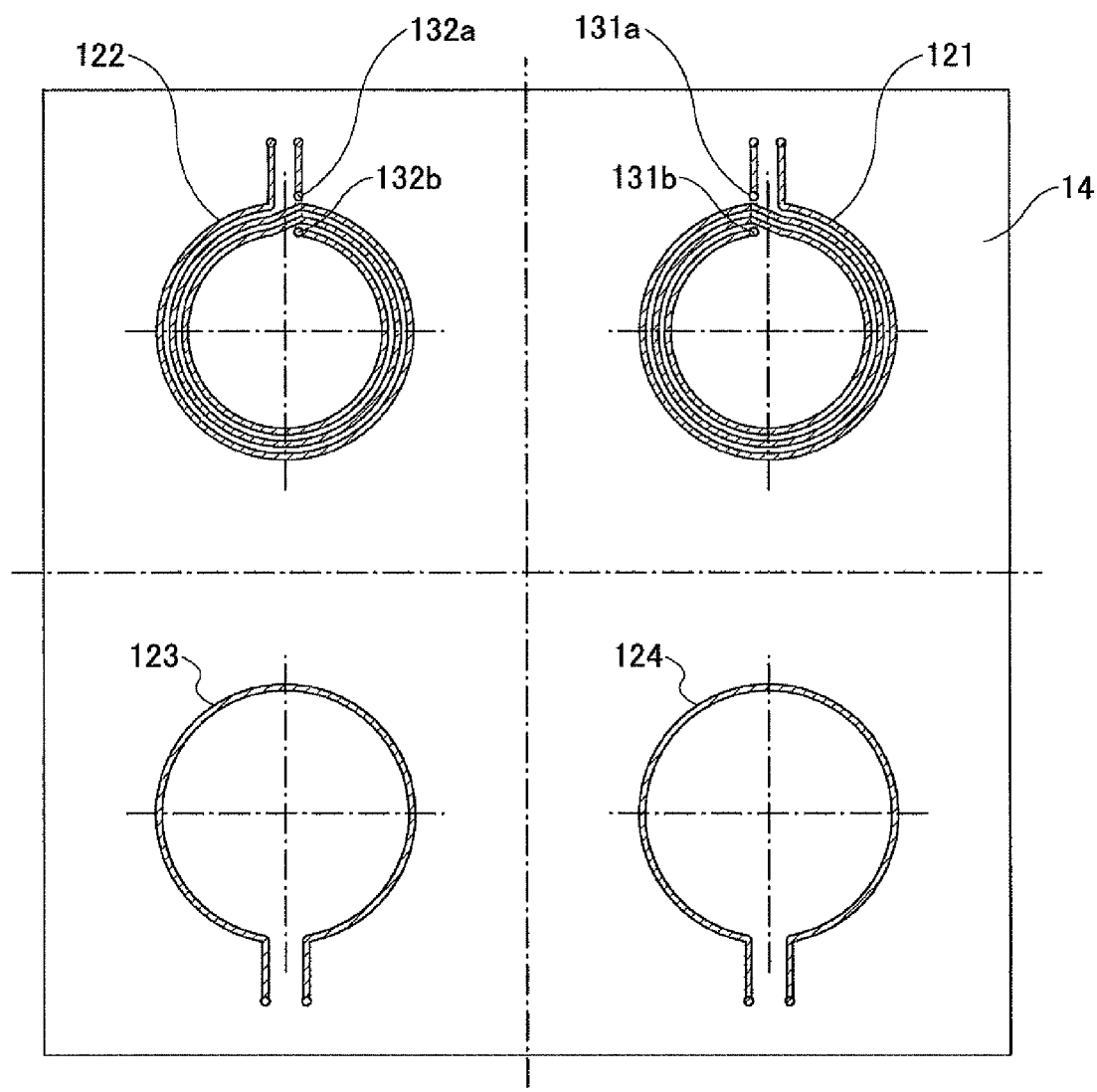
FIG. 51 is an example in which the inductor is formed by a pattern.

FIG. 51 is an example in which the inductor is formed by a pattern. The coil is formed by a copper foil pattern on the board 14. Each of the patterns 121 and 122 are formed like a spiral. By the through holes 131*a*, 131*b* or 132*a*, 132*b*, a signal from an end part inside the coil pattern can be extracted to the outside. Also, a pattern 123, 124 of one turn may be used. The number of turns may be increased using a laminated substrate. As mentioned above, by forming the coil using the pattern, the thickness can be reduced, and the number of components can be reduced. Also, assembling man-hours can be reduced.

Figure 52:
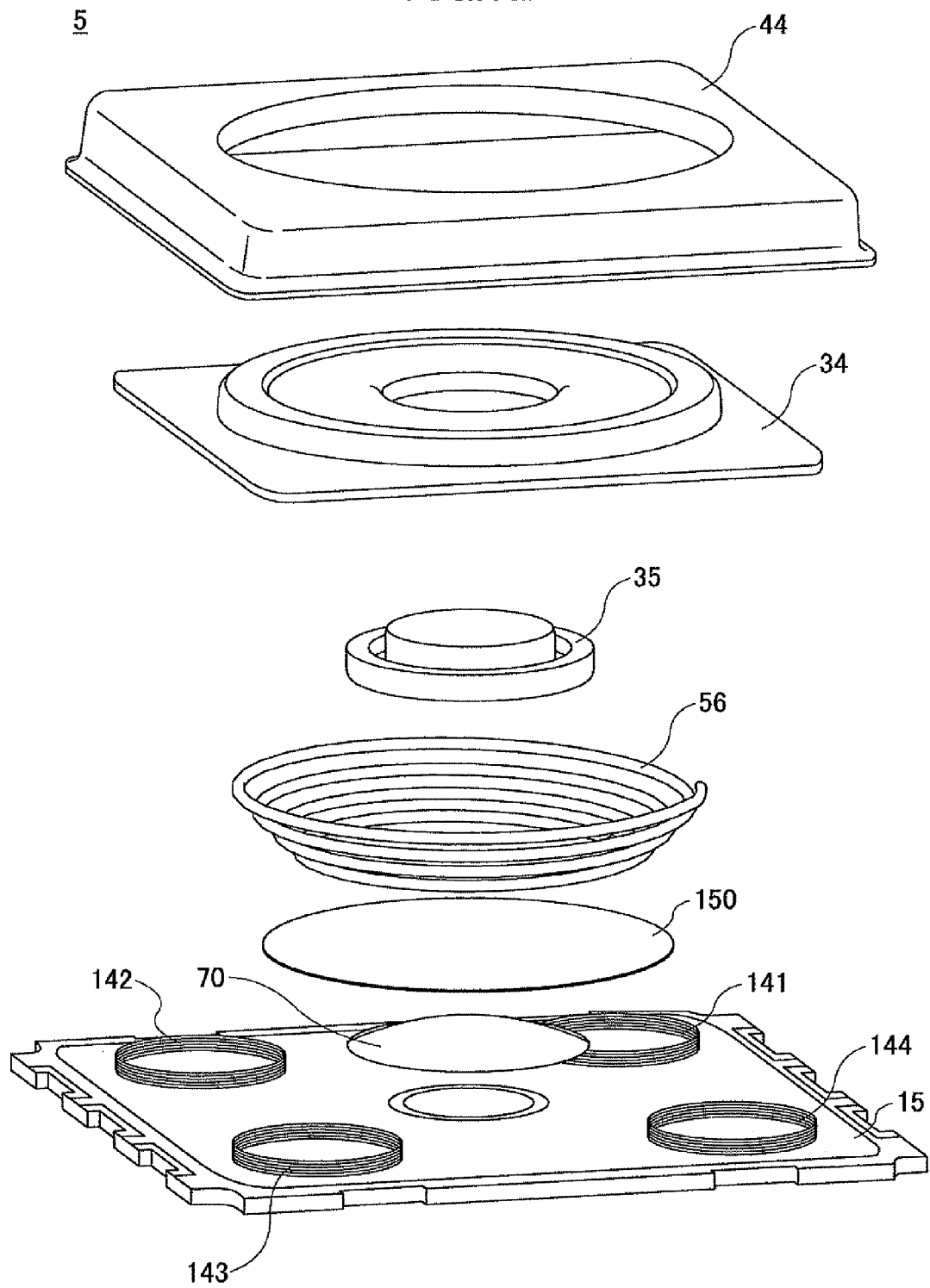
FIG. 52 is an exploded diagram of an operation input apparatus 5 which is a fifth embodiment of the present invention.
Figure 53:
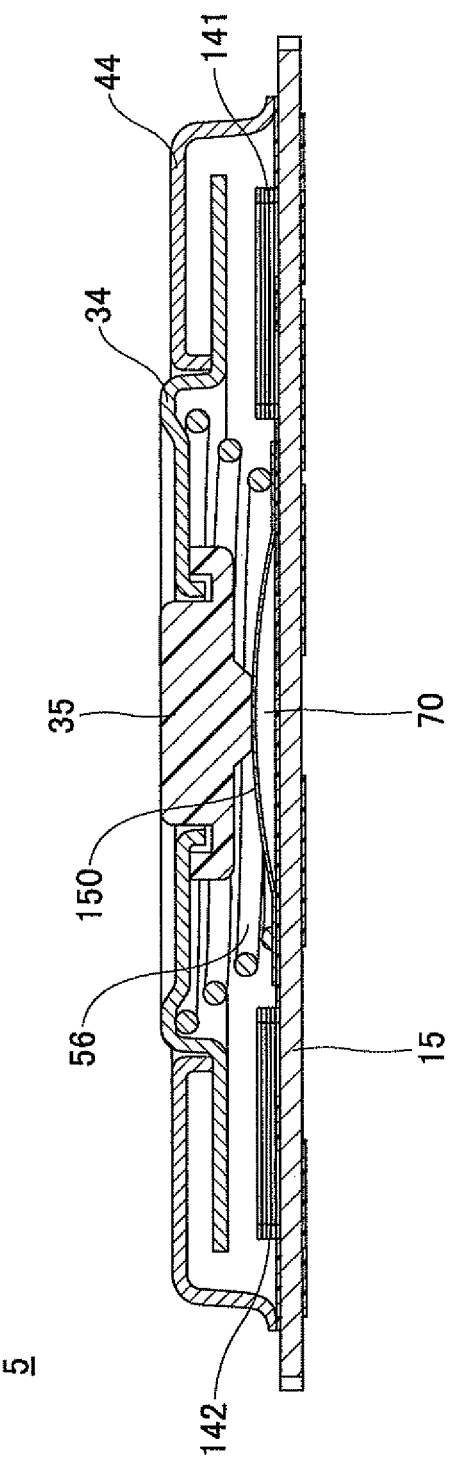
FIG. 53 is a cross-sectional view of the operation input apparatus 5.

FIG. 52 is an exploded perspective view of an operation input apparatus 5, which is a fifth embodiment of the present invention. FIG. 53 is a cross-sectional view of the operation input apparatus 5.

The key 34 and the case 44 are made of steel plate or plate-like material of high magnetic permeability. Accordingly, the apparatus can be formed as a structure into which lines of magnetic force can not penetrate, that is, a structure that does not leak lines of magnetic force to the outside. The key 34 includes a part protruding from the center through hole of the case 44, so that the part becomes the operation surface. A plane-like part of the key 34 opposed to the periphery part of the through hole of the case 44 functions as a yoke for the coils 141~144 that are opposed to the plane-like part. The key 34 is provided with a hole, at the center of the key 34, having a guide shape. The center button 35 is positioned by the hole. A cone coil spring 56 is placed between the key 34 and the board 15. The coil spring 56 is provided so as to cover the periphery of the center button 35. The coil spring 56 always provides a force to the key 34 for returning the key 34 to a height (position) of the waiting state when the key 34 moves downward due to operation. Four coils 141~144 and the click spring 70 are placed on the board 15. Further, a laminate film 150 is attached on the board 15 by sticking material or by an adhesive. The laminate film 150 is provided for the purpose of fixing the click spring 70 and protecting the board 15 against rubbing by the return spring 56. By using the cone coil spring as the return spring 56, durability of the spring can be improved.

Figure 63:
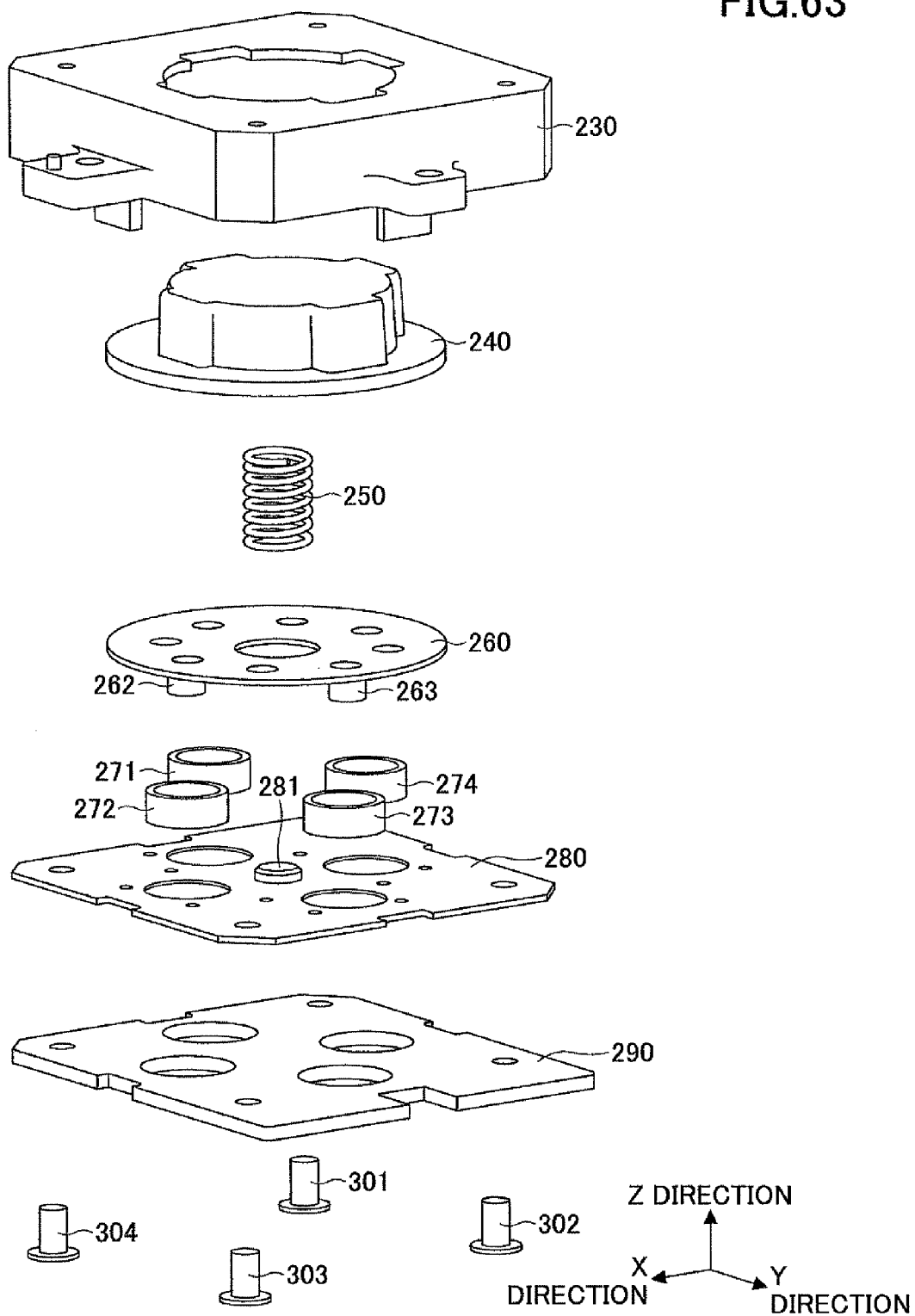
FIG. 63 is an exploded perspective view of an operation input apparatus 6 viewed from an upper oblique direction, which is a sixth embodiment of the present invention.
Figure 64:
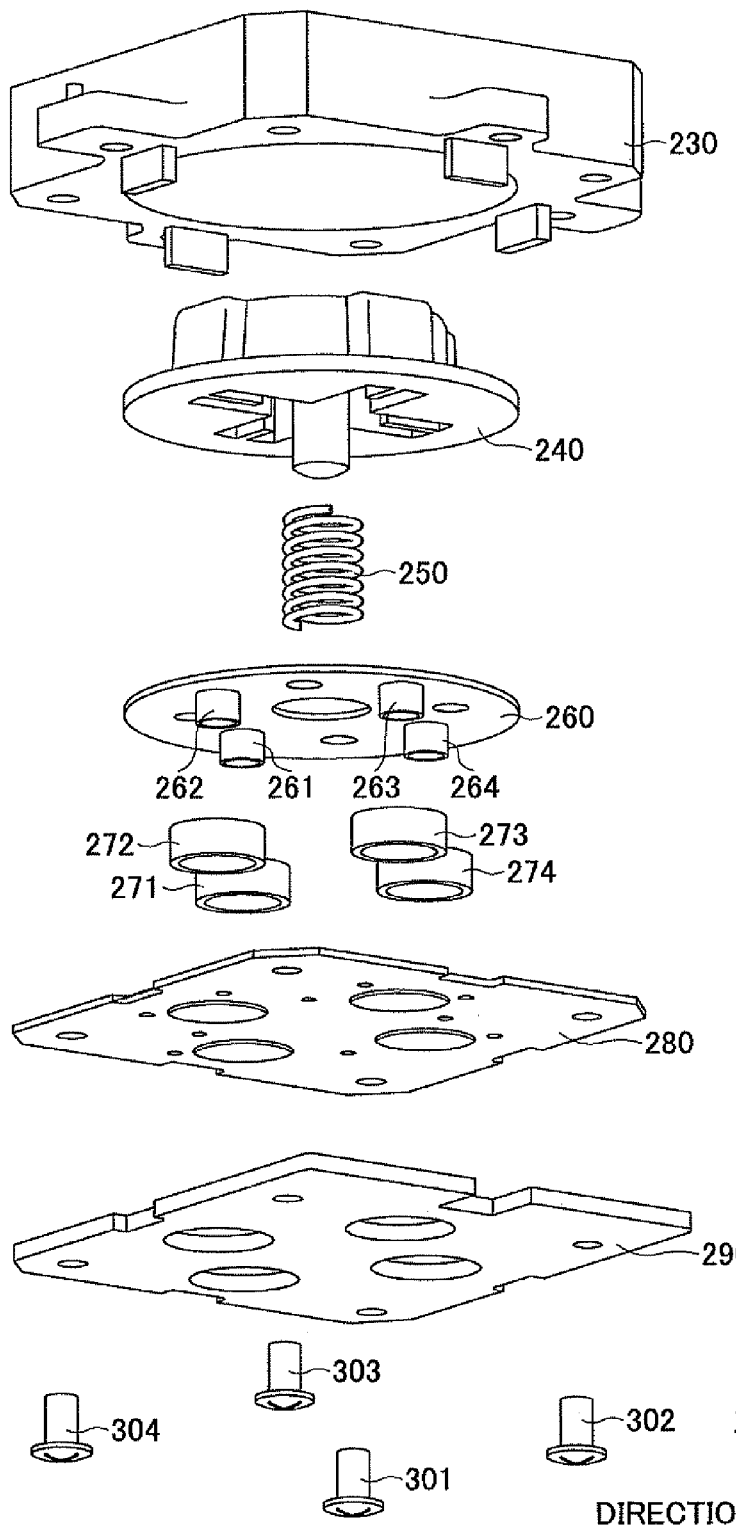
FIG. 64 is an exploded perspective view of the operation input apparatus 6 viewed from a lower oblique direction.
Figure 65:
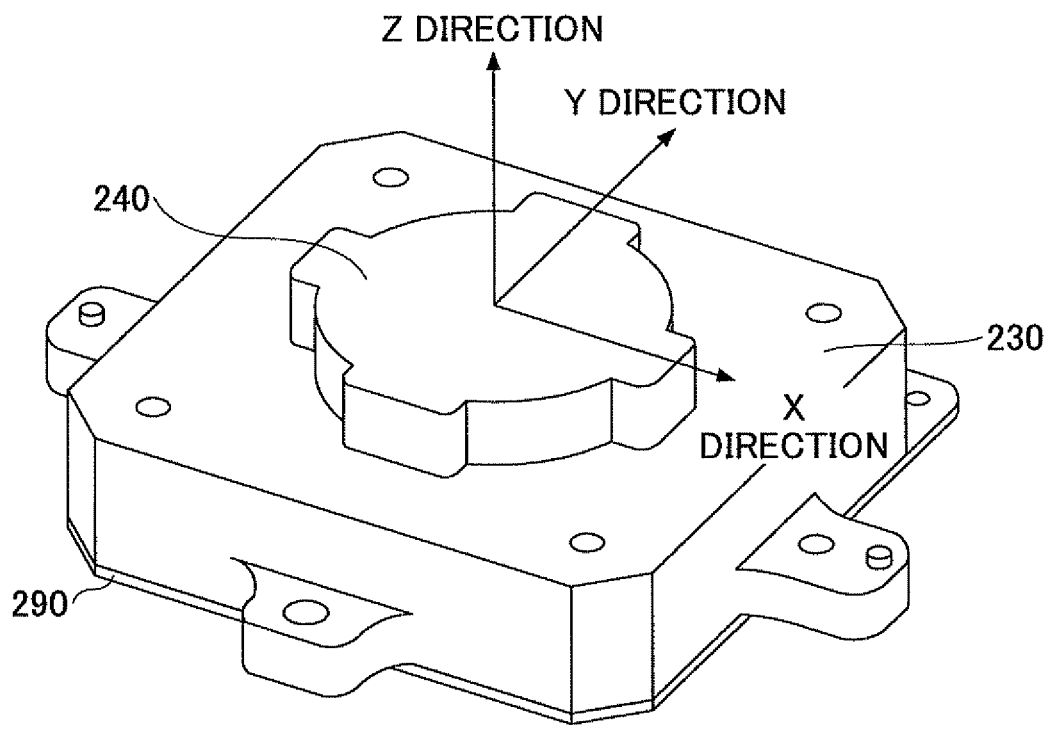
FIG. 65 is an external perspective view of the operation input apparatus 6.

FIG. 63 is an exploded perspective view of an operation input apparatus 6 viewed from an upper oblique direction, which is a Sixth embodiment of the present invention. FIG. 64 is an exploded perspective view of the operation input apparatus 6 viewed from a lower oblique direction. FIG. 65 is an external perspective view of the operation input apparatus 6. In these drawings, as to the same elements as those described in the above examples, a description thereof is omitted. The operation input apparatus 6 includes an upper yoke 260 and cores 261~264 on the upper side of the coils 271~274 as inductance increase members, and includes a lower yoke 280 on the lower side of the coils 271~274.

Figure 66:
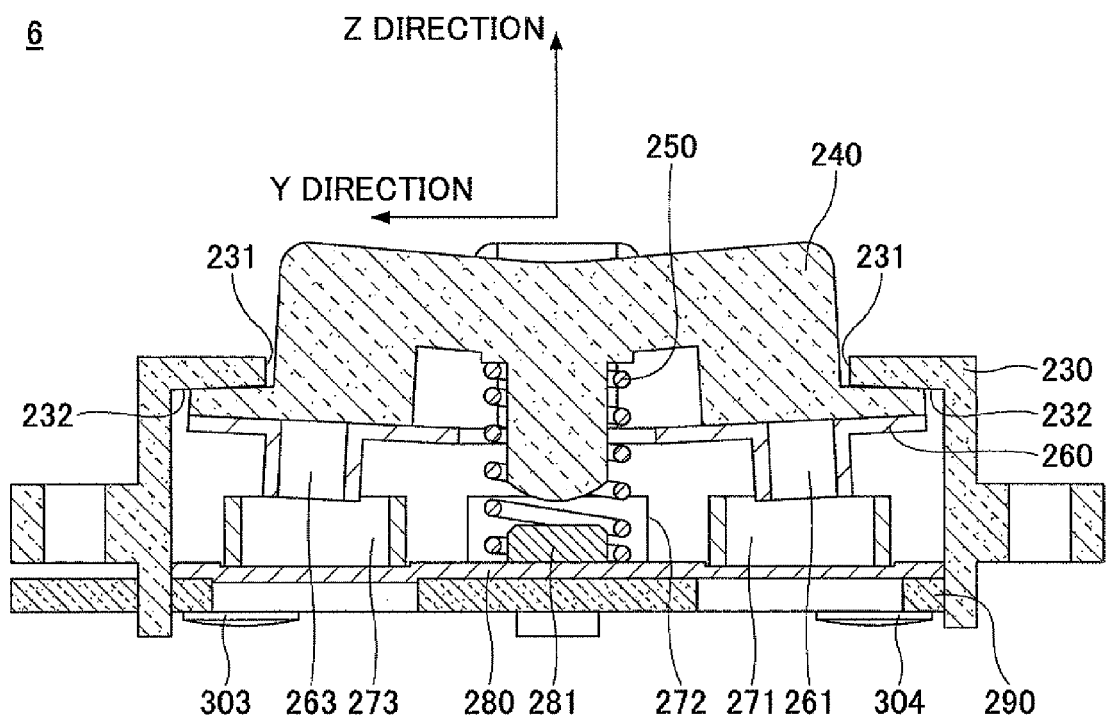
FIG. 66 is a cross-sectional view of the operation input apparatus 6 in an initial state in which an operation input is not provided.

FIG. 66 is a cross-sectional view of the operation input apparatus 6 in an initial state in which an operation input is not provided. The operation input apparatus 6 includes the upper yoke 260 as a first yoke placed above the coils 271~274 (that is, on a side of the key 240 opposed to the board 290), and includes the lower yoke 280 as a second yoke placed on the lower side of the coils 271~274 (that is, on the side of the placement surface of the board 290).

The key 240 is fitted into the opening part 231 of the case 230, so that the key 240 is held in the X direction and the Y direction, and is movable in the Z direction. The key 240 contacts the upper side of the internal surface 232 of the case 230 in a state in which the key 240 is provided with an initial load to the Z direction by the coil-like return spring 250.

One end of the return spring 250 contacts a center part of the lower surface of the key 240, and another end of the return spring 250 contacts a center part of the upper surface of the lower yoke 280 that is placed on the upper surface of the board 290. The return spring 250 passes through a hole provided at the center part of the upper yoke 260 placed on the lower surface of the key 240.

The upper yoke 260 is molded by magnetic material (copper plate, ferrite, for example), and moves with the key 240.

Cores 261~264 formed by performing burring process on the upper yoke 260 are provided in a circumferential direction having the origin of the XY plane as a center under the lower surface of the upper yoke 260. The cores 261~264 may be the same member as the upper yoke 260, or may be a magnetic member different from the upper yoke 260. The cores 261~264 are configured so as to move similarly to the upper yoke 260 and the key 240, and to deform in the inside of the coils 271~274, in the Z direction, that are placed on the lower yoke 280 placed under the upper yoke 260. At least two sets of core and coil may be provided. The number may be three, four, or more. By providing the upper yoke 260 and the lower yoke 280, it becomes easy to detect variations of inductance, so that characteristics and performance of the operation input apparatus improve as a product.

Under the lower surface of the lower yoke 280, the board 290 is placed, in which the board 290 is made of glass epoxy resin and the like for easy wiring of the coils 271~274. The board 290 may be a steel plate board that functions as both of the yoke and the board. Since the coils 271~274 are placed on the upper surface of the lower yoke 280, the board 290 may not be provided.

Although the key 240 may be formed by resin, the key 240 may be formed by magnetic material (plastic magnet, for example). Accordingly, the key 240 can be also used as the upper yoke 260 and the cores 261~264. In addition, even if the upper yoke 260 and the lower yoke 280 are not included, variations of inductance can be detected by providing only the cores 261~264 to the key 240.

Figure 67:
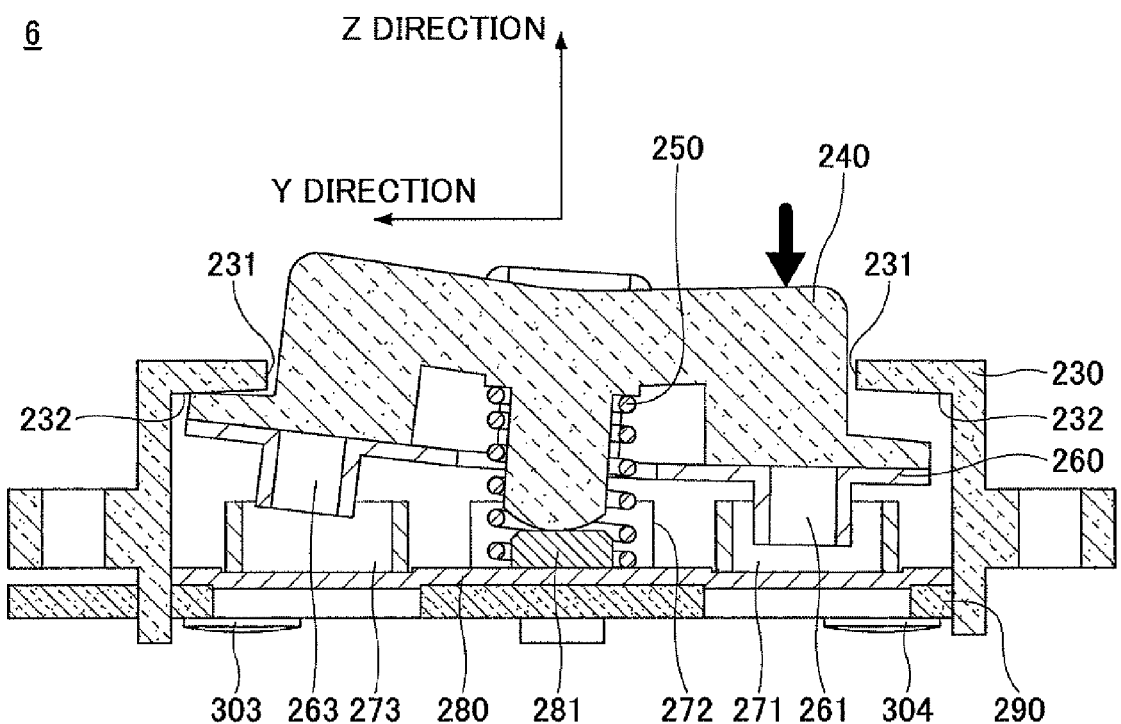
FIG. 67 is a cross-sectional view of the operation input apparatus 6 in a tilting state in which an operation input is applied for tilting the key 240 to the side of the coil 271 with respect to the XY plane.

FIG. 67 is a cross-sectional view of the operation input apparatus 6 in a tilting state in which an operation input is applied for tilting the key 240 to the side of the coil 271 with respect to the XY plane. The key 240 tilts by using the support part 281 formed on the center part on the upper surface of the lower yoke 280 as a support, so that the upper yoke 260 and the core 261 come close to the coil 271. Approach to the coil 271 increases the magnetic permeability around the coil 271, and self-inductance of the coil 271 increases. This operation can be similarly considered for the cases where the key 240 tilts in other directions. Therefore, by evaluating inductance of each coil, the tilt direction and the tilt amount of the key 240 can be detected.

Figure 68:
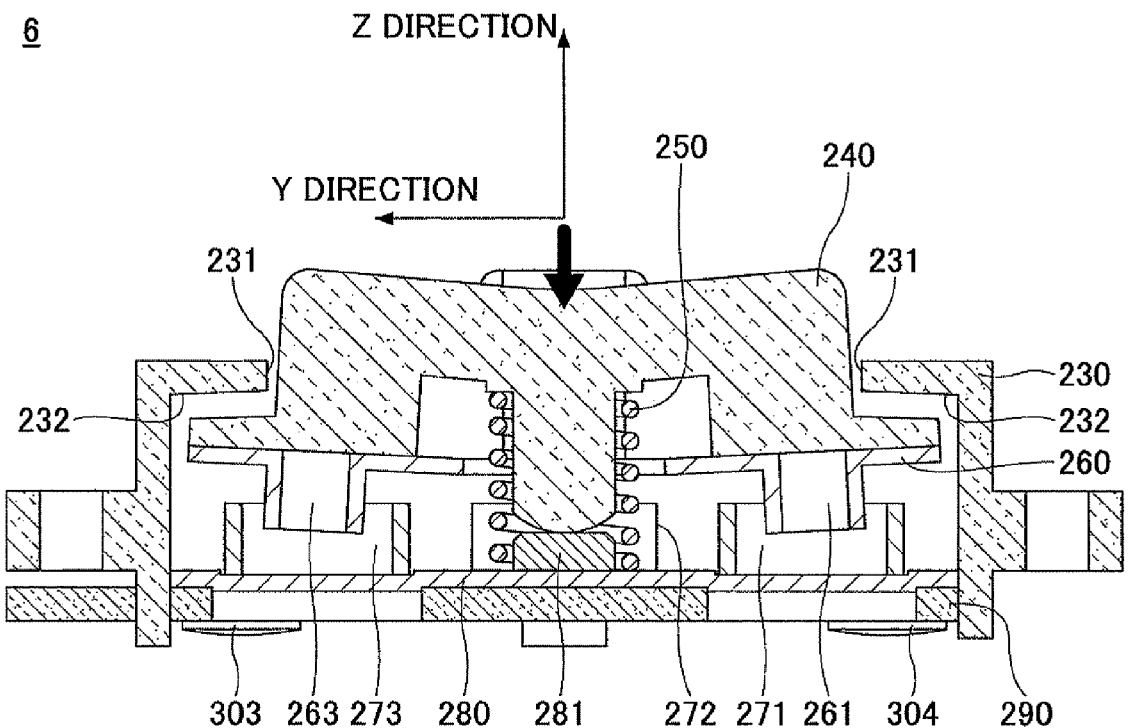
FIG. 68 is a cross-sectional view of the operation input apparatus 6 in a pressing state in which an operation input is applied for parallely shifting the key 240 in the Z direction.

FIG. 68 is a cross-sectional view of the operation input apparatus 6 in a pressing state in which an operation input is applied for shifting the key 240 in parallel in the Z direction. As shown in FIG. 68, when the center part of the key 240 is pressed, the whole key 240 moves downward in the Z direction, so that the upper yoke 260 and the cores 261~264 come close to the coils, and the magnetic permeability around the coils increases. Thus, self-inductance of the coils increases. When the whole key 240 moves downward in the Z direction, inductances of all coils increase almost equally as a whole. Therefore, by evaluating inductance of each coil, it is possible to detect that the key is pressed in the Z direction and to detect the pressing amount.

Figure 69:
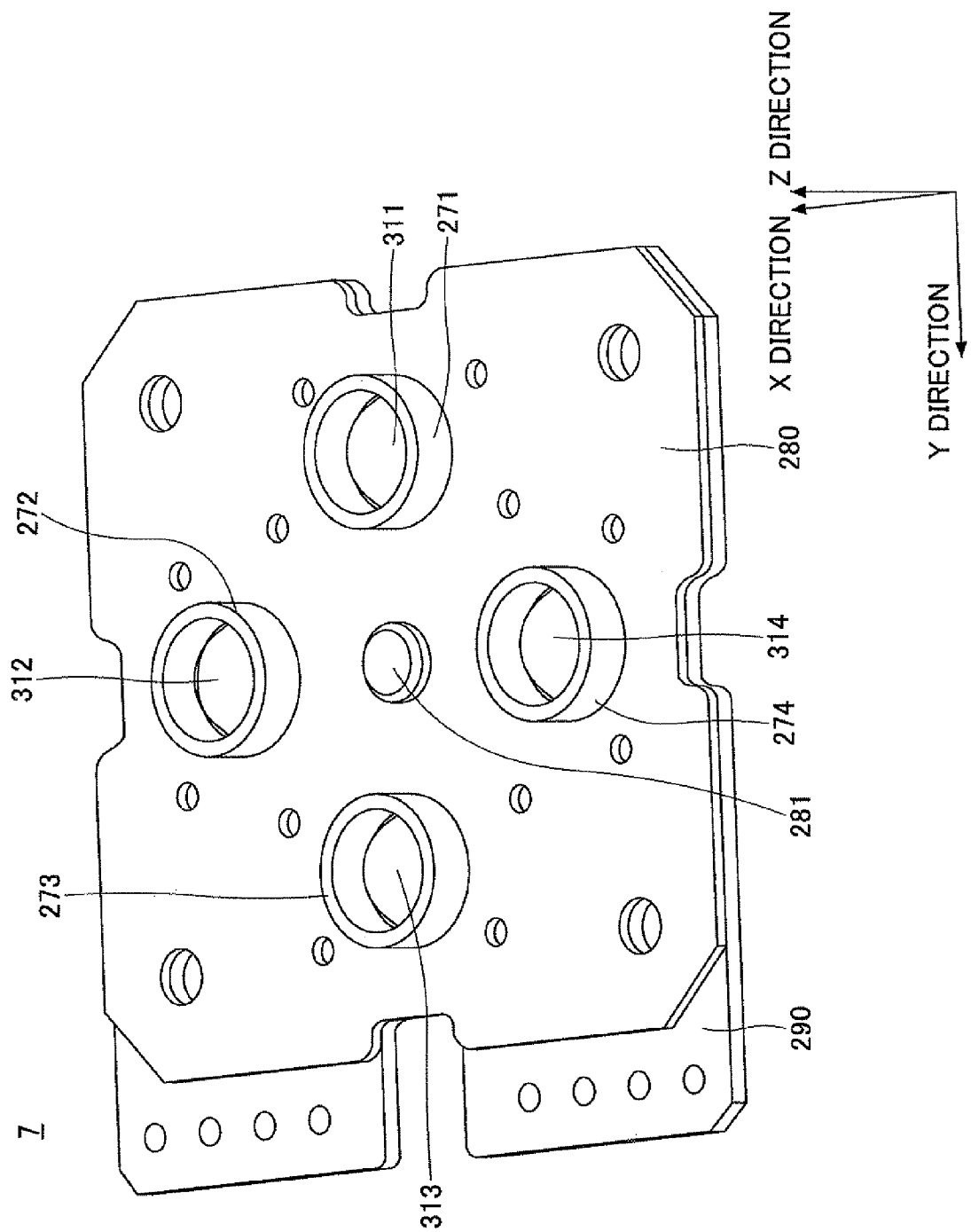
FIG. 69 is a diagram illustrating placement of click springs 311~314 provided in an operation input apparatus 7, which is a seventh embodiment of the present invention.

FIG. 69 is a diagram illustrating placement of click springs 311~314 provided in an operation input apparatus 7, which is a seventh embodiment of the present invention. The click spring 311 is placed at the lower yoke 280 such that click spring 311 is positioned in the hollow portion of the coil 271. Other click springs 312~314 are also placed similarly.

Figure 70:
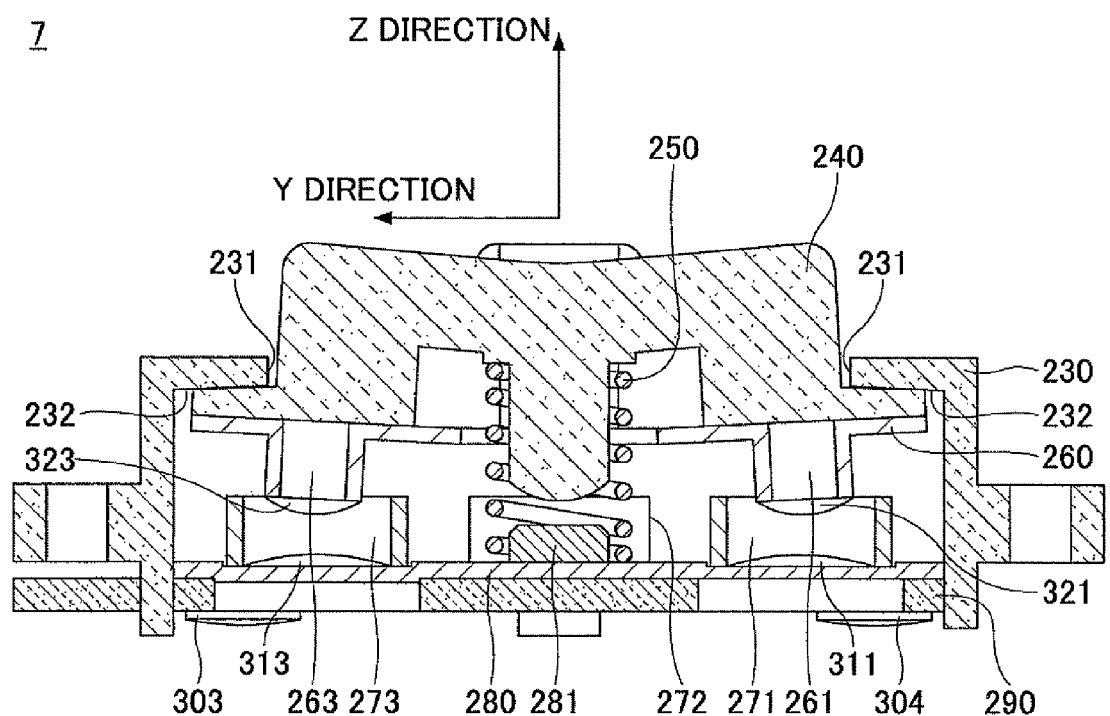
FIG. 70 is a cross-sectional view of the operation input apparatus 67 in an initial state in which an operation input is not provided.
Figure 71:
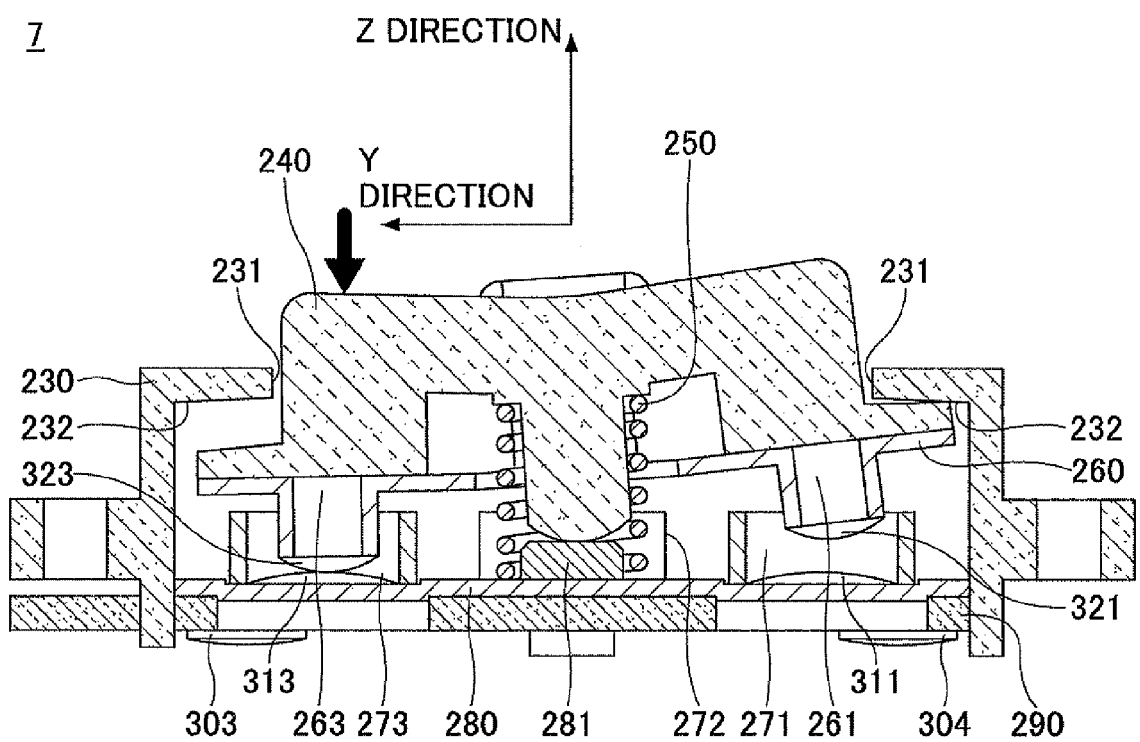
FIG. 71 is a cross-sectional view of the operation input apparatus 7 in a tilting state in which an operation input is applied for tilting the key 240 to the side of the coil 273 with respect to the XY plane.

FIG. 70 is a cross-sectional view of the operation input apparatus 7 in an initial state in which an operation input is not provided. FIG. 71 is a cross-sectional view of the operation input apparatus 7 in a tilting state in which an operation input is applied for tilting the key 240 to the side of the coil 273 with respect to the XY plane. The length in the Z direction of the cores 261~264 is set such that the tilted key 240 can press the click spring through to the end (that is, such that clicking of the click spring is available). A tip part of each of cores 261~264 (that is, contact point to the click spring) may be provided with an elastic member such as rubber. Accordingly, feeling at the time of clicking can be softened. Also, the tip part may be provided with resin material. Accordingly, friction caused by contact with the click spring can be reduced.

As shown in FIG. 71, when the key 240 tilts, the upper yoke 260 moves downward with the core 263, so that the inductance of the coil 273 that is placed under the upper yoke 260 increases. When the tilting operation continues, the tip of the core 263 contacts the click spring 313, so that the feeling of clicking can be provided to the operator of the key 240 due to the deformation of the click spring 313.

Figure 72:
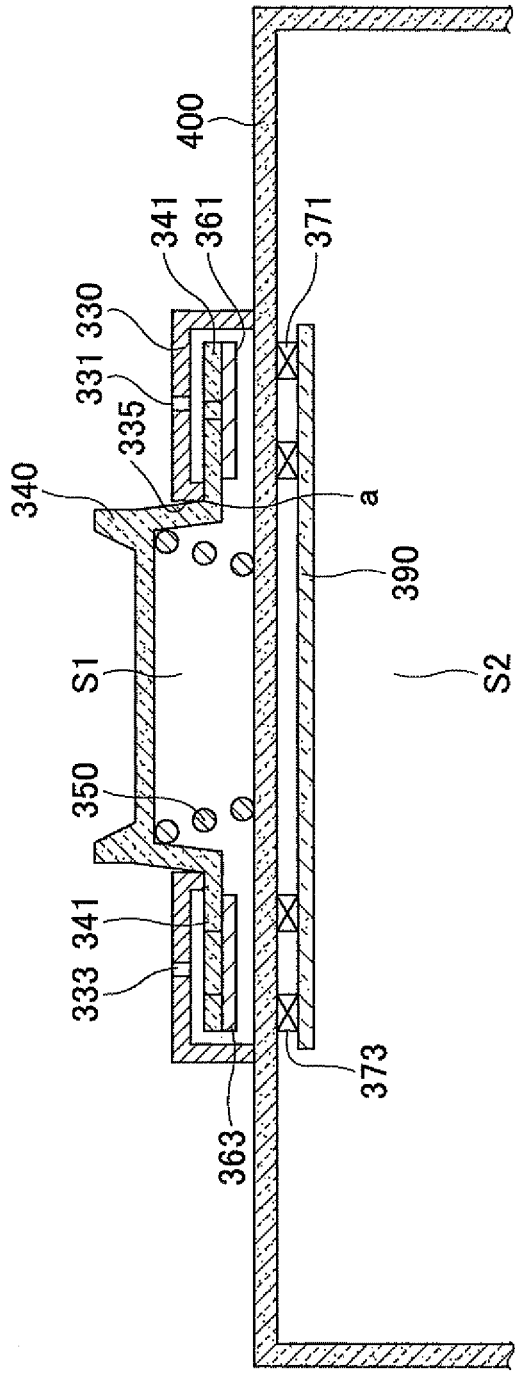
FIG. 72 is a cross-sectional view of an operation input apparatus 8 which is an eighth embodiment of the present invention.

FIG. 72 is a cross-sectional view of an operation input apparatus 8 which is an eighth embodiment of the present invention. In the drawing, as to the same elements as those described in the above examples, a description thereof is omitted. Similarly to the above-mentioned examples, the operation input apparatus 8 detects movement of the key 340 (in other words, direction of operation input applied to the key 340 and the operation input amount) by detecting inductances of four coils that change according to the move of the direction key 340.

The operation input apparatus 8 detects inductances of plural coils placed on the board 390 being opposed to the yoke that is placed in the key 340, so that the operation input apparatus 8 can detect the stroke amount of the key 340 and the direction of the operation input on the XY plane when the key 340 moves downward due to the operation input.

The board 390 is a base part having a placement surface on which four coils 371~374 are placed (coils 372 and 374 are not shown).

The key 340 is an operation member provided on a side to which an operator's force is input with respect to the board 390. The key 340 is formed like a plate, and is placed above the coils 371~374 provided on the board 390. The key 340 includes an opposed surface (lower surface in FIG. 1) that is opposed to the placement surface on which coils 371~374 are placed and an operation surface to which an operator's force is applied (upper side surface in FIG. 1).

The key 340 is provided with a flange 341. An opposed surface (lower surface of the flange 341) of the key 340 that is opposed to the board 390 is provided with yokes (361~364) the number of which is the same as the number of the coils placed on the placement surface of the board 390 (coils 362 and 364 are not shown in the figure). The yoke and the coil are placed at mutually opposed positions on a one-to-one basis. The yoke may be made of material having relative magnetic permeability of greater than 1. For example, it is preferable that the relative magnetic permeability is equal to or greater than 1.001. More particularly, it is preferable that the material is a steel plate (relative magnetic permeability is 5000) and the like. The yoke may be integrated with the key 340 using ferrite and the like, instead of providing the yoke as a component different from the key 340.

The return spring 350 is a support member for supporting the key 340 such that the key 340 can move downward. The return spring 350 is an elastic support member configured to elastically support the key 340 in a direction between the lower surface of the flange 341 and the upper surface of the board 390 so as to elastically change the interval between the yoke placed on the lower surface of the flange 341 and the coil placed on the board 390.

The return spring 350 supports the key 340 such that the key 340 can tilt with respect to the XY plane that is perpendicular to the Z axis and that the key 340 can move in the Z axial direction. The return spring 350 is a push support member configured to support the key 340 in a state in which the lower surface of the key 340 is pushed in a direction in which the key 340 moves apart from the board 390.

The operation input apparatus 8 is attached to the cover 330 in a state where the key 340 is pushed to the inside of the cover 330 and contacts the inside of the cover 330. That is, the key 340 is supported by a rib "a" provided at the opening part of the cover 330 using the reactive force of the return spring 350.

The cover 330 is a body of an electronic apparatus (camera, remote controller for AV, mobile phone and the like, for example) to which the operation input apparatus 8 is attached. The operation input apparatus 8 itself may have the cover 330. The cover 330 is a support member for supporting the key 340 such that the key 340 can move downward. The shape of the opening part 335 is circular. But, it is only necessary that the opening part 335 is formed such that it fits the shape of the key 340, and the shape may be polygonal shape such as rectangular and octagon shape.

When the key 340 and the yokes 361~364 tilt using the rib "a" provided at the opening part 335 of the over 330 as a support, the yoke comes close to the coil, so that the magnetic permeability around the coil increases. By electronically detecting this, it becomes possible to detect tilting operation of the key 340.

If non-magnetic material is placed between the coil and the yoke, this exerts almost no effect on detection of inductance. Thus, as shown in FIG. 72, a waterproofing structure can be easily realized by placing the coils in the inside of the case 400, and placing the key 340, the cover 330, the yokes 361~364 and the return spring 350 outside the case 400.

The case 400 is a waterproofing case as a separating member configured to separate between a water exposure space S1 that is not sealed and that water can enter and a waterproofing space S2 that is sealed and that water cannot enter. The water exposure space S1 is a space enclosed by the key 340, the cover 330 and the case 400. The waterproofing space S2 is a space enclosed by the case 400.

Figure 74:
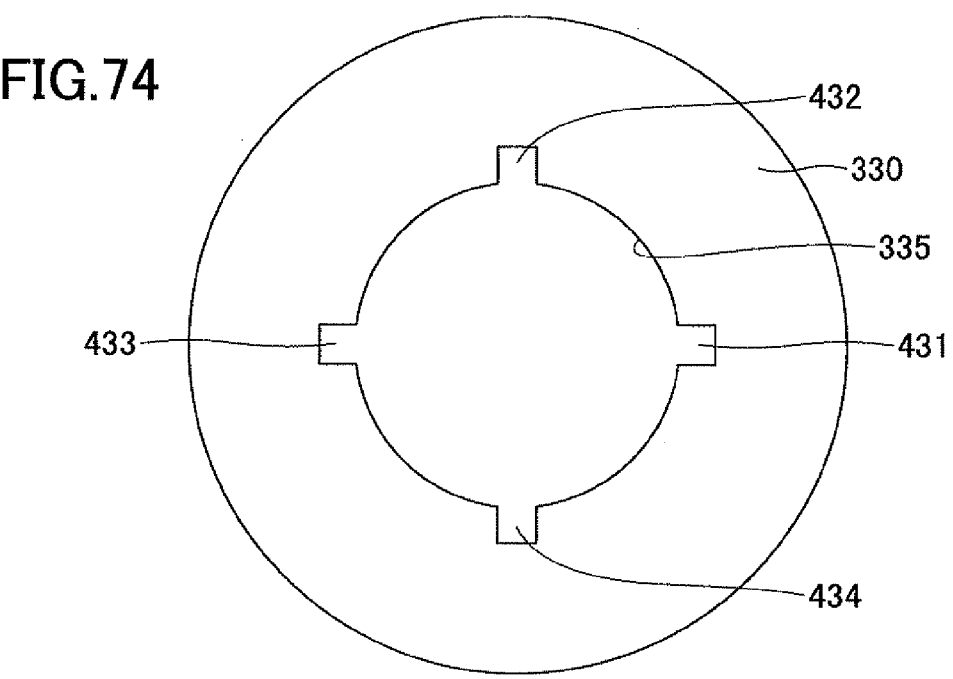
FIG. 74 is a diagram showing cutouts 431~434 provided on the opening part 335 of the cover 330.
Figure 75:
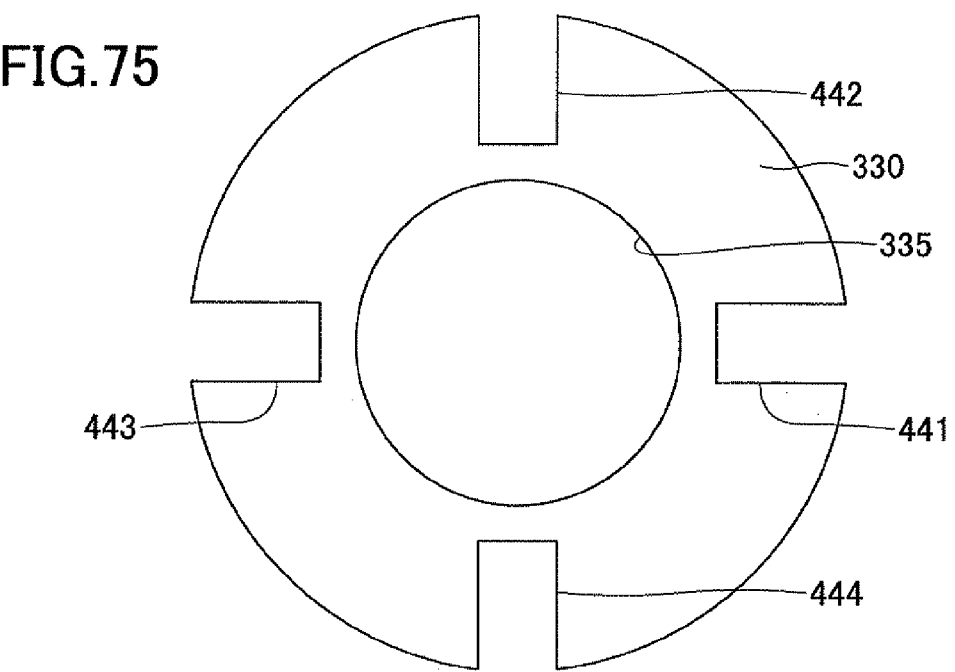
FIG. 75 is a diagram showing slits 441~444 provided in the cover 330.

In order to almost equalize water pressures between the inside and the outside of the cover 330, holes 331 and 333 such as slits are provided on the cover 330, so that it can be avoided that the return force of the return spring 350 decreases due to water pressure. For example, as shown in FIG. 74, cutouts 431~434 may be provided on the opening part 335 of the cover 330. Accordingly, even in the state in which the key 340 fits into the opening part 335, it becomes possible that water from the outside of the cover 330 flows into the space S1 through the cutouts 431~434. In addition, as shown in FIG. 75, slits 441~444 may be provided on the cover 330. Accordingly, it becomes possible that water from the outside of the cover 330 flows into the space S1 through the slits 441~444.

At this time, even though the water entering the inside of the cover 330 fills the space S1, detection error of inductance is extremely small since relative magnetic permeability can be regarded almost the same between air (1.0000004) and water (0.999991). Even though detection error exceeds a required permissible range, erroneous detection can be easily avoided by providing a small and proper dead zone. In addition, since water pressures do not change between the inside and the outside of the cover 330, there is no difference of operation feeling between the case when water fills the space S1 and the case when water does not fill the space S1.

In the case of a scheme in which movement of the key 340 is detected by capacitance instead of inductance (a scheme in which the coil is replaced with a fixed electrode and the yoke is replaced with a movable electrode in the structure shown in FIG. 72, for example), if water enters a space between electrodes, it becomes difficult to detect movement of the key 340 accurately since a dielectric constant is largely different between air and water. In this regard, the scheme of the present invention in which movement of the key 340 is detected using change of inductance has an advantage.

Also, for example, in the structure shown in FIG. 72, it can be considered to detect movement of the key 340 by using a configuration in which the coil is replaced with a MR element or a Hall element, and the yoke is replaced with a permanent magnet. But, in this case, a measure is necessary for preventing particles such as iron sand including magnetism from being deposited in the cover 330 due to the pull-in force of the permanent magnet, in the case when the apparatus is used in the sea or a river. In this regard, the scheme of the present invention in which movement of the key 340 is detected using change of inductance has an advantage since there is no portion for pulling in magnetic material.

Figure 73:
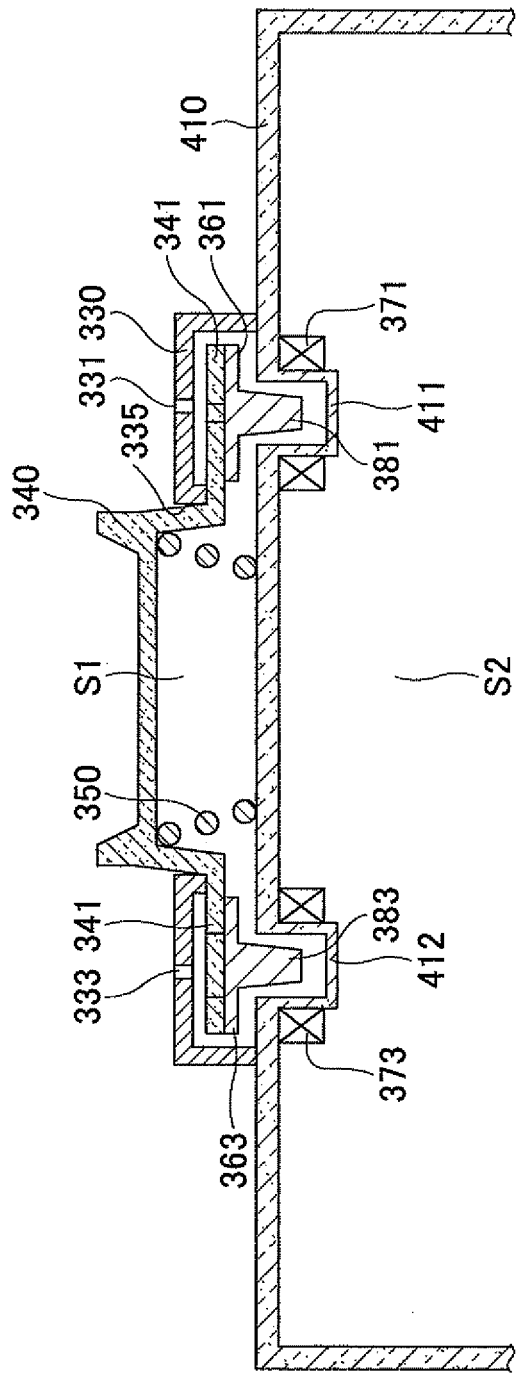
FIG. 73 is a cross-sectional view of the operation input apparatus 9 which is a ninth embodiment of the present invention.

FIG. 73 is a cross-sectional view of the operation input apparatus 9 which is a ninth embodiment of the present invention. In the drawing, as to the same elements as those described in the above examples, a description thereof is omitted. The operation input apparatus 9 also includes a case 410 as a separation member for separating between the water exposure space S1 and the waterproofing space S2.

In this embodiment, cylindrical tube parts 411 and 412 are formed by a drawing process in the case 410. A coil 371 is placed such that the inner periphery follows the outside surface of the tube part 411. Other coils are similarly configured. Also, a core 381 is provided on the yoke 361 such that the core 381 moves into the hollow portion of the tube part 411. Other cores are similarly configured. The yoke and the core that move in conjunction with move of the key 340 move back-and-forth in the hollow portion of the coil (tube part) due to tilting operation of the key 340. Accordingly, inductance of the coil increases or decreases.

As mentioned above, according to the operation input apparatus 9, since the coil is positioned at the tube part, it becomes easy to determine relative positions of the core and the coil. In addition, by adding the core, variation ratio of the inductance due to tilting movement of the key 340 can be increased. Thus, it is possible to detect the stroke amount of the key 340 accurately over a wide range while a waterproofing function is provided.

Next, a case where a force is detected by a change of inductance according to the present embodiment is compared with the case where a force is detected by a change of capacitance according to a conventional technique. They are compared by setting the occupation area of the coil and the occupation area of the capacitor to be the same.

Variations of inductance are shown in the following table 1 in the case where one side of an air-core coil of a diameter of 10 mm is provided with a steel plate (yoke) and the distance between the yoke and the coil is changed.

TABLE 1

| OPEN | 2 mm | 1 mm | 0.5 mm | 0 mm | 0.5 mm (IN THE CASE WHERE FINGER TOUCHES BACKSIDE OF YOKE) |
|---|---|---|---|---|---|
| 0.157 mH | 0.171 mH | 0.186 mH | 0.201 mH | 0.225 mH | 0.201 mH |

On the other hand, in the conventional technique, variations of capacitance are shown in the following table 2 in the case where an interval between electrodes is changed.

TABLE 2

| OPEN | 2 mm | 1 mm | 0.5 mm | 0 mm |
|---|---|---|---|---|
| 0 pF | 0.696 pF | 0.348 pF | 1.39 pF | — |

When detecting variations of inductance, there may be a case in which a substance of very high magnetic permeability enters a range where the substance exerts an effect on a magnetic circuit, so that detection accuracy of inductance deteriorates. However, in the above-mentioned embodiment, since the yoke member forms a magnetic shield, there is no effect on detection of variations of inductance even though such a substance of high magnetic permeability comes close to the backside of the yoke. That is, such a substance cannot be interference.

In addition, when detecting variations of capacitance, as is obvious from the table, the absolute value of capacity that can be detected is low. The absolute value is very small even compared with floating capacitance (several hundreds pF in the case when moving a finger closer to an electrode, capacitance between pins of an IC is 1 pF, for example).

Therefore, in the case where variations of inductance are detected like the present embodiment, effects due to causes that can be interferences are small, so that detection accuracy can be improved compared to the conventional technique.

The inductance of the coil can be represented by the above-mentioned relation equation. Therefore, if the height of the coil doubles so as to double the number of turns, the inductance of the coil doubles. That is, it is possible to easily increase the absolute value of the necessary detection value for the same projection area (occupation area), so that the present embodiment is effective in the case when the area of a product is limited. In the case of detecting capacitance, it is necessary to increase the area of the capacitor or to increase dielectric constant between electrodes in order to increase the absolute value of the detection value. Therefore, in the case in which movement is detected using variations of capacitance, it is difficult to increase the absolute value of the detection value without deteriorating the detection accuracy.

Although the embodiments of the present inventions have been described in detail, it should be understood that various changes, substitutions, and alterations could be made hereto without departing from the spirit and scope of the invention.

That is, other examples of the operation input apparatus and the operation input detection apparatus of the present invention may be implemented by combining the above-described embodiments.

Further, the operation input apparatus may be configured to be operated by not only a finger but also a palm. The operation input apparatus may also be configured to be operated by a toe or a sole. Further, the operation surface of the key may be flat, concave, or convex.

Further, in FIG. 6, a change may be caused elastically in the interval between the opposed surface of the key 30 and the placement surface of the board 10 by the deflection of the key 30 due to application of the operator's force, for example. Alternatively, a change may be caused elastically in the interval between the opposed surface of the key 30 and the placement surface of the board 10 by the deflection of the case 40 due to application of the operator's force.

The present international application is based on Japanese patent application No. 2009-120871 filed on May 19, 2009, and Japanese patent application No. 2010-114581 filed on May 18, 2010, the entire contents of Japanese patent application No. 2009-120871 and Japanese patent application No. 2010-114581 are hereby incorporated by reference.

DESCRIPTION OF REFERENCE SYMBOLS 1,2,3,4,5 operation input apparatus
10,13,14,15 board
11,12 holder
21,22,23,23 coil
30,32,34 key
31 center key
31a flange
33,35 center button
40,44 case
41 housing
42 case cover
43 key cover
51,52,53,54,55,56 return spring
55a~55f plate spring part
60 CPU
61,62 output port
63 AD port
64 address bus
65 DA port
66 driving circuit
67 receiving circuit
68 multiplexer
69 input port
70 click spring
71,72 contact part
73 detection circuit
74 resistance
81,82,83,84 core
91,92,93,94 coil
101,102,103,104,105,106 terminal
111,112,113,114,115,116 wiring
121,122,123,124 coil
131,132 though hole
141,142,143,144 coil
150 laminate film
200,201,202,203 coil
211 upper yoke
212 lower yoke
220,221,223,225,226 core
230,400,410 case
240,340 key
250,350 return spring
260, 361~364 upper yoke
261~264, 381~384 core
271~274, 371~374 coil
280 lower yoke
290,390 board
311~314 click spring
S1 water exposure space
S2 waterproofing space
a rib

The invention claimed is:

1. An operation input apparatus configured to receive a force from an operator, the operation input apparatus comprising:

a base part including a placement surface on which plural inductors are placed, the inductors being arranged in a circumferential direction of a circle formed by connecting points apart from a reference point by the same distance;

a displacement member that is provided in a side where the force is input with respect to the base part, the displacement member including an opposed surface opposed to the placement surface and an operation surface configured to receive an application of the force, and the displacement member being configured to cause an inductance of at least one of the inductors to vary with an approach of the opposed surface to the placement surface due to the application of the force on the operation surface;

a support member configured to support the displacement member such that an interval between the opposed surface and the placement surface elastically changes; and an output part configured to output an output signal generated by variations of the inductance, wherein the displacement member includes an inductance increase member configured to increase an absolute value of inductance of at least one of the plural inductors, wherein the inductance increase member is provided on the opposed surface such that the inductance increase member is opposed to each of the plural inductors, and wherein the plural inductors are coils, and the inductance increase member is a core for the coils.

2. The operation input apparatus as claimed in claim 1, further comprising:

an elastic member provided at a center portion of the circle;

a pressing part provided between the displacement member and the elastic member, the pressing part including an exposed surface that is exposed on the operation surface on a line connecting the reference point and the center portion, the pressing part being configured to deform the elastic member when the force is applied to at least one of the operation surface and the exposed surface; and a detection part configured to output a deformation detection signal caused by deformation of the elastic member.

3. The operation input apparatus as claimed in claim 2, wherein, the elastic member deforms when both of the displacement member and the pressing part are pressed downward due to an application of the force on the operation surface, and the elastic member deforms when the pressing part is pressed downward while the displacement member is not pressed downward due to an application of the force on the exposed surface instead of the operation surface.

4. The operation input apparatus as claimed in claim 2, wherein the pressing part fits into a hole that passes through the operation surface and the opposed surface.

5. The operation input apparatus as claimed in claim 2, wherein the pressing part is supported in a state where the pressing part contacts the elastic member.

6. The operation input apparatus as claimed in claim 2, wherein the support member is provided around the pressing part.

7. The operation input apparatus as claimed in claim 2, wherein the elastic member is a click spring.

8. The operation input apparatus as claimed in claim 2, wherein the support member is placed between the opposed surface and the placement surface.

9. The operation input apparatus as claimed in claim 8, wherein, the elastic member deforms when all of the displacement member, the pressing part and the support member are pressed downward due to an application of the force on the operation surface, and the elastic member deforms when the pressing part is pressed downward while the displacement member and the support member are not pressed downward due to an application of the force on the exposed surface instead of the operation surface.

10. The operation input apparatus as claimed in claim 1, wherein the displacement member is supported by the support member such that the displacement member can tilt with respect to a plane that is perpendicular to a straight line connecting the reference point and the center portion of the circle and that the displacement member is moveable in a direction parallel to the straight line.

11. The operation input apparatus as claimed in claim 1, wherein the displacement member is supported by the support member, said support member being pushed in a direction in which the opposed surface is separated from the placement surface.

12. The operation input apparatus as claimed in claim 1, wherein the operation surface is supported by the support member such that the operation surface becomes parallel to a plane perpendicular to a straight line connecting the reference point and the center portion of the circle in a state where the force is not applied.

13. The operation input apparatus as claimed in claim 1, further comprising a yoke provided on the coil on a side of the opposed surface.

14. The operation input apparatus as claimed in claim 13, wherein the core is a tube-like core formed in a first yoke.

15. The operation input apparatus as claimed in claim 1, further comprising a click spring pressed by the core.

16. The operation input apparatus as claimed in claim 1, further comprising a separation member configured to separate between a water exposure space and a waterproofing space, wherein the inductance increase member is placed in the water exposure space and the plural inductors are placed in the waterproofing space.

17. The operation input apparatus as claimed in claim 1, wherein the plural inductors are arranged at equal intervals in the circumferential direction of the circle.

18. The operation input apparatus as claimed in claim 17, wherein the placement surface has a polygonal shape, and the plural inductors are placed on angular parts of the placement surface.

19. The operation input apparatus as claimed in claim 18, wherein a lead of each of the plural inductors is wound like a triangle.

20. The operation input apparatus as claimed in claim 1, wherein the plural inductors are formed by conductive material patterns.

21. An operation input detection apparatus comprising:

an operation input apparatus configured to receive a force from an operator; and a calculation part, the operation input apparatus comprising:

a base part including a placement surface on which plural inductors are placed, the inductors being arranged in a circumferential direction of a circle formed by connecting points apart from a reference point by the same distance;

a displacement member that is provided in a side where the force is input with respect to the base part, the displacement member including an opposed surface opposed to the placement surface and an operation surface configured to receive an application of the force, and the displacement member being configured to cause an inductance of at least one of the inductors to vary with an approach of the opposed surface to the placement surface due to the application of the force on the operation surface;

a support member configured to support the displacement member such that an interval between the opposed surface and the placement surface elastically changes; and an output part configured to output an output signal generated by variations of the inductance, the calculation part being configured to calculate a vector of the force by detecting a change of an X direction component of inductance and a change of a Y direction component of inductance based on the output signal for each of the plural inductors, wherein a plane perpendicular to a straight line connecting the reference point and the center portion of the circle is defined to be an XY plane, wherein the displacement member includes an inductance increase member configured to increase an absolute value of inductance of at least one of the plural inductors, wherein the inductance increase member is provided on the opposed surface such that the inductance increase member is opposed to each of the plural inductors, and wherein the plural inductors are coils, and the inductance increase member is a core for the coils.

22. The operation input detection apparatus as claimed in claim 21, wherein the calculation part calculates a size and a direction of the force by calculating a resultant vector on the XY plane based on an evaluation value representing the change of the X direction component and an evaluation value representing the change of the Y direction component.

23. An operation input detection apparatus comprising:
an operation input apparatus configured to receive a force from an operator;
a calculation part; and
a determination part,
the operation input apparatus comprising:
a base part including a placement surface on which plural inductors are placed, the inductors being arranged in a circumferential direction of a circle formed by connecting points apart from a reference point by the same distance;
a displacement member that is provided in a side where the force is input with respect to the base part, the displacement member including an opposed surface opposed to the placement surface and an operation surface configured to receive an application of the force, and the displacement member being configured to cause an inductance of at least one of the inductors to vary with an approach of the opposed surface to the placement surface due to the application of the force on the operation surface;

a support member configured to support the displacement member such that an interval between the opposed surface and the placement surface elastically changes;

an output part configured to output an output signal generated by variations of the inductance;

an elastic member provided at a center portion of the circle;

a pressing part provided between the displacement member and the elastic member, the pressing part including an exposed surface that is exposed on the operation surface on a line connecting the reference point and the center portion, the pressing part being configured to deform the elastic member when the force is applied to at least one of the operation surface and the exposed surface; and a detection part configured to output a deformation detection signal caused by deformation of the elastic member, the calculation part being configured to calculate a vector of the force by detecting a change of an X direction component of inductance and a change of a Y direction component of inductance based on the output signal for each of the plural inductors, wherein a plane perpendicular to a straight line connecting the reference point and the center portion of the circle is defined to be an XY plane; and the determination part being configured to determine that the force is input according to the deformation detection signal, wherein the displacement member includes an inductance increase member configured to increase an absolute value of inductance of at least one of the plural inductors, wherein the inductance increase member is provided on the opposed surface such that the inductance increase member is opposed to each of the plural inductors, and wherein the plural inductors are coils, and the inductance increase member is a core for the coils.

\* \* \* \* \*